US012752198B2

(12) United States Patent
Taguchi et al.

(10) Patent No.: US 12,752,198 B2
(45) Date of Patent: Oct. 6, 2026

(54) NON-TRANSITORY COMPUTER READABLE MEDIUM, INFORMATION PROCESSING METHOD, AND GAME DEVICE

(71) Applicant: CYGAMES, INC., Tokyo (JP)

(72) Inventors: Tomoya Taguchi, Tokyo (JP); Seiya Kamizato, Tokyo (JP); Yuki Nishi, Tokyo (JP); Masaru Kubo, Tokyo (JP); Nozomi Kikuchi, Tokyo (JP); Ikko Suto, Tokyo (JP)

(73) Assignee: CYGAMES, INC., Tokyo (JP)

( * ) Notice: Subject to any disclaimer, the term of this patent is extended or adjusted under 35 U.S.C. 154(b) by 163 days.

(21) Appl. No.: 18/657,568

(22) Filed: May 7, 2024

(65) Prior Publication Data

US 2024/0293753 A1 Sep. 5, 2024

Related U.S. Application Data

(63) Continuation of application No. PCT/JP2022/041978, filed on Nov. 10, 2022.

(30) Foreign Application Priority Data

Nov. 12, 2021 (JP) ................................ 2021-185166

(51) Int. Cl.
*A63F 13/825* (2014.01)
*A63F 13/58* (2014.01)

(52) U.S. Cl.
CPC ............ *A63F 13/825* (2014.09); *A63F 13/58* (2014.09)

(58) Field of Classification Search
CPC ...... A63F 13/825; A63F 13/58; A63F 13/798; A63F 13/79; A63F 13/795; A63F 13/87; A63F 2300/208
See application file for complete search history.

(56) References Cited

U.S. PATENT DOCUMENTS 5,846,132 A * 12/1998 Junkin .................... A63F 3/081 463/42
5,964,660 A * 10/1999 James ..................... A63F 13/12 463/1

(Continued)

FOREIGN PATENT DOCUMENTS

JP 2002-045572 A 2/2002
JP 2002346232 A 12/2002

(Continued)

OTHER PUBLICATIONS

"Puzzle & Dragons Strategy Article: What is a helper?" [Online], Mar. 22, 2014, Eurythmic Co., Ltd., The complete guide of game strategies, [Retrieved on Sep. 14, 2022], Internet <URL:https://www.dopr.net/pad/%E5%8A%A9%E3%81%A3%E4%BA%BA%E3%81%A3%E3%81%A6%E3%81%AA%E3%81%AB%EF%BC%9F>.

*Primary Examiner* — Dmitriy Bolotin
(74) *Attorney, Agent, or Firm* — Osha Bergman Watanabe & Burton LLP

(57) ABSTRACT

A non-transitory computer readable medium stores a program causing a computer to execute: processing for storing character information of a character nurtured in a nurturing game, in association with unique information of a player who nurtured the character; processing for, based on an operation by a first player, setting a plurality of characters as a plurality of battle characters, the plurality of battle characters including at least one character nurtured by at least one second player other than the first player; and processing for executing a battle game in which the plurality of battle characters play a battle by using the character information of the plurality of battle characters.

7 Claims, 67 Drawing Sheets

(56) References Cited

U.S. PATENT DOCUMENTS

| | | | | |
|---|---|---|---|---|
| 11,679,332 | B2 * | 6/2023 | Matsunaga | A63F 13/56<br>463/31 |
| 12,214,278 | B2 * | 2/2025 | Sekine | A63F 13/422 |
| 2002/0010024 | A1 * | 1/2002 | Kusuda | A63F 13/79<br>709/205 |
| 2002/0016195 | A1 * | 2/2002 | Namba | A63F 13/58<br>463/3 |
| 2002/0183113 | A1 | 12/2002 | Takahashi | |
| 2002/0183114 | A1 | 12/2002 | Takahashi | |
| 2002/0183115 | A1 | 12/2002 | Takahashi | |
| 2002/0183116 | A1 | 12/2002 | Takahashi | |
| 2002/0183117 | A1 | 12/2002 | Takahashi | |
| 2020/0101380 | A1 * | 4/2020 | Nakagawa | A63F 13/35 |
| 2020/0316474 | A1 * | 10/2020 | Tinari | A63F 13/58 |
| 2024/0293753 | A1 * | 9/2024 | Taguchi | A63F 13/87 |
| 2025/0360408 | A1 * | 11/2025 | Kotanaka | A63F 13/537 |

FOREIGN PATENT DOCUMENTS

| | | | |
|---|---|---|---|
| JP | 2014-198185 | A | 10/2014 |
| JP | 2017-006280 | A | 1/2017 |
| JP | 6685049 | B2 | 4/2020 |
| KR | 20020011346 | A | 2/2020 |

* cited by examiner

| KIND OF CHARACTER | ABILITY PARAMETERS (INITIAL VALUES) | | | | |
|---|---|---|---|---|---|
| | SPEED | STAMINA | POWER | SPIRIT | WISDOM |
| A | 90 | 65 | 60 | 102 | 105 |
| B | 102 | 63 | 73 | 105 | 100 |
| C | 92 | 98 | 109 | 100 | 101 |
| D | 80 | 72 | 110 | 112 | 64 |
| E | 100 | 102 | 62 | 65 | 71 |

FIG.6A

| KIND OF CHARACTER | APTITUDE PARAMETERS (INITIAL VALUES) | | | | | | | | | |
|---|---|---|---|---|---|---|---|---|---|---|
| | TRACK APTITUDES | | DISTANCE APTITUDES | | | | RUNNING-STYLE APTITUDES | | | |
| | TURF | DIRT | SHORT | MILE | INTER-MEDIATE | LONG | EARLY SPEED | FRONT RUNNING | STRETCH RUNNING | CLOSING |
| A | A | G | G | E | A | A | C | A | A | D |
| B | A | F | A | B | D | E | A | A | F | F |
| C | A | F | E | A | A | C | C | A | A | A |
| D | E | A | A | B | C | C | G | F | A | D |
| E | A | B | B | A | A | B | B | A | A | E |

FIG.6B

| KIND OF CHARACTER | ACQUIRED SKILLS AND POSSESSED SKILLS | | | | | | | | | | |
|---|---|---|---|---|---|---|---|---|---|---|---|
| | a | b | c | d | e | f | g | h | i | j | k |
| A | | | | | | ○ | ○ | ◎ | | ○ | |
| B | | | ○ | ◎ | ○ | | ○ | | ○ | | |
| C | ◎ | ○ | ○ | ○ | ○ | ○ | ○ | ○ | | | |
| D | | | | | ◎ | ○ | ○ | ○ | | ○ | |
| E | | | | | | ◎ | | | ○ | | ○ |

FIG.6C

| KIND OF CHARACTER | EXCLUSIVE EVENTS | | | | | | | | | | |
|---|---|---|---|---|---|---|---|---|---|---|---|
| | a | b | c | d | e | f | g | h | i | j | k |
| A | | | | | | ○ | | ○ | | ○ | |
| B | | | ○ | | | | ○ | | | | |
| C | | | | | ○ | | | | | | |
| D | | | | | | ○ | | ○ | | ○ | |
| E | | | | | | | | | | | ○ |

FIG.6D

| KIND OF SUPPORT CARD | SUPPORT CHARACTER | RARITY | LEVEL | FAVORITE TRAINING |
|---|---|---|---|---|
| A1 | CHARACTER A | SSR | 50 | SPEED |
| A2 | CHARACTER A | SR | 45 | STAMINA |
| A3 | CHARACTER A | R | 40 | WISDOM |
| B1 | CHARACTER B | SR | 1 | POWER |
| B2 | CHARACTER B | R | 15 | SPIRIT |

FIG.9A

| KIND OF SUPPORT CARD | SUPPORT EFFECTS | | | | | | |
|---|---|---|---|---|---|---|---|
| | SUBJECTS a | SUBJECTS b | SUBJECTS c | SUBJECTS d | SUBJECTS e | SUBJECTS f | SUBJECTS g |
| A1 | +60% | | +40% | | +30% | +2pt | |
| A2 | +50% | +40% | | | | | |
| A3 | +40% | | | +25% | | +1pt | |
| B1 | +10% | | | | +5% | | +1pt |
| B2 | +15% | | | | | | +1pt |

FIG.9B

| KIND OF SUPPORT CARD | POSSESSED SKILLS | | | | | | | | | | |
|---|---|---|---|---|---|---|---|---|---|---|---|
| | a | b | c | d | e | f | g | h | i | j | k |
| A1 | | | ○ | | | ○ | ○ | | | ○ | ○ |
| A2 | | | | ○ | | | ○ | | ○ | | |
| A3 | | | | | ○ | | | ○ | | | |
| B1 | | | | | ○ | ○ | | | | ○ | ○ |
| B2 | | | | | | | | | ○ | | |

FIG.9C

| KIND OF SUPPORT CARD | SUPPORT EVENTS | | | | | | | | | | |
|---|---|---|---|---|---|---|---|---|---|---|---|
| | a | b | c | d | e | f | g | h | i | j | k |
| A1 | | | ○ | | | | ○ | | | ○ | ○ |
| A2 | | | | ○ | | ○ | ○ | | | | |
| A3 | | | | | ○ | | | | | | |
| B1 | | ○ | | | ○ | ○ | | | | | |
| B2 | | | | | | | | | ○ | | |

FIG.9D

| KIND OF CHARACTER | CHARACTER IDENTIFICATION INFORMATION | | | | |
|---|---|---|---|---|---|
| | MAIN CHARACTER | SUPPORT CHARACTER | SPECIFIC CHARACTER | TEAM MEMBER | SUB-MEMBER |
| CHARACTER A | | | | | ○ |
| CHARACTER B | | | | | ○ |
| CHARACTER C | ○ | | | ○ | |
| CHARACTER D | | | | | ○ |
| CHARACTER E | | ○ | | ○ | |
| CHARACTER F | | | ○ | ○ | |
| CHARACTER G | | | | | ○ |
| CHARACTER H | | | | | ○ |
| CHARACTER I | | ○ | | ○ | |
| CHARACTER J | | | ○ | ○ | |
| CHARACTER K | | | | | ○ |
| CHARACTER L | | ○ | | ○ | |
| CHARACTER M | | ○ | | ○ | |
| CHARACTER N | | | ○ | ○ | |
| CHARACTER P | | | | | ○ |
| CHARACTER Q | | ○ | | ○ | |
| CHARACTER R | | | ○ | ○ | |
| CHARACTER S | | | | | ○ |
| CHARACTER T | | ○ | | ○ | |
| CHARACTER U | | | | | ○ |
| CHARACTER V | | | | | ○ |
| CHARACTER W | | | | | ○ |
| CHARACTER X | | | | | ○ |
| CHARACTER Y | | | | | ○ |
| CHARACTER Z | | | | | ○ |

FIG.10

| KIND OF CHARACTER | CHARACTER IDENTIFICATION INFORMATION | | | | |
|---|---|---|---|---|---|
| | MAIN CHARACTER | SUPPORT CHARACTER | SPECIFIC CHARACTER | TEAM MEMBER | SUB-MEMBER |
| CHARACTER A | | | | | ○ |
| CHARACTER B | | | | | ○ |
| CHARACTER C | | | | | ○ |
| CHARACTER D | | | | | ○ |
| CHARACTER E | | ○ | | ○ | |
| CHARACTER F | ○ | | ○ | ○ | |
| CHARACTER G | | | | | ○ |
| CHARACTER H | | | | | ○ |
| CHARACTER I | | | | | ○ |
| CHARACTER J | | ○ | ○ | ○ | |
| CHARACTER K | | | | | ○ |
| CHARACTER L | | ○ | | ○ | |
| CHARACTER M | | ○ | | ○ | |
| CHARACTER N | | | ○ | ○ | |
| CHARACTER P | | | | | ○ |
| CHARACTER Q | | ○ | | ○ | |
| CHARACTER R | | | ○ | ○ | |
| CHARACTER S | | | | | ○ |
| CHARACTER T | | ○ | | ○ | |
| CHARACTER U | | | | | ○ |
| CHARACTER V | | | | | ○ |
| CHARACTER W | | | | | ○ |
| CHARACTER X | | | | | ○ |
| CHARACTER Y | | | | | ○ |
| CHARACTER Z | | | | | ○ |

FIG.11

| NUMBER OF TURNS | SELECTION ITEMS | | | | SKILL ACQUISITION |
|---|---|---|---|---|---|
| | Rest | Training | Going Out | Race | |
| 1ST TURN | ○ | ○ | ○ | ○ | ○ |
| 2ND TURN | ○ | ○ | ○ | ○ | |
| 3RD TURN | ○ | ○ | ○ | ○ | |
| 4TH TURN | ○ | ○ | ○ | ○ | |
| 5TH TURN | ○ | ○ | ○ | ○ | |
| 6TH TURN | ○ | ○ | ○ | ○ | |
| 7TH TURN | ○ | ○ | ○ | ○ | |
| 8TH TURN | ○ | ○ | ○ | ○ | |
| 9TH TURN | ○ | ○ | ○ | ○ | |
| 10TH TURN | ○ | ○ | ○ | ○ | |
| 11TH TURN | ○ | ○ | ○ | ○ | |
| 12TH TURN | ○ | ○ | ○ | ○ | |
| 13TH TURN | ○ | ○ | ○ | ○ | |
| 14TH TURN | ○ | ○ | ○ | ○ | |
| 15TH TURN | ○ | ○ | ○ | ○ | |
| 16TH TURN | ○ | ○ | ○ | ○ | |
| 17TH TURN | ○ | ○ | ○ | ○ | |
| 18TH TURN | ○ | ○ | ○ | ○ | |
| 19TH TURN | ○ | ○ | ○ | ○ | |
| 20TH TURN | × | × | × | ○ | |
| 21TH TURN | ○ | ○ | ○ | ○ | |
| 22TH TURN | ○ | ○ | ○ | ○ | |
| 23TH TURN | ○ | ○ | ○ | ○ | |
| 24TH TURN | ○ | ○ | ○ | ○ | |
| 25TH TURN | ○ | ○ | ○ | ○ | |
| 26TH TURN | ○ | ○ | ○ | ○ | |
| 27TH TURN | ○ | ○ | ○ | ○ | |
| 28TH TURN | ○ | ○ | ○ | ○ | |
| 29TH TURN | ○ | ○ | ○ | ○ | |
| 30TH TURN | × | × | × | ○ | |
| 31TH TURN | ○ | ○ | ○ | ○ | |
| 32TH TURN | ○ | ○ | ○ | ○ | |
| 33TH TURN | ○ | ○ | ○ | ○ | |
| 34TH TURN | ○ | ○ | ○ | ○ | |
| 35TH TURN | × | × | × | ○ | |
| ⋮ | ⋮ | ⋮ | ⋮ | ⋮ | |
| 57TH TURN | × | × | × | ○ | |
| 58TH TURN | ○ | ○ | ○ | ○ | |
| 59TH TURN | × | × | × | ○ | |
| 60TH TURN | ○ | ○ | ○ | ○ | |

FIG.12

| CHARACTER IDENTIFICATION INFORMATION | | ASSIGN/ DO NOT ASSIGN | |
|---|---|---|---|
| SUPPORT CHARACTER | SPECIFIC CHARACTER | ASSIGN | DO NOT ASSIGN |
| ○ | ○ | 80% | 20% |
| — | ○ | 60% | 40% |
| ○ | — | 40% | 60% |
| — | — | 10% | 90% |

FIG.20

| TEAM RANKING | TRAINING LEVEL | | | | |
|---|---|---|---|---|---|
| | SPEED | STAMINA | POWER | SPIRIT | WISDOM |
| ~100 | Lv.1 | Lv.1 | Lv.1 | Lv.1 | Lv.1 |
| 99~60 | Lv.2 | Lv.2 | Lv.2 | Lv.2 | Lv.2 |
| 59~30 | Lv.3 | Lv.3 | Lv.3 | Lv.3 | Lv.3 |
| 29~10 | Lv.4 | Lv.4 | Lv.4 | Lv.4 | Lv.4 |
| 9~1 | Lv.5 | Lv.5 | Lv.5 | Lv.5 | Lv.5 |

FIG.21A

| TRAINING LEVEL | FIXED RAISING VALUES (SPEED) | | | | |
|---|---|---|---|---|---|
| | SPEED | STAMINA | POWER | SPIRIT | WISDOM |
| Lv.1 | 8 | 0 | 6 | 0 | 0 |
| Lv.2 | 10 | 0 | 8 | 0 | 0 |
| Lv.3 | 12 | 0 | 10 | 0 | 0 |
| Lv.4 | 14 | 0 | 12 | 0 | 0 |
| Lv.5 | 20 | 0 | 18 | 0 | 0 |

FIG.21B

| TRAINING LEVEL | FIXED RAISING VALUES (POWER) | | | | |
|---|---|---|---|---|---|
| | SPEED | STAMINA | POWER | SPIRIT | WISDOM |
| Lv.1 | 0 | 6 | 8 | 0 | 0 |
| Lv.2 | 0 | 8 | 10 | 0 | 0 |
| Lv.3 | 0 | 10 | 12 | 0 | 0 |
| Lv.4 | 0 | 12 | 14 | 0 | 0 |
| Lv.5 | 0 | 18 | 20 | 0 | 0 |

FIG.21C

| CHARACTER IDENTIFICATION INFORMATION | | BONUS ADDITION RATE | | |
|---|---|---|---|---|
| SUPPORT CHARACTER | SPECIFIC CHARACTER | NONE | 10% UP | 20% UP |
| ○ | ○ | 50% | 0% | 50% |
| ○ | — | 50% | 50% | 0% |
| — | ○ | 50% | 50% | 0% |
| — | — | 80% | 20% | 0% |

FIG.21D

| KIND OF EVENT | EVENT CLASS | | | | |
|---|---|---|---|---|---|
| | HINT | ABILITY | APTITUDE | STORY | SPECIAL TRAINING |
| SCENARIO EVENT | ○ | ○ | ○ | ○ | — |
| EXCLUSIVE EVENT FOR MAIN CHARACTER | ○ | ○ | — | — | — |
| SUPPORT EVENT | ○ | ○ | — | — | — |
| TEAM MEMBER EVENT | — | — | — | ○ | ○ |

FIG.22

| NUMBER OF TURNS | SCENARIO EVENT | EXCLUSIVE EVENT | SUPPORT EVENT | TEAM MEMBER EVENT |
|---|---|---|---|---|
| 1ST TURN | 0001 | — | — | — |
| 2ND TURN | — | 1001 | LOTTERY | LOTTERY |
| 3RD TURN | — | LOTTERY | LOTTERY | LOTTERY |
| 4TH TURN | 0002 | LOTTERY | LOTTERY | CHANGEABLE |
| 5TH TURN | 0003 | LOTTERY | LOTTERY | CHANGEABLE |
| 6TH TURN | 0004 | LOTTERY | LOTTERY | CHANGEABLE |
| 7TH TURN | 0005 | LOTTERY | LOTTERY | CHANGEABLE |
| 8TH TURN | — | 1002 | LOTTERY | LOTTERY |
| 9TH TURN | — | LOTTERY | LOTTERY | LOTTERY |
| 10TH TURN | 0006 | — | — | — |
| 11TH TURN | — | LOTTERY | LOTTERY | LOTTERY |
| 12TH TURN | LOTTERY | LOTTERY | LOTTERY | LOTTERY |
| ⋮ | ⋮ | ⋮ | ⋮ | ⋮ |

FIG.23

| VALUE OF BOND PARAMETER | WHETHER OR NOT SPECIAL TRAINING EVENT HAS BEEN EXECUTED | |
|---|---|---|
| | EXECUTED | NOT EXECUTED |
| 0～19 | 20% | 80% |
| 20～39 | 22% | 78% |
| 40～59 | 24% | 76% |
| 60～79 | 26% | 74% |
| 80～99 | 28% | 72% |
| 100 | 30% | 70% |

| | UPON OCCURRENCE OF SUCCESS | | | | | AFTER OCCURRENCE OF GREAT SUCCESS |
|---|---|---|---|---|---|---|
| | NUMBER OF TIMES OF EXECUTION OF SPECIAL TRAINING EVENT | | | | | |
| | 0 | 1 | 2 | 3 | 4 | |
| SPECIAL ICON | | | | | | |

| PARAMETER RAISE | 0～19 | 20～39 | 40～ |
|---|---|---|---|
| BONUS ICON | +○○ | +○○ | +○○ |

| TRAINING PERFORMED | NUMBER OF CHARACTERS | BONUS FIXED VALUES (MAIN CHARACTER) | | | | | |
|---|---|---|---|---|---|---|---|
| | | SPEED | STAMINA | POWER | SPIRIT | WISDOM | SKILL P |
| SPEED | 1 | | | | | | |
| | 2 | | | | | | +5 |
| | 3 | +6 | | +2 | | | +5 |
| | 4 | +8 | | +4 | | | +7 |
| | 5 | +10 | | +6 | | | +9 |
| STAMINA | 1 | | | | | | |
| | 2 | | | | | | +5 |
| | 3 | | +6 | | +2 | | +5 |
| | 4 | | +8 | | +4 | | +7 |
| | 5 | | +10 | | +6 | | +9 |
| POWER | 1 | | | | | | |
| | 2 | | | | | | +5 |
| | 3 | | +2 | +6 | | | +5 |
| | 4 | | +4 | +8 | | | +7 |
| | 5 | | +6 | +10 | | | +9 |
| SPIRIT | 1 | | | | | | |
| | 2 | | | | | | +5 |
| | 3 | | +1 | +1 | +6 | | +5 |
| | 4 | | +2 | +2 | +8 | | +7 |
| | 5 | | +3 | +3 | +10 | | +9 |
| WISDOM | 1 | | | | | | |
| | 2 | | | | | | +5 |
| | 3 | +2 | | | | +6 | +5 |
| | 4 | +4 | | | | +8 | +7 |
| | 5 | +6 | | | | +10 | +9 |

FIG.26A

| FAVORITE TRAINING | BONUS ADDITIONAL VALUES (MAIN CHARACTER) | | | | | |
|---|---|---|---|---|---|---|
| | SPEED | STAMINA | POWER | SPIRIT | WISDOM | SKILL P |
| SPEED | +20 | | +10 | | | |
| STAMINA | | +20 | | +10 | | |
| POWER | | +10 | +20 | | | |
| SPIRIT | +5 | | +5 | +20 | | |
| WISDOM | | | | | +20 | +10 |

FIG.26B

| TRAINING EXECUTED | FIXED RAISING VALUES (SPECIAL TRAINING SUBJECTS) | | | | |
|---|---|---|---|---|---|
| | SPEED | STAMINA | POWER | SPIRIT | WISDOM |
| SPEED | +50~70 | +10~20 | +30~40 | +10~20 | +10~20 |
| STAMINA | +10~20 | +50~70 | +10~20 | +30~40 | +10~20 |
| POWER | +10~20 | +30~40 | +50~70 | +10~20 | +10~20 |
| SPIRIT | +20~30 | +10~20 | +20~30 | +50~70 | +10~20 |
| WISDOM | +30~40 | +10~20 | +10~20 | +10~20 | +50~70 |

FIG.27A

| FAVORITE TRAINING | BONUS RAISING VALUES (SPECIAL TRAINING SUBJECTS) | | | | |
|---|---|---|---|---|---|
| | SPEED | STAMINA | POWER | SPIRIT | WISDOM |
| SPEED | +180 | +50 | +140 | +50 | +50 |
| STAMINA | +50 | +180 | +100 | +50 | +50 |
| POWER | +50 | +140 | +180 | +50 | +50 |
| SPIRIT | +90 | +50 | +90 | +180 | +50 |
| WISDOM | +140 | +50 | +50 | +50 | +180 |

FIG.27B

| RACE CONDITIONS | NOTES |
|---|---|
| COURSE | EXISTING COURSES OR INDIVIDUALLY SET |
| NUMBER OF PARTICIPANTS | SELECT FROM 11 TO 18 |
| SEASON | SELECT FROM RANDOM (DEFAULT), SPRING, SUMMER, AUTUMN, AND WINTER |
| WEATHER AND TRACK CONDITIONS | SELECT FROM RANDOM (DEFAULT), "SUNNY/GOOD", "SUNNY/SLIGHTLY HEAVY", "SUNNY/HEAVY", "CLOUDY/GOOD", "CLOUDY/SLIGHTLY HEAVY", "CLOUDY/HEAVY", "RAIN/SLIGHTLY HEAVY", "RAIN/HEAVY", "RAIN/POOR", "SNOW/SLIGHTLY HEAVY", "SNOW/HEAVY", AND "SNOW/POOR" |
| CHARACTER CONDITIONS | SELECT FROM RANDOM (DEFAULT), VERY GOOD, GOOD, NORMAL, POOR, AND VERY POOR |
| STRENGTH OF NPCS | VERY WEAK, WEAK, NORMAL (DEFAULT), STRONG, AND VERY STRONG |

FIG.32

FIG.36A
FIG.36B
600
Hello !
Nice !
601
602
Thank you
send
streng
-thening
story
home
race
gacha
600
Hello !
Nice !
Thank you
601
602
send
streng
-thening
story
home
race
gacha

| | |
|---|---|
| PLAYER INFORMATION | PROFILE INFORMATION |
| | FRIEND INFORMATION |
| | PRACTICE-MATCH RELATED INFORMATION |

FIG.41A

| PLAYER INFORMATION |
|---|
| PLAYER ID |
| PLAYER NAME |
| SEX |
| BELONGING CIRCLE |
| REPRESENTATIVE CHARACTER |
| PROFILE CHARACTER |
| COMMENT |
| TEAM RANK |

FIG.41B

| FRIEND INFORMATION | |
|---|---|
| FRIEND NUMBER | PLAYER ID |
| FRIEND 1 | 000 000 000 |
| FRIEND 2 | 202 304 405 |
| FRIEND 3 | 332 400 930 |
| FRIEND 4 | 332 400 930 |
| | |
| FRIEND 29 | 030 445 777 |
| FRIEND 30 | 110 387 001 |

FIG.41C

| | | |
|---|---|---|
| GAME INFORMATION | NURTURED CHARACTER INFORMATION | |
| | TEAM FORMATION INFORMATION | |

FIG.42A

| NURTURED CHARACTER INFORMATION | | | |
|---|---|---|---|
| NURTURED-CHARACTER ID | NURTURED-CHARACTER ID | NURTURED-CHARACTER ID | |
| CHARACTER ID | CHARACTER ID | CHARACTER ID | |
| PARAMETER | PARAMETER | PARAMETER | |
| INHERITANCE INFORMATION | INHERITANCE INFORMATION | INHERITANCE INFORMATION | |

FIG.42B

| TEAM FORMATION INFORMATION | | | |
|---|---|---|---|
| KIND OF RACE | REGISTERED CHARACTER 1 | REGISTERED CHARACTER 2 | REGISTERED CHARACTER 3 |
| SHORT DISTANCE | NURTURED-CHARACTER ID | NURTURED-CHARACTER ID | NURTURED-CHARACTER ID |
| MILE | NURTURED-CHARACTER ID | NURTURED-CHARACTER ID | NURTURED-CHARACTER ID |
| INTERMEDIATE DISTANCE | NURTURED-CHARACTER ID | NURTURED-CHARACTER ID | NURTURED-CHARACTER ID |
| LONG DISTANCE | NURTURED-CHARACTER ID | NURTURED-CHARACTER ID | NURTURED-CHARACTER ID |
| DIRT | NURTURED-CHARACTER ID | NURTURED-CHARACTER ID | NURTURED-CHARACTER ID |

FIG.42C

NON-TRANSITORY COMPUTER READABLE MEDIUM, INFORMATION PROCESSING METHOD, AND GAME DEVICE

CROSS REFERENCE TO RELATED APPLICATIONS

This application is a continuation application of International Application No. PCT/JP2022/041978, filed on Nov. 10, 2022, which claims priority to Japanese Patent Application No. 2021-185166, filed on Nov. 12, 2021, the entire contents of which are incorporated by reference herein.

BACKGROUND ART

Technical Field

The present invention relates to information processing programs, information processing methods, and game devices.

There is a known genre of games called nurturing games that have been around for some time. In a nurturing game, a plurality of kinds of nurturing items are provided, and the player can select one of the kinds of nurturing items and can nurture a character to be nurtured.

For example, Patent Literature 1 discloses a game in which the parameters of a character to be nurtured change on the basis of characters included in a deck by a player. The character nurtured in the nurturing game can be used in battle games in which battles are played against other players or a computer.

CITATION LIST

Patent Literature

Patent Literature 1: JP 6685049 B

SUMMARY OF INVENTION

Technical Problem

Various kinds of parameters are set for a character nurtured in a nurturing game. As the number of parameters increases, it becomes difficult to recognize what kinds of parameters a character should be nurtured to have. In such cases, players have to collect various kinds of information. However, there is a problem that the players' motivation for playing the game will be compromised if it is difficult to obtain suitable information.

It is an object of the present invention to provide an information processing program, an information processing method, and a game device with which it is possible to improve the convenience for players to collect information, thereby alleviating a reduction in the players' motivation for playing a game.

Solution to Problem

In order to solve the problem described above, an information processing program causes a computer to carry out:

processing for storing character information of a character nurtured in a nurturing game, in association with unique information of a player who nurtured the character;

processing for setting at least a plurality of the characters nurtured by other players, as battle characters, on the basis of an operation by a player; and processing for executing a battle game in which the battle characters play a battle by using the character information of the characters set as the battle characters.

The processing for executing the battle game may include processing for determining the places of the battle characters.

The information processing program may further cause the computer to carry out: processing for managing information concerning the execution of the battle game as the battle character by a player other than the player who nurtured the character.

The information processing program may further cause the computer to carry out:

processing for generating posting information that makes it possible to view the character information of the character, on the basis of an operation by the player who nurtured the character;

processing for enabling other players to access the generated posting information; and processing for displaying the character information by accessing the posting information.

The information processing program may further cause the computer to carry out:

processing for providing an information sharing tool that makes it possible to share information among a plurality of players and that makes it possible to post the posting information, and the processing for displaying the character information may be carried out by the information sharing tool.

In order to solve the problem described above, an information processing method is an information processing method that is carried out by a computer, the information processing method including:

processing for storing character information of a character nurtured in a nurturing game, in association with unique information of a player who nurtured the character;

processing for setting at least a plurality of the characters nurtured by other players, as battle characters, on the basis of an operation by a player; and processing for executing a battle game in which the battle characters play a battle by using the character information of the characters set as the battle characters.

In order to solve the problem described above, a game device includes one or more computers, and the computers carry out:

processing for storing character information of a character nurtured in a nurturing game, in association with unique information of a player who nurtured the character;

processing for setting at least a plurality of the characters nurtured by other players, as battle characters, on the basis of an operation by a player; and processing for executing a battle game in which the battle characters play a battle by using the character information of the characters set as the battle characters.

Effects of Disclosure

According to the present invention, by improving the convenience for players to collect information, it is possible to alleviate a reduction in the players' motivation for playing a game.

BRIEF DESCRIPTION OF DRAWINGS

FIG. 6A is a figure for explaining an ability parameter (initial values) table.

FIG. 6B is a figure for explaining an aptitude parameter (initial values) table.

FIG. 6C is a figure for explaining a skill table.

FIG. 6D is a figure for explaining an exclusive-event table.

FIG. 9A is a figure for explaining a support card table.

FIG. 9B is a figure for explaining a support effect table.

FIG. 9C is a figure for explaining a possessed skill table.

FIG. 9D is a figure for explaining a support event table.

FIG. 10 is a first illustration for explaining a character identification information table.

FIG. 11 is a second illustration for explaining the character identification information table.

FIG. 12 is a figure for explaining a selection item table.

FIG. 20 is a figure for explaining an assign/do-not-assign table.

FIG. 21A is a figure for explaining a training level table.

FIG. 21B is a figure for explaining a fixed raising-value (speed) table.

FIG. 21C is a figure for explaining a fixed raising-value table (power).

FIG. 21D is a figure for explaining a bonus addition rate table.

FIG. 22 is a figure for explaining the kinds of events and event classes.

FIG. 23 is a figure for explaining the relationships between the kinds of events and the numbers of turns.

FIG. 26A is a figure for explaining a bonus fixed-value (main character) table.

FIG. 26B is a figure for explaining a bonus additional-value (main character) table.

FIG. 27A is a figure for explaining a fixed raising-value (special training subjects) table.

FIG. 27B is a figure for explaining a bonus raising-value (special training subjects) table.

FIG. 32 is a figure for explaining race conditions.

FIG. 41A is a figure for explaining example player information.

FIG. 41B is a figure for explaining example profile information.

FIG. 41C is a figure for explaining example friend information.

FIG. 42A is a figure for explaining example game information.

FIG. 42B is a figure for explaining example nurtured character information.

FIG. 42C is a figure for explaining example team formation information.

FIG. 59 is a first flowchart for explaining a practice-match setting process at the player terminal.

FIG. 60 is a second flowchart for explaining the practice-match setting process at the player terminal.

FIG. 61 is a third flowchart for explaining the practice-match setting process at the player terminal.

FIG. 62 is a fourth flowchart for explaining the practice-match setting process at the player terminal.

FIG. 63 is a flowchart for explaining a practice-match execution process at the server.

FIG. 64 is a flowchart for explaining a practice-match start process at the player terminal.

FIG. 65 is a first sequence chart for explaining processes at the player terminal and the server, relating to an information sharing function.

FIG. 66 is a flowchart for explaining a circle screen process at the player terminal.

FIG. 67 is a second sequence chart for explaining processes at the player terminal and the server, relating to the information sharing function.

DESCRIPTION OF EMBODIMENTS

An aspect of an embodiment of the present invention will be described below in detail with reference to the accompanying drawings. The numerical values, etc. given in this embodiment are merely examples for facilitating understanding, and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

(Overall Configuration of Information Processing System S)

Figure 1:
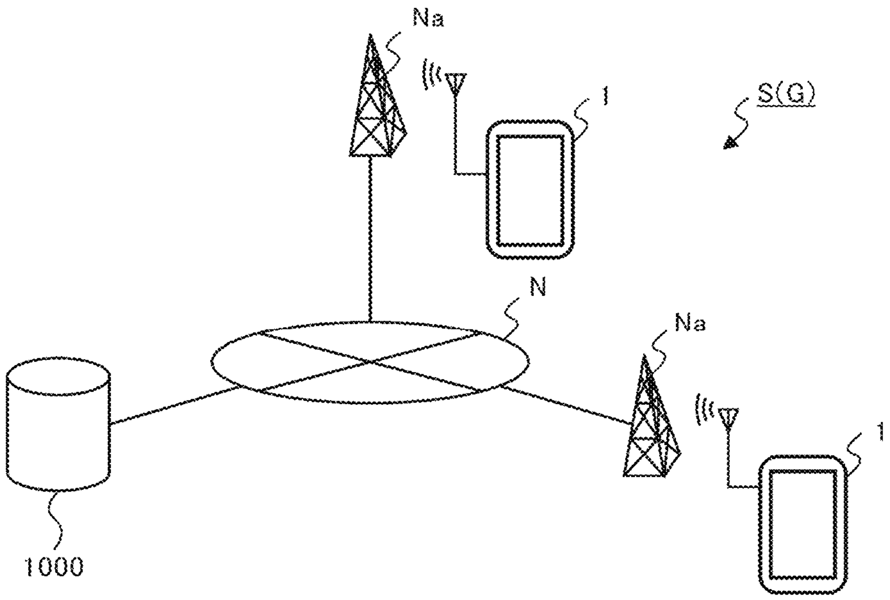
FIG. 1 is an illustration schematically showing the configuration of an information processing system.

FIG. 1 is an explanatory illustration schematically showing the configuration of an information processing system S. The information processing system S is what is called a client-server system including player terminals 1, which function as clients, i.e., as game terminals, a server 1000, and a communication network N having communication base stations Na.

In the information processing system S in this embodiment, the player terminals 1 and the server 1000 function as game devices G. The player terminals 1 and the server 1000 individually share roles for controlling the proceeding of a game, and it becomes possible to proceed with the game through cooperation between the player terminals 1 and the server 1000.

The player terminals 1 can establish communication with the server 1000 via the communication network N. The player terminals 1 include a wide range of electronic appliances that are capable of communicatively connecting to the server 1000 in a wireless or wired manner. Examples of the player terminals 1 include smartphones, mobile phones, tablet devices, personal computers, and game machines. This embodiment will be described in the context of the case where smartphones are used as the player terminals 1.

The server 1000 is communicatively connected to the plurality of player terminals 1. The server 1000 accumulates various kinds of information for each player who plays the game. Furthermore, the server 1000 mainly carries out processing such as updating the accumulated information and allowing the player terminals 1 to download images and various kinds of information on the basis of operations input from the player terminals 1.

The communication base stations Na are connected to the communication network N, and send information to and receive information from the player terminals 1 in a wireless manner. The communication network N is implemented by a mobile phone network, an Internet network, a local area network (LAN), a special circuit, or the like, and realizes wireless or wired communicative connection between the player terminals 1 and the server 1000.

(Hardware Configurations of Player Terminals 1 and Server 1000)

Figure 2A:
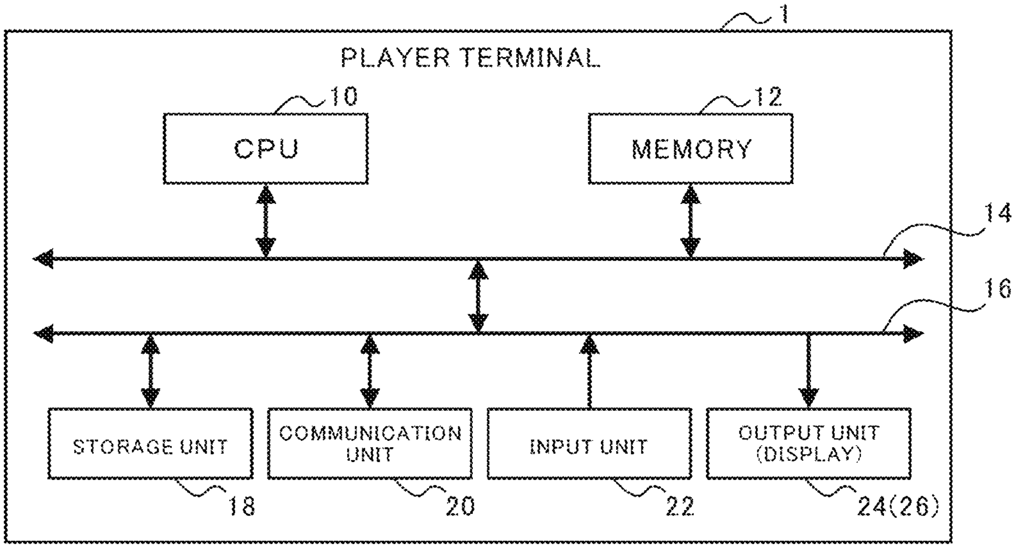
FIG. 2A is a diagram for explaining the hardware configuration of a player terminal.
Figure 2B:
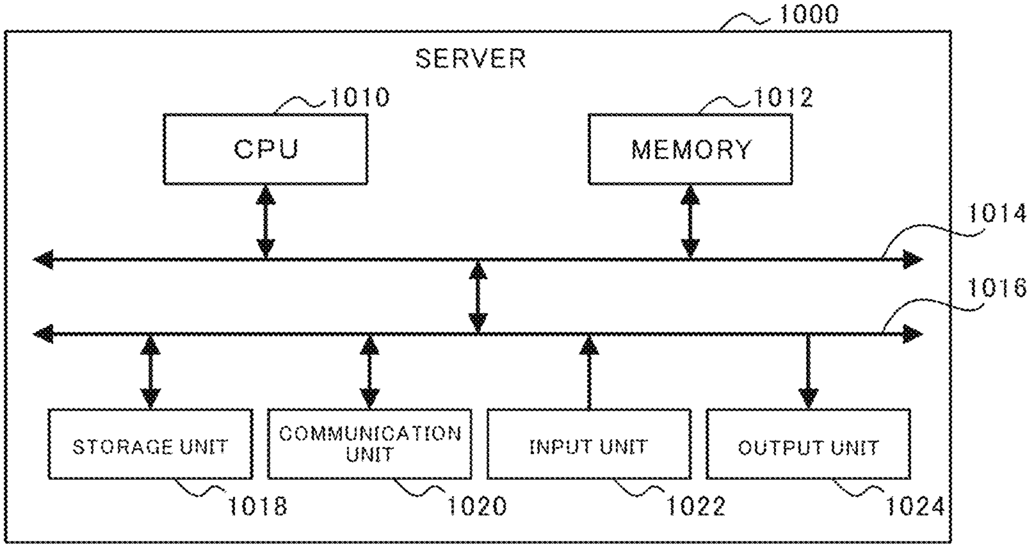
FIG. 2B is a diagram for explaining the hardware configuration of a server.

FIG. 2A is a diagram for explaining the hardware configuration of each of the player terminals 1. Furthermore, FIG. 2B is a diagram for explaining the hardware configuration of the server 1000. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 1000 is configured to include a CPU 1010, a memory 1012, a bus 1014, an input/output interface 1016, a storage unit 1018, a communication unit 1020, an input unit 1022, and an output unit 1024.

Note that the configurations and functions of the CPU 1010, the memory 1012, the bus 1014, the input/output interface 1016, the storage unit 1018, the communication unit 1020, the input unit 1022, and the output unit 1024 of the server 1000 are substantially the same as those of the CPU 10, the memory 12, the bus 14, the input/output interface 16, the storage unit 18, the communication unit 20, the input unit 22, and the output unit 24 of the player terminal 1, respectively. Therefore, the following description will be directed to the hardware configuration of the player terminal 1, while omitting a description of the server 1000.

The CPU 10 runs a program stored in the memory 12 to control the proceeding of the game. The memory 12 is configured of a read only memory (ROM) or a random access memory (RAM), and stores the program and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory such as a dynamic random access memory (DRAM), and stores various kinds of programs and data. In the player terminal 1, the programs and data stored in the storage unit 18 are loaded into the memory 12 (RAM) by the CPU 10.

The communication unit 20 is communicatively connected to one of the communication base stations Na in a wireless manner, and sends information to and receives information from the server 1000 via the communication network N, such as various kinds of data and programs. In the player terminal 1, programs, etc. received from the server 1000 are stored in the memory 12 or the storage unit 18.

The input unit 22 is configured of a unit via which player operations are input (operations are accepted), such as a touch panel, buttons, a keyboard, a mouse, a cross keypad, or an analog controller. Alternatively, the input unit 22 may be a special controller provided at the player terminal 1 or connected (externally connected) to the player terminal 1. Alternatively, the input unit 22 may be configured of an acceleration sensor that detects tilting or movement of the player terminal 1 or a microphone that detects player's voice. That is, examples of the input unit 22 include a wide range of devices that enable the input of player's intents in distinguishable manners.

The output unit 24 is configured to include a display device and a speaker. Note that the output unit 24 may be an appliance connected (externally connected) to the player terminal 1. In this embodiment, the player terminal 1 includes a display 26 as the output unit 24 and includes a touch panel as the input unit 22, the touch panel being provided so as to be stacked on the display 26.

(Game Specifics)

Next, the game provided by the information processing system S and the game devices G in this embodiment will be described. Each player can possess characters acquired through lotteries called gacha, as well as characters distributed from the administration side. Furthermore, each player can possess support cards acquired through lotteries as well as support cards distributed from the administration side.

As will be described later in detail, a nurturing game is provided in the game according to this embodiment. In the nurturing game, each player can nurture a character that is possessed by the player. Furthermore, the nurturing game in this embodiment is designed such that a character is nurtured while letting the character participate in races simulating horse racing.

Figure 3A:
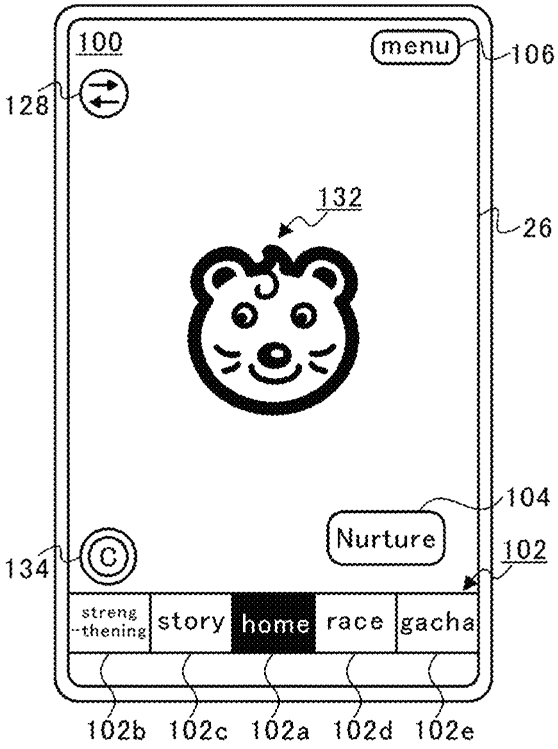
FIG. 3A is an illustration for explaining an example home screen.

FIG. 3A is an illustration for explaining an example home screen 100. When a game application is started at the player terminal 1, the home screen 100 is displayed on the display 26. A menu bar 102 is displayed in a lower part of the home screen 100. In the menu bar 102, a plurality of operating parts that can be operated (tapped) by the player are provided.

Here, the following operating parts are provided in the menu bar 102: a home-screen selection operating part 102*a*; a strengthening-screen selection operating part 102*b*; a story-screen selection operating part 102*c*; a team-stadium-screen selection operating part 102*d*; and a gacha-screen selection operating part 102*e*. Note that in the menu bar 102, the operating part corresponding to the screen displayed on the display 26 is indicated in a highlighted manner so that the screen displayed can be identified.

When the home-screen selection operating part 102*a* is tapped, the home screen 100 shown in FIG. 3A is displayed on the display 26.

When the strengthening-screen selection operating part 102*b* is tapped, a strengthening screen, which is not shown, is displayed. In the strengthening screen, the player can strengthen characters or support cards that are possessed by the player. By strengthening characters or support cards, the player can advance the levels set for the characters or support cards. Each character or support card has various kinds of parameters set thereto, and the parameters are raised as the level becomes advanced. By raising the parameters of a character or a support card, it becomes possible for the player to nurture a character having a stronger status in the nurturing game.

When the story-screen selection operating part 102*c* is tapped, a story screen, which is not shown, is displayed. Here, story images are provided for individual characters that appear in the game. The player can view the story screen while selecting a character and a story image.

When the team-stadium-screen selection operating part 102*d* is tapped, a team stadium screen, which will be described later, is displayed. In the team stadium screen, the player can play a team competition game in which a battle is played between a team formed by the player himself or herself and a team of another player selected by a computer. The team competition game is designed such that the player competes with another player for ranking.

When a gacha-screen selection operating part 102*e* is tapped, a gacha screen, which is not shown, is displayed. In the gacha screen, the player can perform what is called a gacha lottery, with which the player can acquire a character or a support card through a lottery by consuming an in-game currency.

Furthermore, in the home screen 100, a nurturing-game operating part 104 is provided above the menu bar 102. When the nurturing-game operating part 104 is tapped, a nurturing game screen is displayed, and a nurturing game, which will be described later, is started. The nurturing game is broadly classified into a preparation stage and a nurturing stage. First, in the preparation stage, the player selects one of the characters possessed by the player himself or herself and sets the character as a main character, which is the character to be nurtured. Furthermore, in the preparation stage, the player sets support cards to be used when nurturing the main character.

When the setting of the main character and the support cards is finished, a transition from the preparation stage to the nurturing stage occurs, and a game for nurturing the main character is started. The player can possess the character nurtured in the nurturing game as a nurtured character. As mentioned earlier, the player can include the possessed nurtured character in a team and can use the possessed nurtured character in the team competition game.

As described above, the main aims of the game in this embodiment are to nurture a character to be nurtured through the nurturing game and to advance the ranking for the team competition game by using the nurtured character.

Furthermore, this embodiment is provided with a function for sharing a character to be nurtured or support cards among players as well as a function for sharing information among a plurality of players. The player can set a character to be nurtured and support cards that can be used by another player in the nurturing game. Specifically, as shown in FIG. 3A, a setting operating part 106 is provided in an upper right part of the home screen 100. When the setting operating part 106 is tapped, an option setting screen 110 is displayed.

Figure 3B:
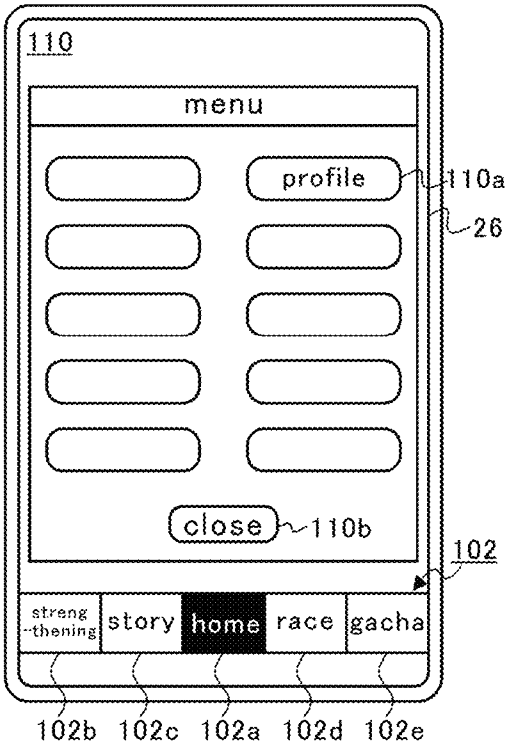
FIG. 3B is an illustration for explaining an example option setting screen.

FIG. 3B is an illustration for explaining an example of the option setting screen 110. The option setting screen 110 is a screen that makes it possible to confirm and set various kinds of information. The option setting screen 110 has a plurality of operating parts provided therein, and when one of the operating parts is tapped, it becomes possible to confirm or set information corresponding to the operating part.

The operating parts in the option setting screen 110 include a profile setting operating part 110*a* and a close operating part 110*b*. When the close operating part 110*b* is tapped, the option setting screen 110 is closed, and the home screen 100 is displayed. When the profile setting operating part 110*a* is tapped, a profile setting screen 120 is displayed.

Figure 3C:
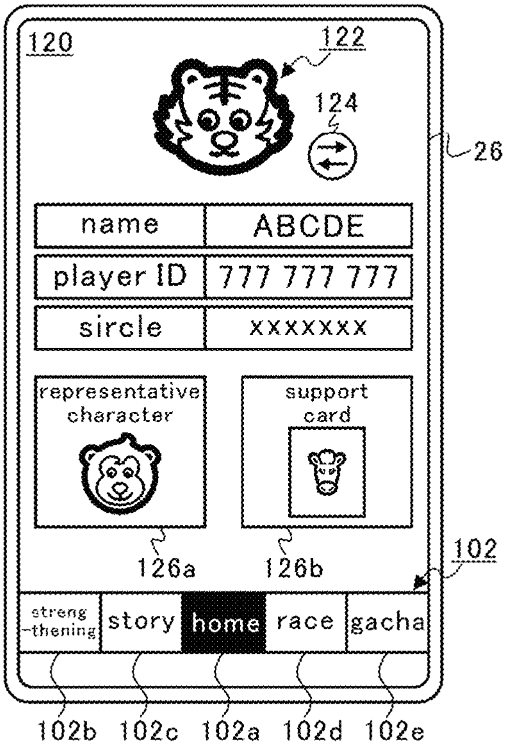
FIG. 3C is an illustration for explaining an example profile setting screen.

FIG. 3C is an illustration for explaining an example of the profile setting screen 120. In the profile setting screen 120, the player can confirm or set profile information of the player himself or herself. The profile information includes a profile character, a player name, a player ID, a circle to which the player belongs, a representative character, and rental cards.

The profile character functions as a character that is displayed when information concerning the player is viewed by other players. For example, the profile character is displayed when a circle function, which provides a field for sharing information with other players, is being used. In the profile setting screen 120, a profile character image 122 that is currently set is displayed. A change button 124 is provided in the proximity of the profile character image 122. When the change button 124 is tapped, a profile character changing screen, which is not shown, is displayed. The player can change the profile character in the profile character changing screen.

Furthermore, in the profile setting screen 120, a player name set by the player, a player ID assigned to the player, and the name of the circle to which the player belongs are displayed. Furthermore, in the profile setting screen 120, a representative-character setting operating part 126*a* and a rental-card setting operating part 126*b* are provided.

When the representative-character setting operating part 126*a* is tapped, a representative-character setting screen, which is not shown, is displayed. The player can set one of the nurtured characters nurtured by the player himself or herself as a representative character in the representative-character setting screen. In the representative-character setting operating part 126*a*, an icon image indicating the currently set representative character is displayed. As will be described later in detail, the representative character can be used as a character to inherit in nurturing games that are played by other players.

When the rental-card setting operating part 126*b* is tapped, a rental-card setting screen, which is not shown, is displayed. In the rental-card setting screen, the player can set one of the support cards possessed by the player himself or herself as a rental card. In the rental-card setting operating part 126*b*, an icon image indicating the currently set rental card is displayed. As mentioned earlier, the support card set as a rental card can be used in nurturing games that are played by other players.

Although not described in detail, when a change is made to the setting of the profile information in the profile setting screen 120, setting change information is transmitted to the server 1000. In the server 1000, profile information is saved on a per-player basis.

Furthermore, as shown in FIG. 3A, a setting icon 128 is displayed in the home screen 100. When the setting icon 128 is tapped, a home setting screen 130 is displayed.

Figure 3D:
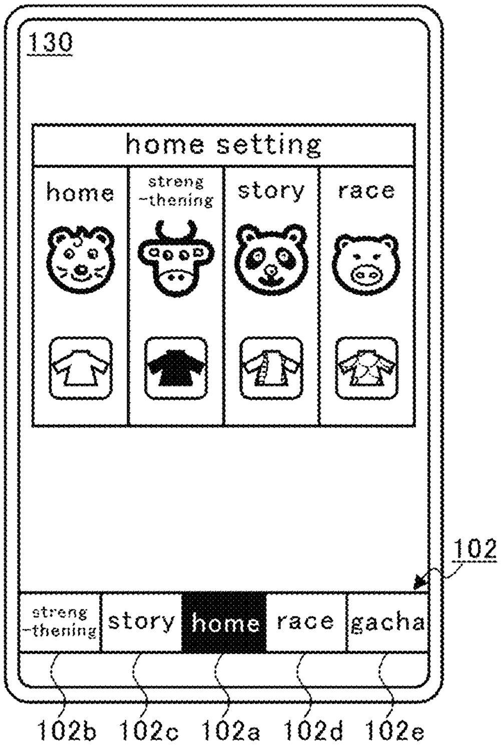
FIG. 3D is an illustration for explaining an example piece-of-music playing-condition setting screen.

FIG. 3D is an illustration for explaining an example of the home setting screen 130. In the home setting screen 130, the player can set home-screen setting characters 132 that are displayed in the home screen 100. The player can set four home-screen setting characters 132 that are displayed in the home screen 100.

Although not shown, when a flick operation in the horizontal direction is input in the home screen 100, what is displayed in the screen displayed on the display 26, i.e., the home screen 100, is switched. In the home screen 100, the four currently set home-screen setting characters 132 are displayed. The home-screen setting characters 132 have assigned thereto functions as the individual operating parts displayed in the menu bar 102. Therefore, when one of the home-screen setting characters 132 displayed in the home screen 100 is tapped, the screen is switched like when one of the operating parts in the menu bar 102 is tapped.

In the home setting screen 130, character images individually corresponding to the four currently set home-screen setting characters 132, as well as corresponding operating parts, are displayed in a distinguishable manner. When one of the character images displayed in the home setting screen 130 is tapped, a character selection screen, which is not shown, is displayed. The player can select one of the home-screen setting characters 132 in the character selection screen. Furthermore, the player can set a costume for the home-screen setting character 132 in the home setting screen 130.

Furthermore, as shown in FIG. 3A, a circle icon 134 is displayed in the home screen 100. When the circle icon 134 is tapped, a circle screen is displayed. In the circle screen, the player can exchange information with other players belonging to the same circle. The circle function for realizing information exchange with other players will be described later.

When the nurturing-game operating part 104 is tapped in the home screen 100, a nurturing game screen is displayed, and the nurturing game is started. The nurturing game will be described below in detail.

(Nurturing Game)

Figure 4:
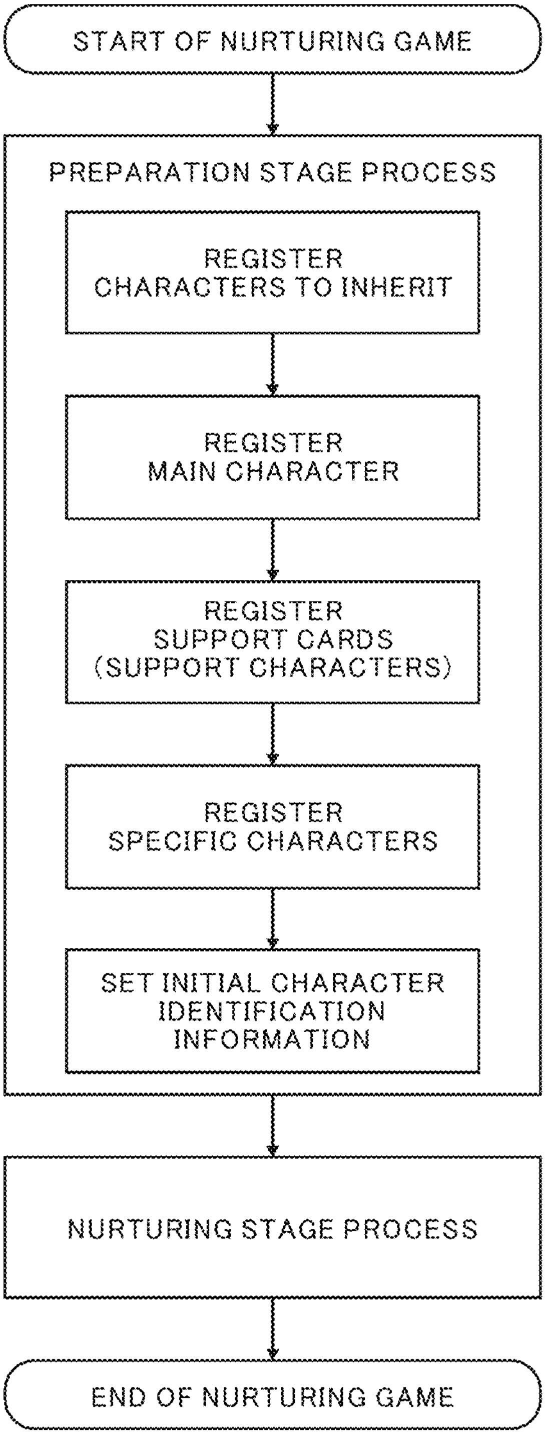
FIG. 4 is a figure for explaining a rough flow of a nurturing game.

FIG. 4 is a figure for explaining a rough flow of the nurturing game. The nurturing game is broadly classified into a setting game and a main nurturing game. As will be described later, the main nurturing game is a game in which one main character selected from among the characters possessed by the player is nurtured as a character to be nurtured.

Furthermore, the setting game is a game in which the player registers characters to inherit, a main character, and support cards and that corresponds to the preparation stage of the nurturing game. In the following, processing that is carried out in the setting game will be referred to as a preparation stage process, and processing that is carried out in the main nurturing game will be referred to as a nurturing stage process. Here, in order to facilitate understanding, the rough flows in the preparation stage process and the nurturing stage process will be described first.

<Preparation Stage Process>

In the preparation stage process, registration of characters to inherit, registration of a main character, registration of support cards, registration of specific characters, and setting of initial character identification information are mainly performed. Note that the support cards serve as aids for nurturing the main character. Each of the support cards necessarily has one character associated therewith, and the character associated with the support card, registered in the preparation stage process, aids nurturing of the main character. Characters associated with support cards will hereinafter be referred to as support characters.

<Registration of Main Character>

When the nurturing-game operating part 104 is tapped by the player in the home screen 100, a scenario selection screen, which is not shown, is displayed. In this embodiment, a plurality of scenarios for the main nurturing game are provided. Each of the scenarios for the main nurturing game has set therein a final goal, goals in the middle of the game, etc., and the player has to sequentially clear the set goals. The individual goals, the periods before accomplishing the goals, etc. vary among the individual scenarios. The player can select one of the plurality of scenarios in the scenario selection screen. Here, the case where a prescribed scenario is selected will be described.

Figure 5A:
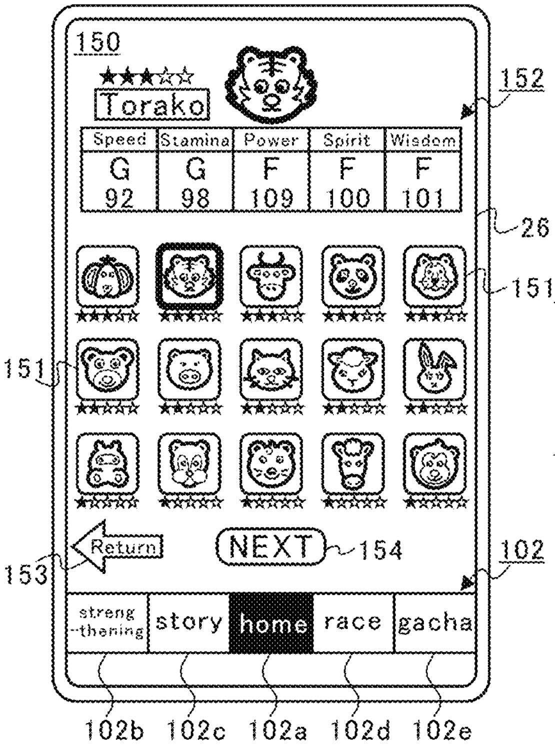
FIG. 5A is an illustration for explaining a main-character selection screen.

FIG. 5A is an illustration for explaining a main-character selection screen 150. In a central part of the main-character selection screen 150, a plurality of character icons 151 are displayed to display a list of characters possessed by the player. Furthermore, a parameter displaying part 152 is displayed in an upper part of the main-character selection screen 150. Furthermore, a return operating part 153 labeled as “Return” and a next operating part 154 labeled as “NEXT” are displayed in a lower part of the main-character selection screen 150.

In this embodiment, initial values of ability parameters are set for each character, and initial values of the ability parameters of the character corresponding to the character icon 151 selected by the player are displayed in the form of numerical values in the parameter displaying part 152. In this embodiment, greater numerical values of ability parameters indicate higher abilities.

FIG. 6A is a figure for explaining an ability parameter (initial value) table. In this embodiment, as shown in FIG. 6A, initial values of ability parameters for each character are stored in the ability parameter (initial value) table. Initial values of ability parameters are displayed in the parameter displaying part 152 on the basis of the initial values of ability parameters stored in the ability parameter (initial value) table.

In this embodiment, initial values of ability parameters are set individually for a plurality of kinds of abilities for each character. Specifically, the following ability parameters are provided: a speed ability parameter labeled as “Speed” in the parameter displaying part 152; a stamina ability parameter labeled as “Stamina” in the parameter displaying part 152; a power ability parameter labeled as “Power” in the parameter displaying part 152; a spirit ability parameter labeled as “Spirit” in the parameter displaying part 152; and a wisdom ability parameter labeled as “Wisdom” in the parameter displaying part 152.

Note that the initial values of ability parameters for each character may be raised by player operations or the like. For example, five levels may be provided for each character, and the player may be allowed to advance the level of the character by consuming an in-game currency or a prescribed item. In this case, the initial values of ability parameters should be raised as the character level becomes advanced. Note that the player can raise the values of ability parameters in the main nurturing game. That is, the aim of the main nurturing game is to nurture a character having greater numerical values of ability parameters.

Furthermore, in this embodiment, aptitude parameters (initial values) are set for each character. FIG. 6B is a figure for explaining an aptitude parameter (initial value) table. In this embodiment, as shown in FIG. 6, initial values of aptitude parameters for each character are stored in the aptitude parameter (initial value) table. The initial values of aptitude parameters are each set to one of seven levels in the form of alphabetic characters A to G. A indicates the highest aptitude, while G indicates the lowest aptitude. Note that the initial values of aptitude parameters may be displayed in the parameter displaying part 152 on the basis of the initial values of aptitude parameters stored in the aptitude parameter (initial value) table.

In this embodiment, initial values of aptitude parameters are set individually for a plurality of kinds of aptitudes for each character. Specifically, the following aptitude parameters are provided: aptitude parameters concerning individual track aptitudes for turf and dirt; aptitude parameters for individual distance aptitudes for short distance, mile, intermediate distance, and long distance; and aptitude parameters for individual running style aptitudes for early speed, front running, stretch running, and closing.

Note that it may be allowed to raise the initial values of aptitude parameters for each character by consuming an in-game currency. Furthermore, the values of aptitude parameters may be changed in the main nurturing game. Note that there may be cases where an aptitude parameter is set to S, which indicates an aptitude higher than A.

Figure 5B:
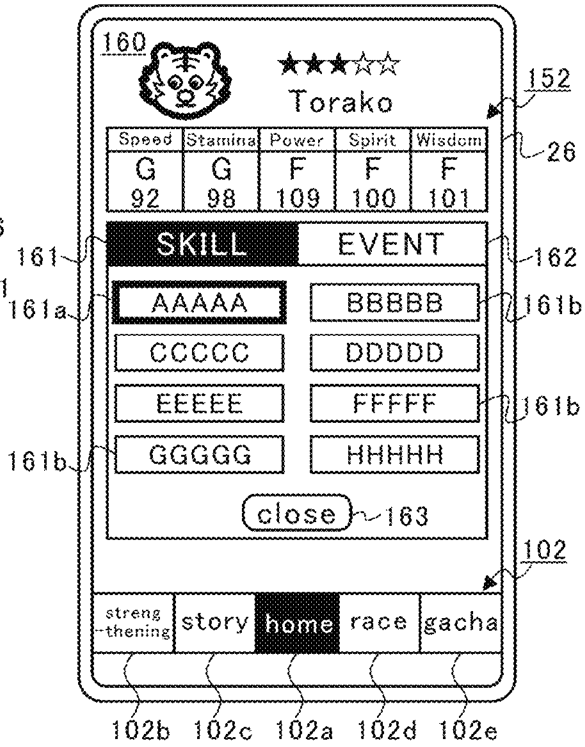
FIG. 5B is a first illustration for explaining a character detail screen.
Figure 5C:
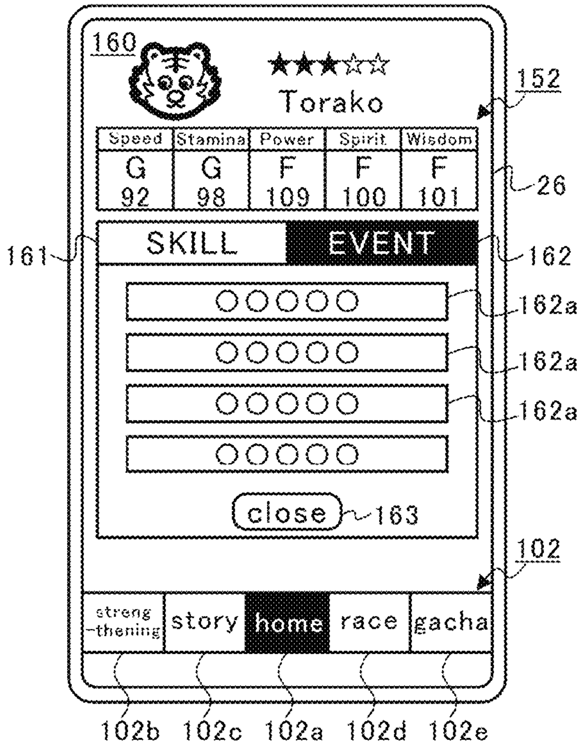
FIG. 5C is a second illustration for explaining the character detail screen.

FIG. 5B is a first illustration for explaining a character detail screen 160. Furthermore, FIG. 5C is a second illustration for explaining the character detail screen 160. When one of the character icons 151 in the main-character selection screen 150 is held, the character detail screen 160 is displayed on the display 26. In the character detail screen 160, details of the abilities of the character corresponding to the character icon 151 held in the main-character selection screen 150 are displayed.

In a central part of the character detail screen 160, a skill operating part 161 and an event operating part 162 are displayed. As shown in FIG. 5B, when the character detail screen 160 is displayed, the skill operating part 161 is initially displayed in a highlighted manner, and skills provided for each character are displayed. A skill refers to an ability that may be invoked in the case where a prescribed condition is satisfied during the execution of individual racing or team racing, which will be described later. A race proceeds advantageously for each character when a skill is invoked.

FIG. 6C is a figure for explaining a skill table. As shown in FIG. 6C, skills of each character possessed by the player are stored in the skill table. As shown in FIG. 5B, skills are displayed in the character detail screen 160 on the basis of the skills stored in the skill table. Note that a skill is not invoked just by being possessed, and it becomes possible for a skill to be invoked for the first time when the skill is acquired. In the following, a skill in the state where a character is able to invoke that skill is referred to as an acquired skill.

From the beginning of the main nurturing game, each character has one acquired skill 161*a* set thereto. Furthermore, apart from the acquired skill 161*a*, each character has a plurality of possessed skills 161*b* set thereto. The possessed skills 161*b* are skills that can be acquired after the start of the main nurturing game by consuming skill points, which will be described later. That is, the possessed skills 161*b* may become acquired skills 161*a* in exchange for skill points.

In this embodiment, each skill corresponding to a double circle symbol in the skill table shown in FIG. 6C is displayed as an acquired skill 161*a* in the character detail screen 160 in FIG. 5B. Furthermore, each skill corresponding to a single circle symbol in the skill table shown in FIG. 6C is displayed as a possessed skill 161*b* in the character detail screen 160 in FIG. 5B. In this embodiment, as shown in the character detail screen 160 in FIG. 5B, the acquired skill 161*a* is displayed in a highlighted manner so that the acquired skill 161*a* and the possessed skills 161*b* can be readily distinguished from each other.

Note that although the case where one acquired skill 161*a* and seven possessed skills 161*b* are displayed as skills provided for each character is shown in FIG. 5B in the context of this embodiment, there is no limitation thereto. For example, the number of acquired skills 161*a* and the number of possessed skills 161*b* may vary among individual characters. Furthermore, the number of acquired characters 161*a* and the number of possessed skills 161*b* of each character may be increased, for example, when the character levels is advanced or when an in-game currency or an item is consumed.

Furthermore, when the event operating part 162 in the character detail screen 160 is tapped by the player, as shown in FIG. 5C, the content of the character detail screen 160 is switched, and exclusive events 162*a* provided for each character are displayed. In this case, as shown in FIG. 5C, the event operating part 162 is displayed in a highlighted manner. An exclusive event 162*a* occurs in the case where a prescribed condition is satisfied in the main nurturing game, with which a story relating to a character that appear in the nurturing game is displayed, or the value of an ability character is changed.

FIG. 6D is a figure for explaining an exclusive-event table. As shown in FIG. 6D, in the exclusive-event table, exclusive events 162*a* are stored for each character possessed by the player. Furthermore, as shown in FIG. 5C, exclusive events 162*a* are displayed in the character detail screen 160 on the basis of the exclusive events 162*a* stored in the exclusive-event table. Note that the exclusive events 162*a* may include hint events that make it possible to possess or acquire skills, ability events that increase or decrease the numerical values of ability parameters of a character, etc.

Note that the exclusive events 162*a* displayed in the character detail screen 160 shown in FIG. 5C may be arranged such that all the exclusive events 162*a* are executed during the execution of the main nurturing game, such that at least some of the exclusive events 162*a* are executed during the execution of the main nurturing game, or such that none of the exclusive events 162*a* are executed during the execution of the main nurturing game in the case where the prescribed condition is not satisfied. Furthermore, the number of exclusive events 162*a* provided for each character may be increased, for example, when the character level is advanced, when an in-game currency or an item is consumed, or the like. Furthermore, exclusive events 162*a* that are not displayed as exclusive events 162*a* may be executed during the main nurturing game in the case where the prescribed condition is satisfied.

Furthermore, as shown in FIGS. 5B and 5C, in a lower part of the character detail screen 160, a close operating part 163 labeled as "close" is displayed. When the close operating part 163 of the character detail screen 160 is tapped, the displaying of the character detail screen 160 is terminated, and the main-character selection screen 150 is displayed on the display 26.

Furthermore, when the return operating part 153 is tapped in the main-character selection screen 150 shown in FIG. 5A, the home screen 100 shown in FIG. 3A is displayed on the display 26. Furthermore, when the next operating part 154 is tapped in the main-character selection screen 150 shown in FIG. 5A, the selected character is set as the main character, and a character-to-inherit selection screen 170 is displayed on the display 26.

<Registration of Characters to Inherit>

Figure 7A:
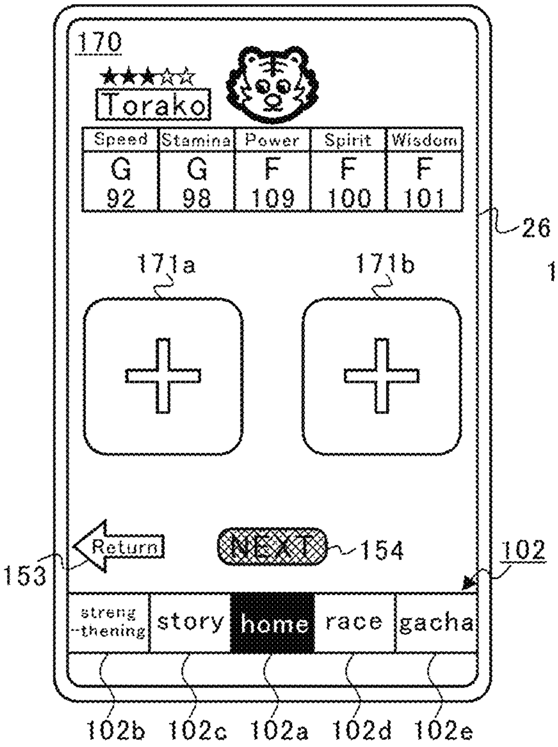
FIG. 7A is a first illustration for explaining a character-to-inherit selection screen.
Figure 7B:
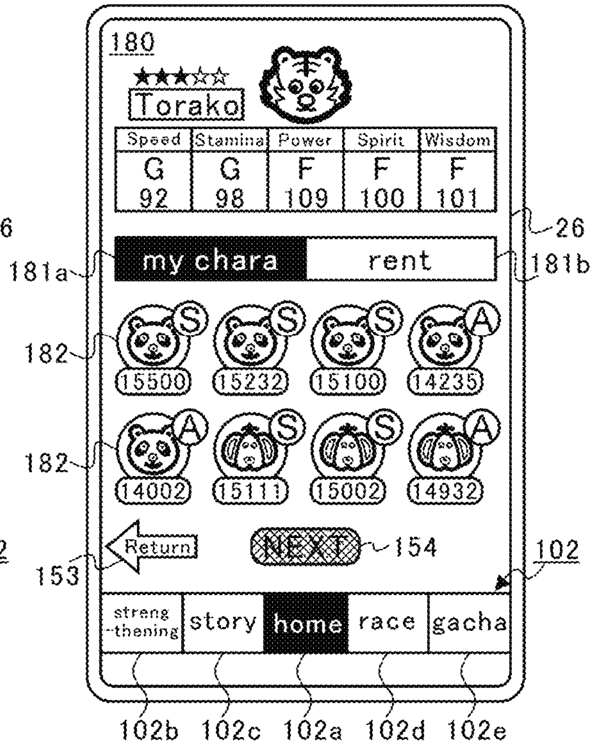
FIG. 7B is an illustration for explaining a nurtured-character list screen.
Figure 7C:
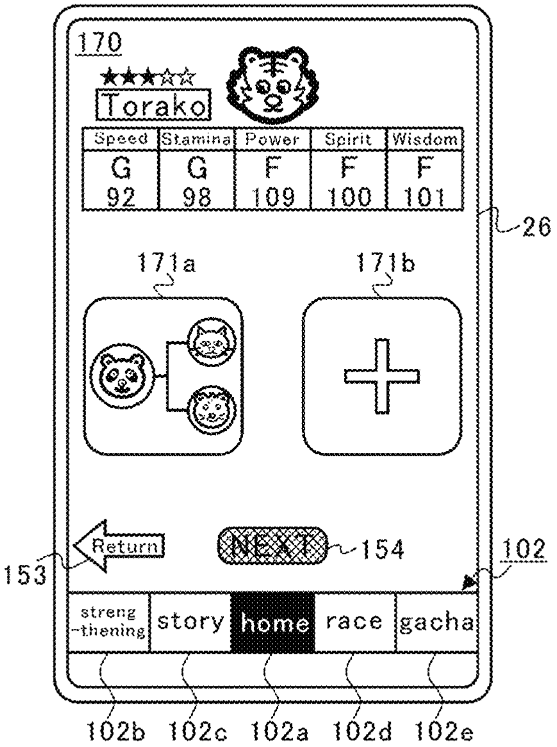
FIG. 7C is a second illustration for explaining the character-to-inherit selection screen.
Figure 7D:
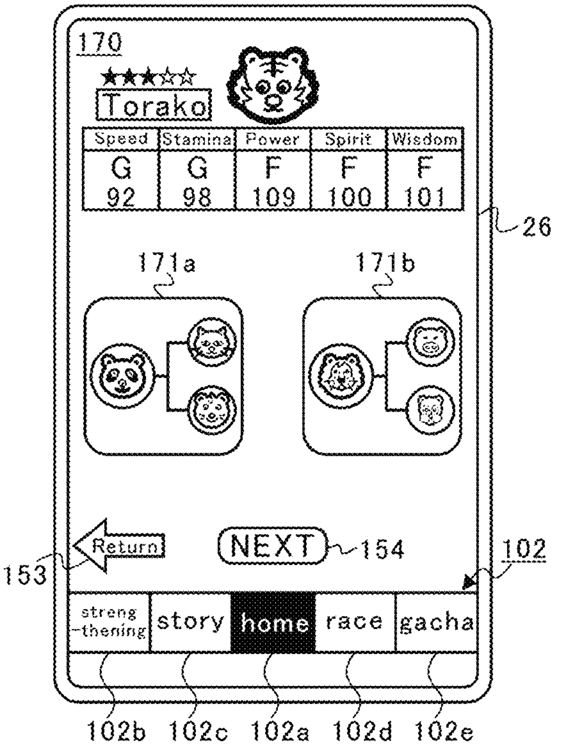
FIG. 7D is a third illustration for explaining the character-to-inherit selection screen.

FIG. 7A is a first illustration for explaining a character-to-inherit selection screen 170. FIG. 7B is an illustration for explaining a nurtured-character list screen 180. FIG. 7C is a second illustration for explaining the character-to-inherit selection screen 170. FIG. 7D is a third illustration for explaining the character-to-inherit selection screen 170. The character-to-inherit selection screen 170 is a screen for the player to register characters to inherit. A character to inherit refers to a character whose ability values, skills, etc. are to be inherited by the main character. The player can select and register two characters to inherit from among nurtured characters possessed by the player himself or herself or representative characters of other players registered as friends, such as followers.

In the character-to-inherit selection screen 170, a first character-to-inherit selection area 171*a* and a second character-to-inherit selection area 171*b* are provided. Upon a screen transition from the main-character selection screen 150 to the character-to-inherit selection screen 170, as shown in FIG. 7A, the first character-to-inherit selection area 171*a* and the second character-to-inherit selection area 171*b* are displayed as being blank.

When the first character-to-inherit selection area 171*a* or the second character-to-inherit selection area 171*b* is tapped, the nurtured-character list screen 180 shown in FIG. 7B is displayed. In the nurtured-character list screen 180, a my character tab 181*a* and a rental tab 181*b* are provided. Furthermore, a nurtured-character-list display area is provided under the my character tab 181*a* and the rental tab 181*b*. Nurtured-character icons 182 are displayed in the nurtured-character-list display area.

In the state where the my character tab 181*a* is selected, as shown in FIG. 7B, nurtured-character icons 182*a* corresponding to the nurtured characters possessed by the player himself or herself are displayed. Furthermore, although not shown, in the state where the rental tab 181*b* is selected, representative characters of friends, i.e., nurtured-character icons 182 corresponding to nurtured characters nurtured by friends are displayed. When one of the nurtured-character icons 182 is held, detailed information concerning the nurtured character corresponding to the nurtured-character icon 182 is displayed.

Furthermore, when one of the nurtured-character icons 182 is tapped, the nurtured character corresponding to the nurtured-character icon 182 becomes tentatively selected. Furthermore, when one of the nurtured-character icons 182 is tapped, as shown in FIG. 7C, the character-to-inherit selection screen 170 is displayed. At this time, for example, in the case where the first character-to-inherit selection area 171*a* is tapped, the nurtured-character list screen 180 is displayed, and one of the nurtured-character icons 182 is tapped in the nurtured-character list screen 180, the image indicating the tentatively selected nurtured character is displayed in the first character-to-inherit selection area 171*a*. Furthermore, information concerning the characters to inherit that were used at the time of nurturing is stored in association with the nurtured character. In the first character-to-inherit selection area 171*a*, the information concerning the characters to inherit that were used when nurturing the nurtured character is displayed.

In this state, for example, when the second character-to-inherit selection area 171*b* is tapped, the nurtured-character list screen 180 is displayed, and one of the nurtured-character icons 182 is tapped in the nurtured-character list screen 180, as shown in FIG. 7D, the image indicating the tentatively selected nurtured character is displayed in the second character-to-inherit selection area 171*b*.

When two nurtured characters are tentatively selected, the next operating part 154 provided in the character-to-inherit selection screen 170 becomes enabled. When the next operating part 154 that has become enabled is tapped, the tentatively selected nurtured characters are registered as characters to inherit, and a support-card setting screen 190, which will be described later, is displayed.

Note that the player has to necessarily select two nurtured characters as characters to inherit in the character-to-inherit selection screen 170. In the case where two characters to inherit are not tentatively selected, as shown in FIGS. 7A and 7C, the next operating part 154 is grayed out, which prohibits player operations from being accepted. Furthermore, the return operating part 153 is provided in the character-to-inherit selection screen 170, and the main-character selection screen 150 is displayed when the return operating part 153 is tapped.

<Registration of Support Cards>

Figure 8A:
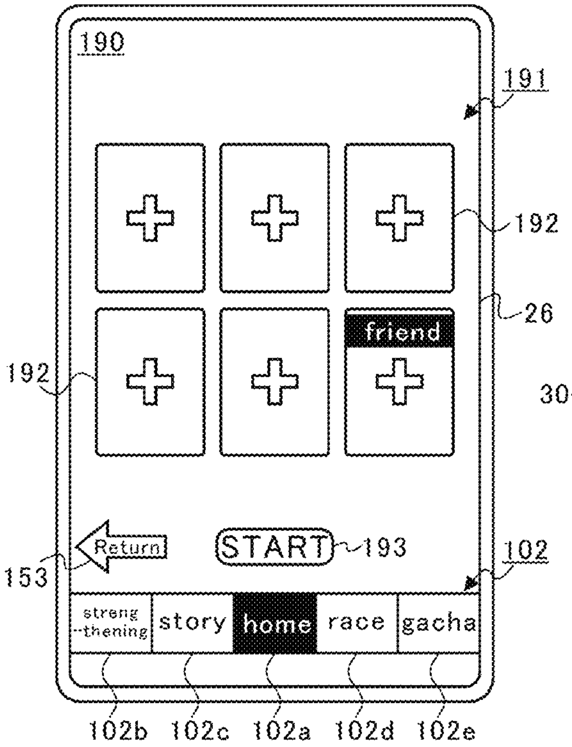
FIG. 8A is a first illustration for explaining a support-card setting screen.

FIG. 8A is a first illustration for explaining a support-card setting screen 190. When two characters-to-inherit have been registered in the character-to-inherit selection screen 170, the support-card setting screen 190 shown in FIG. 8 is displayed. A support-card display area 191 is provided in a central part of the support-card setting screen 190. The support-card display area 191 includes a plurality of support-card display areas 192. Furthermore, in a lower part of the support-card setting screen 190, a return operating part 153 labeled as "Return" and a start operating part 193 labeled as "START" are displayed.

In the support-card display area 191, a plurality of (six here) support-card display areas 192 are displayed. The same number of support-card display areas 192 as the number of support cards that can be set by the player are displayed. Note that the support-card display areas 192 are initially displayed as being blank when the support-card setting screen 190 is displayed.

In this embodiment, the player can set six kinds of support cards. Note that some (e.g., five kinds) among the six kinds that can be set by the player can be selected from the support cards possessed by the player. Furthermore, other some (e.g., one kind) among the six kinds that can be set by the player can be selected from the support cards set as rental cards by other players such as friends.

Figure 8B:
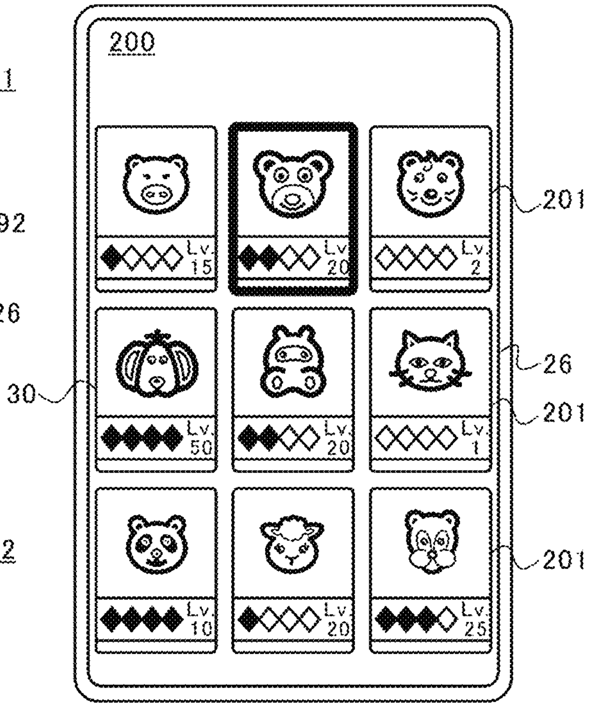
FIG. 8B is an illustration for explaining a support-card selection screen.

FIG. 8B is an illustration for explaining a support-card selection screen 200. When one of the support-card display areas 192 (except the support-card display area 192 displayed at the lower right) is tapped in the support-card setting screen 190 in FIG. 8A, the support-card selection screen 200 shown in FIG. 8B is displayed on the display 26. In the support-card selection screen 200, a list of card icons 201 corresponding to the support cards possessed by the player is displayed. The player can select a support card by tapping one of the card icons 201 displayed in the support-card selection screen 200.

Note that although not shown, when the support-card display area 192 displayed at the lower right in the support-card setting screen 190 is tapped, support cards set as rental cards by friends or by players extracted on the basis of a prescribed condition, such as a lottery, are displayed in the support-card selection screen 200. At this time, the player can select a support card of a friend by tapping one of the support cards displayed in the support-card selection screen 200. As described above, the player can use support cards possessed by other players in the nurturing game.

FIG. 9A is an illustration for explaining a support card table. As shown in FIG. 9A, in the support card table, the kinds of support characters (i.e., character IDs), rarities, levels, and favorite kinds of training are stored for individual types of support cards (i.e., support card IDs) possessed by the player. The support characters correspond to the types of support cards one by one. That is, each support card ID necessarily has one character ID associated therewith. In other words, each support card necessarily corresponds to one support character.

In this embodiment, rarities are set for individual support cards. Three levels, namely, R (rare), SR (super rare), and SSR (super special rare), are provided as the rarities. R indicates that the lowest rarity is set, and SSR indicates that the highest rarity is set. In this embodiment, support cards having higher rarities tend to exhibit greater support effects, which will be described later. Furthermore, in this embodiment, the numbers of possessed skills and the numbers of support events, which will be described later, tend to be greater with support cards having higher rarities.

As the levels of support cards, 50 levels, namely, level 1 to level 50, are provided. The player can advance the levels of support cards, and the levels advanced by the player are stored for individual support cards. Note that it is possible to advance the levels of support cards by using an in-game currency, items, or the like. Note that an upper limit is set for the level of each support card depending on the rarity.

For example, level 20 is defined as an upper limit for support cards with the rarity R, level 25 is defined as an upper limit for support cards with the rarity SR, and level 30 is defined as an upper limit for support cards with the rarity SSR.

Note that the level upper limits can be progressively raised in the case where prescribed conditions are satisfied. For example, the upper limit for support cards with the rarity R can be raised up to level 40 at most, the upper limit for support cards with the rarity SR can be raised up to level 45 at most, and the upper limit for support cards with the rarity SSR can be raised up to level 50 at most.

FIG. 9B is a figure for explaining a support effect table. As shown in FIG. 9B, in the support effect table, support effects are stored for the individual kinds of support cards possessed by the player.

Support effects raise various kinds of statuses in the main nurturing game. Support cards have a plurality of kinds of support effects. Examples kinds of support effects include physical energy, speed, stamina, power, spirit, and wisdom.

FIG. 9C is a figure for explaining a possessed skill table. As shown in FIG. 9C, in the possessed skill table, possessed skills are set for the individual support cards possessed by the player. In this embodiment, possessed skills are set for individual support cards such that the character set by the player as the main character possesses the possessed skills. It becomes possible for the main character selected by the player, or another player promoted to a team member, which will be described later, to acquire each of the possessed skills set for the individual support cards when a hint event occurs during the main nurturing game.

FIG. 9D is a figure for explaining a support event table. As shown in FIG. 9D, in the support event table, support events that may occur are stored for the individual support cards possessed by the player. Support events refer to events that may occur during the execution of the main nurturing game. In the case where a support event has occurred, there are cases where the value of one of the various kinds of statuses in the main nurturing game increases or decreases.

For example, a support event that occurs may be determined depending on the number of turns, or a support event that occurs may be determined through a prescribed lottery. Furthermore, a plurality of support events that occur may be selected for one turn. In either case, it suffices to determine a support event that occurs according to a prescribed determination method set in advance.

Figure 8C:
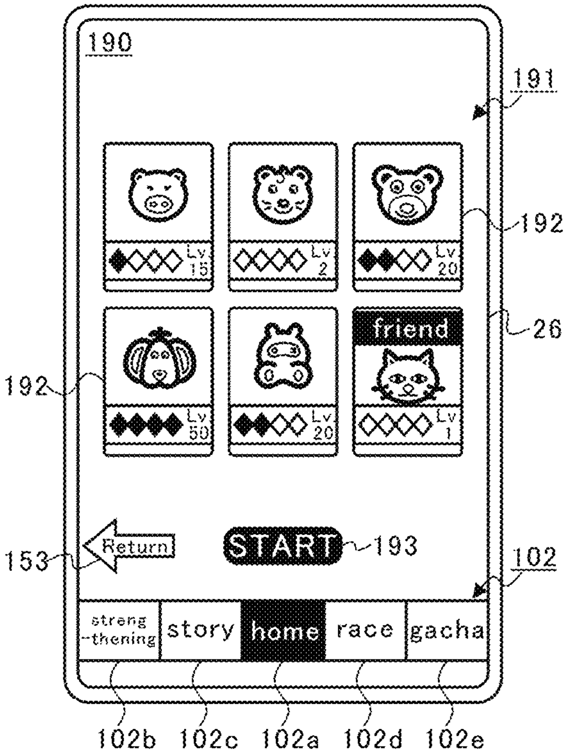
FIG. 8C is a second illustration for explaining the support-card setting screen.

FIG. 8C is a second illustration for explaining the support-card setting screen 190. In this embodiment, when all the six support cards have been selected, as shown in FIG. 8C, it becomes possible to operate the start operating part 193. Meanwhile, in the case where all the six support cards have not been selected, as shown in FIG. 8A, it is prohibited to operate the start operating part 193.

Note that when the return operating part 153 is operated in the support-card setting screen 190, the character-to-inherit selection screen 170 shown in FIG. 7D is displayed on the display 26. Furthermore, as shown in FIG. 8C, when the start operating part 193 is tapped in the support-card setting screen 190, the selected support cards are registered, and a game screen 210 (FIG. 13A) is displayed on the display 26.

<Registration of Specific Characters>

When a main character, characters to inherit, and support cards have been registered, as described above, specific characters are registered. In this embodiment, four kinds of characters are set in advance as specific characters.

FIG. 10 is a first figure for explaining a character identification information table. FIG. 11 is a second figure for explaining the character identification information table. FIG. 10 shows the case where "character C" is registered as the main character and "character E", "character I", "character L", "character M", "character Q", and "character T" are registered as the support characters. Furthermore, FIG. 11 shows the case where "character F" is registered as the main character and "character E", "character J", "character L", "character M", "character Q", and "character T" are registered as the support characters.

Note that in this embodiment, there is a restriction that there is no overlapping between the kind of character set as the main character and the kinds of characters set as support characters when support cards are registered.

In this embodiment, as shown in FIG. 10, "character F", "character J", "character N", and "character R" are set as specific characters. Furthermore, when the player has selected a main character from among a plurality of characters, the selected character is registered as the main character in the character identification information table.

Furthermore, when support cards have been selected by player's operations, the character identification information table is updated to register the characters corresponding to the selected support cards as support characters.

Furthermore, when information relating to the main character and the support cards has been registered in the character identification information table, information concerning specific characters is registered. At this time, as shown in FIGS. 10 and 11, "character F", "character J", "character N", and "character R" are registered as the specific characters irrespective of the kinds of the registered main character and support characters.

<Setting of Initial Character Identification Information>

When a main character, characters to inherit, support characters, and specific characters have been registered, as described above, team members and sub-members are registered. As will be described later in detail, in the nurturing game, it is necessary to play battle games by using characters registered as team members. Furthermore, when a character registered as a sub-member satisfies a certain condition, the character is registered as a team member.

In this embodiment, the characters registered as the main character, the support characters, and the specific characters in the character identification information table are registered as team members. That is, in the case of FIG. 10, "character C", "character E", "character F", "character I", "character J", "character L", "character M", "character N", "character Q", "character R", and "character T" are registered as team members. Furthermore, in the case of FIG. 11, "character E", "character F", "character J", "character L", "character M", "character N", "character Q", "character R", and "character T" are registered as team members.

Furthermore, in the character identification information table, among the characters or support cards (support characters) possessed by the player, characters not registered as team members are registered as sub-members. Note that among predefined characters, all the remaining characters not registered as team members, or some characters selected through a lottery, may be registered as sub-members.

Note that although it is assumed here that the support characters and the specific characters are registered as team members from the beginning of the main nurturing game, the support characters and the specific characters may be registered as sub-members at the beginning of the main nurturing game and may then be registered as team members at a prescribed timing.

When information concerning team members and sub-members (initial character identification information) has been stored in the character identification information table, as described above, the preparation stage process is finished.

<Nurturing Stage Process>

When the preparation stage process is finished, a nurturing stage process is started. In the nurturing stage process, it becomes possible to nurture the characters registered as the main character and the team members. Note that in the following, in order to facilitate understanding, descriptions will first be directed to the main flow of the main nurturing game, and then features of the main nurturing game will be described in detail.

FIG. 12 is a figure for explaining a selection item table. Note that a selection item table is provided for each type of main character here. Alternatively, however, a shared selection item table may be provided irrespective of the type of main character. As shown in FIG. 12, the nurturing game consists of the 1st turn to the 60th turn, and is designed such that various kinds of parameters are updated in accordance with the results of player selections in the individual turns. Furthermore, with the selection item table, items that can be selected by the player are set in advance for each turn.

Figure 13A:
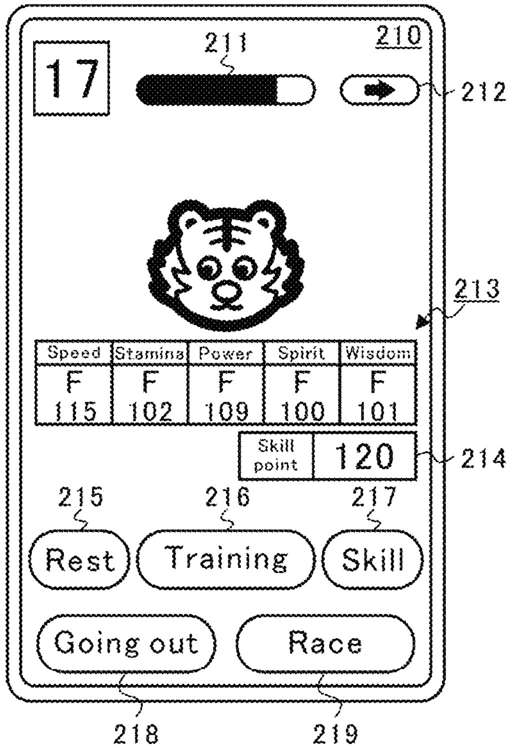
FIG. 13A is a first illustration for explaining a game screen.
Figure 13B:
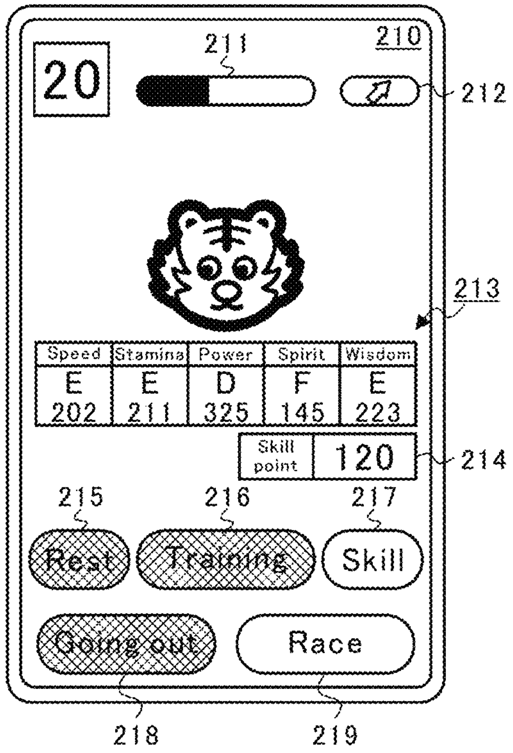
FIG. 13B is a second illustration for explaining the game screen.

FIG. 13A is a first illustration for explaining a game screen 210. FIG. 13B is a second illustration for explaining the game screen 210. Upon a transition to the nurturing stage process, the game screen 210 shown in FIGS. 13A and 13B is displayed on the display 26. In an upper part of the game screen 210, a physical-energy displaying part 211 and a character-condition displaying part 212 are displayed. The main character has a "physical energy" parameter set thereto. The "physical energy" parameter is mainly used to calculate a failure rate, which is the probability of failure in training, which will be described later. The physical-energy displaying part 211 is displayed so that the current remaining amount of "physical energy" of the main character can be recognized visually in relation to an upper limit value of "physical energy".

Furthermore, the main character has a "character condition" parameter set thereto. The character-condition displaying part 212 is displayed so that the current "character condition" of the main character can be recognized visually in terms of one of a plurality of levels (five levels consisting of terrible, poor, average, good, and great). As the "character condition" parameter becomes greater, the main character can proceed with a race advantageously, and the value by which an ability parameter is increased through training becomes greater.

Furthermore, as shown in FIGS. 13A and 13B, in a central part of the game screen 210, an image of the main character, a status displaying part 213, and a skill-point displaying part 214 are displayed. In the status displaying part 213, the current statuses of the main character are displayed in terms of numerical values and ranks among a plurality of levels (sixteen levels consisting of $G^+$, F, $F^+$, E, $E^+$, D, $D^+$, C, $C^+$, B, $B^+$, A, $A^+$, S, SS, and $SS^+$). Specifically, in this embodiment, numerical values and ranks of the following individual ability parameters are displayed: "speed", "stamina", "power", "spirit", and "wisdom". Furthermore, in the skill-point displaying part 214, the remaining amount of skill points possessed by the main character in the nurturing game is indicated in terms of a numerical value.

Furthermore, as shown in FIGS. 13A and 13B, in a lower part of the game screen 210, the following operating parts are displayed: a rest operating part 215 labeled as "Rest"; a training operating part 216 labeled as "Training"; a skill operating part 217 labeled as "Skill"; a going-out operating part 218 labeled as "Going Out"; and an individual-race operating part 219 labeled as "Race". Furthermore, the current number of turns is displayed in an upper part of the game screen 210.

Furthermore, the player can select one of "Rest" (the rest operating part 215), "Training" (the training operating part 216), "Going Out" (the going-out operating part 218), and "Race" (the individual-race operating part 219) in each turn. At this time, as shown in FIG. 12, items that can be selected in each turn are set in advance.

In this embodiment, turns in which the rest operating part 215, the training operating part 216, and the going-out operating part 218 are prohibited from being selected are set, like the 20th turn, the 30th turn, the 35th turn, the 57th turn, and the 59th turn shown in FIG. 12. In such turns, as shown in FIG. 13B, the rest operating part 215, the training operating part 216, and the going-out operating part 218 are displayed in a grayed-out manner, which prohibits player's operations. Therefore, in these turns, the player has to select the individual-race operating part 219.

Meanwhile, the skill operating part 217 is set so that the skill operating part 217 can constantly be selected in every turn. As will be described later, even when a skill is acquired in one turn, that turn is not finished. Note that in this embodiment, team racing is forcibly executed after the end of a prescribed turn.

Figure 14A:
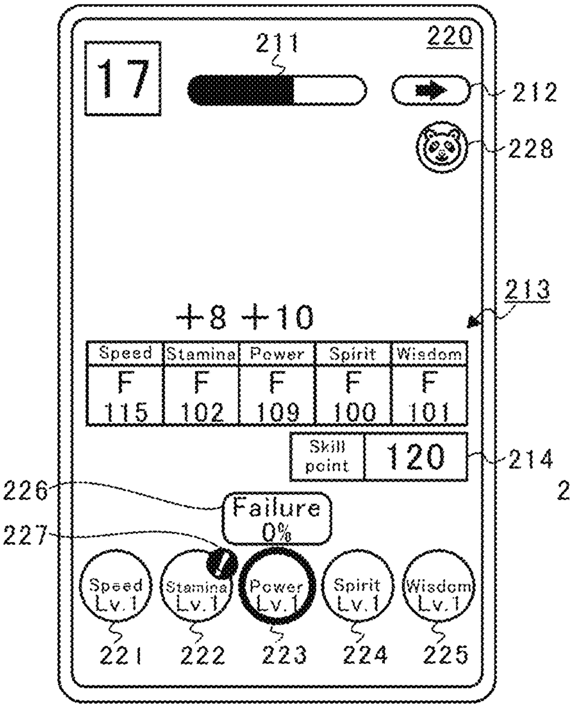
FIG. 14A is a first illustration for explaining a training screen.
Figure 14B:
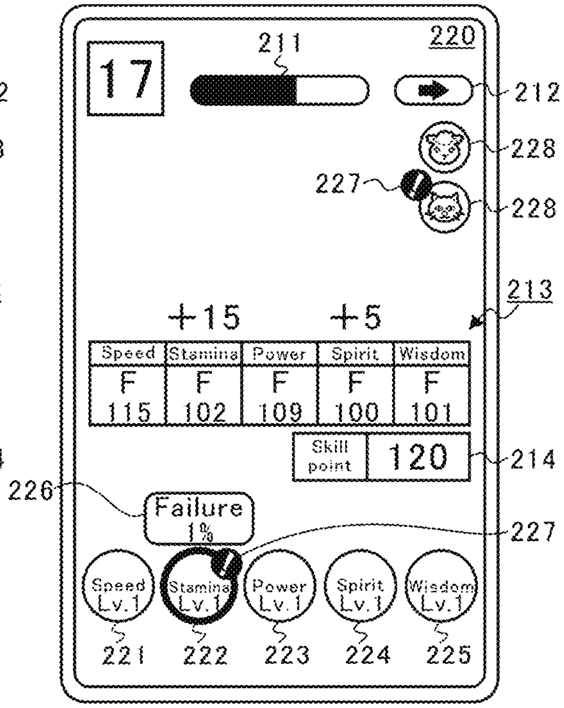
FIG. 14B is a second illustration for explaining the training screen.

FIG. 14A is a first illustration for explaining a training screen 220. FIG. 14B is a second illustration for explaining the training screen 220. When the training operating part 216 in the game screen 210 is operated, the training screen 220 is displayed on the display 26.

As shown in FIG. 14A, training items are displayed in a lower part of the training screen 220. Here, the following operating parts are displayed: a speed operating part 221 labeled as "Speed"; a stamina operating part 222 labeled as "Stamina"; a power operating part 223 labeled as "Power"; a spirit operating part 224 labeled as "Spirit"; and a wisdom operating part 225 labeled as "Wisdom".

When the player taps one of the individual operating parts 221 to 225 once, the training item corresponding to the tapped one of the operating parts 221 to 225 is tentatively selected, and the one of the operating parts 221 to 225 corresponding to the tentatively selected training item is displayed in a highlighted manner. FIG. 14A shows the state where the power operating part 223 is tentatively selected. Meanwhile, FIG. 14B shows the state where the stamina operating part 222 is tentatively selected.

Furthermore, in the individual operating parts 221 to 225, training levels for the individual training items are displayed. A training level is a parameter that is raised on the basis of the team ranking, and as the training level becomes higher, the value by which an ability parameter is increased when training is executed becomes greater. Each training level is initially set to 1, and is raised up to level 5 at most.

Furthermore, in tentatively selected one of the operating parts 221 to 225, a failure-rate displaying part 226 labeled as "Failure" is displayed. The failure rate displayed in terms of a numerical value in the failure-rate displaying part 226 is set so as to increase in inverse proportion to the remaining physical energy displayed in the physical-energy displaying part 211.

Furthermore, in the status displaying part 213, the values by which an ability parameter is increased when training corresponding to the tentatively selected one of the operating parts 221 to 225 is executed and is successful are displayed. For example, in the example shown in FIG. 14A, the power operating part 223 is tentatively selected, "+8" is displayed for "Stamina" and "+10" is displayed for "Power" in the status displaying part 213. Meanwhile, in the example shown in FIG. 14B, the stamina operating part 222 is tentatively selected, "+15" is displayed for "Stamina" and "+5" is displayed for "Spirit" in the status displaying part 213.

Furthermore, an event-report indication 227 is displayed in each one of the operating parts 221 to 225 corresponding to a training item with which a prescribed event occurs in the case where a training is executed and is successful. Note that the mode of displaying the event-report indication 227 may be varied depending on the kind of event.

Furthermore, as shown in FIG. 14B, in an upper right part of the training screen 220, for each of the tentatively selected operating parts 221 to 225, an assigned character icon 228 of a character assigned for training is displayed. Furthermore, in the case where a prescribed event occurs in association with a character displayed in an assigned character icon 228 in the case where the training is successful, the event-report indication 227 is displayed in the corresponding assigned character icon 228. Note that in the following, training in which a character is assigned will be referred to as joint training.

Figure 14C:
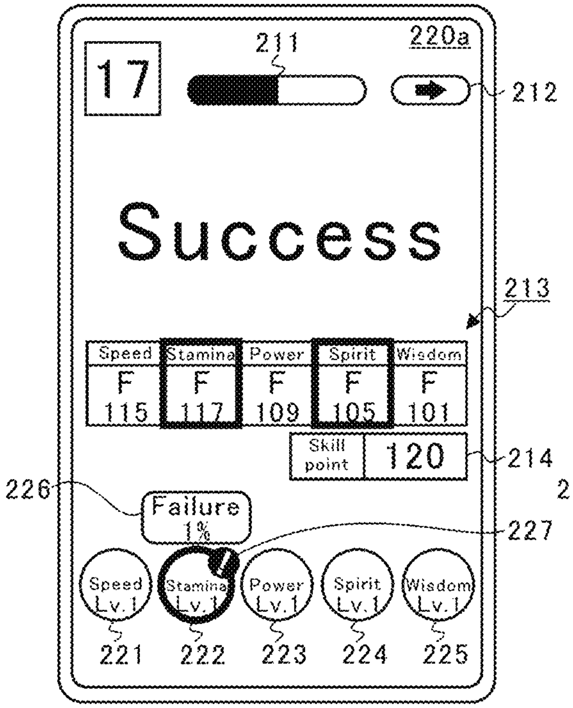
FIG. 14C is an illustration for explaining a training-result report screen.

FIG. 14C is an illustration for explaining a training-result report screen 220*a*. When one of the tentatively selected operating parts 221 to 225 is tapped again, training corresponding to the tapped one of the operating parts 221 to 225 is executed. After the training is executed, the training-result report screen 220*a* reporting a success or failure of the training is displayed on the display 26. Here, the text "Success" is displayed, reporting a success of the training to the player Furthermore, at this time, the ability parameters in the status displaying part 213 are updated and displayed on the basis of the success of training. That is, ability parameters (ability information) of the main character, corresponding to the training item (kind of nurturing) selected by the player, are updated.

Here, the values by which ability parameters are raised in the case of successful training, displayed in the status displaying part 213 in FIG. 14A or FIG. 14B, are added. Furthermore, what is displayed in the physical-energy displaying part 211 is updated in accordance with the training item executed. The physical energy decreases in the case where training for speed, stamina, power, or spirit has been performed and has been successful. Meanwhile, the physical energy is recovered when training for wisdom has been performed and has been successful.

Meanwhile, in the case of a failure in training, a prescribed penalty is assigned. Specifically, the content of the penalty includes a reduction in physical energy, a decrease in the numerical value of an ability parameter, worsening of the character conditions, or the like. Note that, for example, a penalty that is assigned in the case of a high failure rate may be more disadvantageous (e.g., a greater numerical value of reduction in physical energy, a greater numerical value of decrease in an ability parameter, or a greater level of worsening in the character conditions) than a penalty that is assigned in the case of a low failure rate.

Furthermore, the content of the penalty may be determined depending on the training item. For example, the content of the penalty may be such that the value of the speed ability parameter is decreased in the case of a failure in speed training, while the value of the power ability parameter is decreased in the case of a failure in power training. Furthermore, the content of the penalty may be such that no penalty is assigned for some training items (e.g., wisdom) even in the case of a failure in training.

Figure 14D:
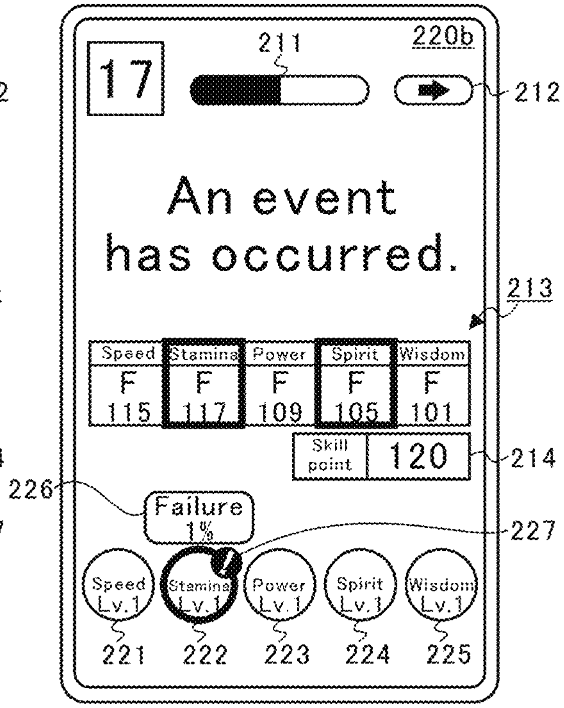
FIG. 14D is an illustration for explaining an event screen.

FIG. 14D is an illustration for explaining an event screen 220*b*. When the displaying of the training-result report screen 220*a* is quit, there are cases where the event screen 220*b* is displayed on the display 26. Various events are executed in the event screen 220*b*. Note that there are cases where a plurality of events occur during a single turn.

For example, in the case where a hint event has occurred, it is possible to obtain a hint for a skill. After obtaining a hint for a skill, the player can acquire the skill by consuming skill points. A plurality of kinds of skills are provided, and a prescribed ability may be invoked for each skill. Each skill has an invocation condition and an effect defined therefor, and the predefined effect is invoked in the case where the invocation condition for each skill is satisfied. There are cases where a skill is invoked during the execution of individual racing or team racing, which will be described later.

Events include events in which skills are acquired, events in which physical energy is recovered, events in which physical energy is decreased, events in which ability parameters are raised, events in which ability parameters are lowered, events in which the character conditions become better, events in which the character conditions become worse, etc. As will be described later, events include events predefined for each turn and events that occur in the case where a prescribed lottery is won. Furthermore, when all events that have occurred are finished, the game screen 210 for the next turn is displayed.

Figure 15A:
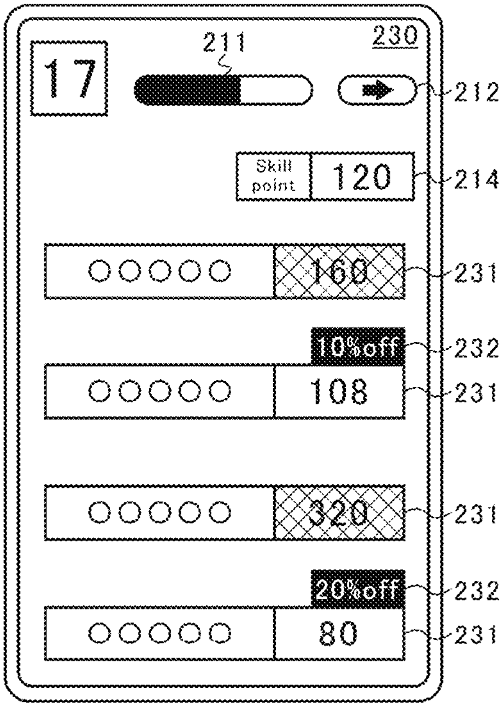
FIG. 15A is a first illustration for explaining a skill screen.
Figure 15B:
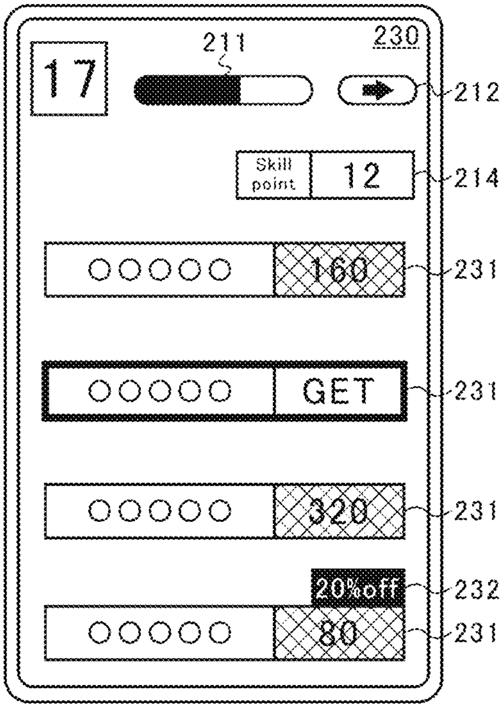
FIG. 15B is a second illustration for explaining the skill screen.

FIG. 15A is a first illustration for explaining a skill screen 230. FIG. 15B is a second illustration for explaining the skill screen 230. When the skill operating part 217 in the game screen 210 is operated, the skill screen 230 shown in FIG. 15A is displayed on the display 26.

In the skill screen 230, a skill display field 231 is displayed. In the skill display field 231, acquired skills, possessed skills set in advance to the main character, possessed skills possessed as the results of the occurrence of various kinds of evets, etc. are displayed. Furthermore, in the case where a hint event has occurred in relation to a possessed skill, skill points to be consumed in order to acquire that possessed skill are discounted. Here, with each possessed skill for which a hint has been acquired, discounted skill points that are needed for the acquisition thereof are displayed. At this time, a discount-rate displaying icon 232 indicating the discount rate is displayed together with the skill display field 231.

Furthermore, with each skill displayed in the skill screen 230, the invocation condition and the effect of invocation of that skill are displayed.

Furthermore, in an upper part of the skill screen 230, the physical-energy displaying part 211, the character-condition displaying part 212, and the skill-point displaying part 214 are displayed. Furthermore, in an upper part of the skill screen 230, the current number of turns is displayed.

When a possessed skill has been acquired by consuming skill points on the basis of a player's operation, as shown in FIG. 15B, "GET" is displayed with the acquired skill, reporting the acquisition of the possessed skill, and the consumed skill points are subtracted from the skill points displayed in the skill-point displaying part 214, and what is displayed is updated.

Figure 16A:
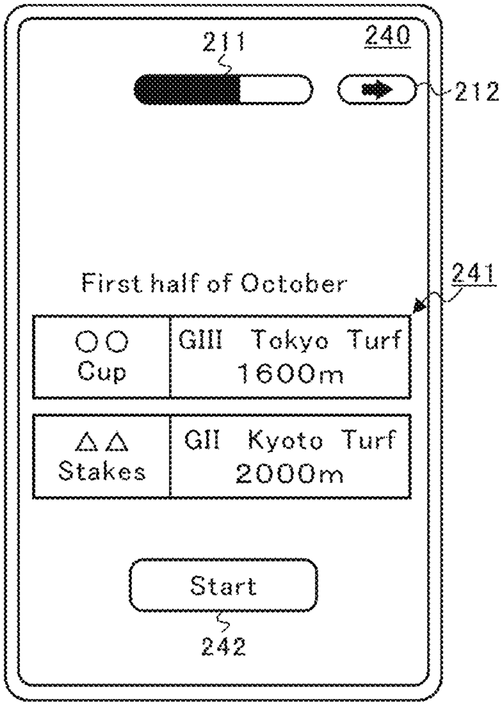
FIG. 16A is a first illustration for explaining an individual-race selection screen.

FIG. 16A is a first illustration for explaining an individual-race selection screen 240. When the individual-race operating part 219 in the game screen 210 is operated, the individual-race selection screen 240 shown in FIG. 16A is displayed. An individual race is designed such that the main character participates in a race against what are called non-player characters (hereinafter referred to as NPCs).

In an upper part of the individual-race selection screen 240, the physical-energy displaying part 211 and the character-condition displaying part 212 are displayed. Furthermore, in a central part of the individual-race selection screen 240, an individual-race selection operating part 241 for selecting the kind of individual race in which the main character is to participate is displayed. Furthermore, in a lower part of the individual-race selection screen 240, a start operating part 242 labeled as "Start" is displayed. Note that the races that can be selected via the individual-race selection operating part 241 in the individual-race selection screen 240 are set in advance for each turn. Alternatively, a condition for participating in each race may be set in advance, and participation in that race may be allowed in the case where the condition is satisfied.

Figure 16B:
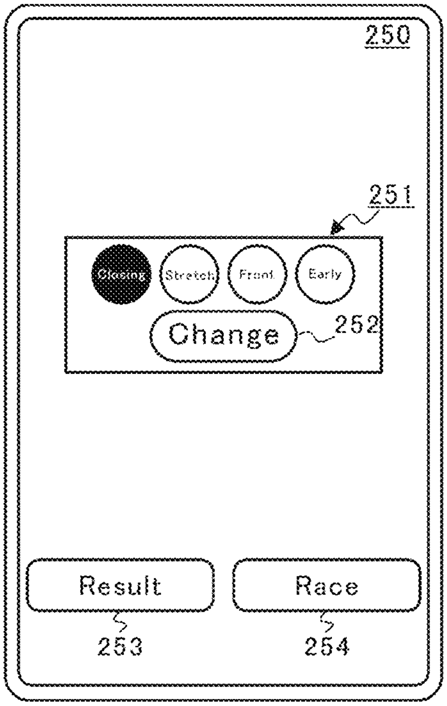
FIG. 16B is an illustration for explaining an individual-race start screen.

FIG. 16B is an illustration for explaining an individual-race start screen 250. When the start operating part 242 is operated in the state where the kind of individual race to participate in has been selected via the individual-race selection operating part 241, the individual-race start screen 250 shown in FIG. 16B is displayed. In a central part of the individual-race start screen 250, a strategy displaying part 251 is displayed. Furthermore, in the strategy displaying part 251, the currently selected strategy (closing, stretch running, front running, or early speed) is displayed in a highlighted manner, and a change operating part 252 labeled as "Change" is displayed. When the change operating part 252 is operated, a strategy changing screen, which is not shown, is displayed on the display 26. The player can change the strategy in the individual race to an arbitrary strategy by performing an operation in the strategy changing screen.

Furthermore, in a lower part of the individual-race start screen 250, a result operating part 253 labeled as "Result" and a race operating part 254 labeled as "Race" are displayed.

In the case where the race operating part 254 has been operated, a race screen, which is not shown, is displayed on the display 26. On the display 26, a video showing the proceeding of the race (hereinafter referred to as a race video) is displayed.

Figure 16C:
FIG. 16C is an illustration for explaining an individual-race result screen.

FIG. 16C is an illustration for explaining an individual-race result screen 260. The individual-race result screen 260 is displayed on the display 26 in the case where the playing of the race video mentioned above has been finished and in the case where the result operating part 253 has been operated. In the individual-race result screen 260, the place in the individual race is displayed.

Figure 17A:
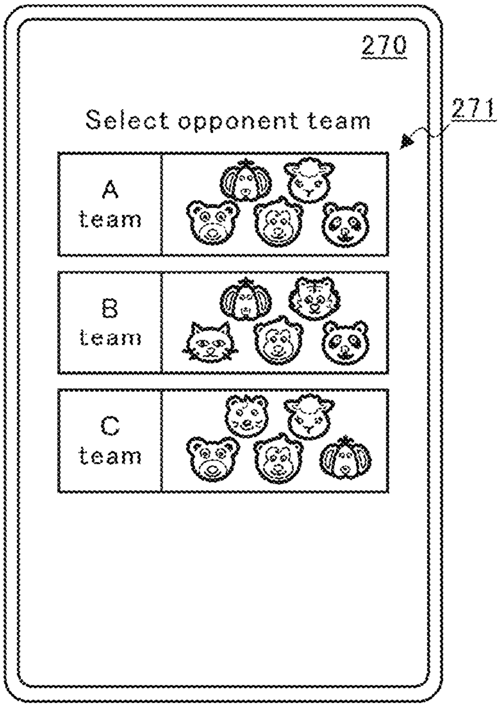
FIG. 17A is an illustration for explaining a team-racing selection screen.

FIG. 17A is an illustration for explaining a team-racing selection screen 270. As mentioned earlier, in this embodiment, when a prescribed turn is finished, team racing is forcibly started. Upon the start of the team racing, the team-racing selection screen 270 shown in FIG. 17A is displayed. In a central part of the team-racing selection screen 270, an opponent-team selection operating part 271 for selecting an opponent of the team racing to participate in is displayed. Note that the opponent may be NPCs. Alternatively, the opponent may be a team of another player, without limitation to NPCs. In this case, a battle is played against the team of the other player while carrying out communication.

Note that it suffices that the characters to participate in team racing can be selected from the team members, and the main character need not necessarily be included. Furthermore, one team member may be allowed to participate in a plurality of races in the team racing.

Figure 17B:
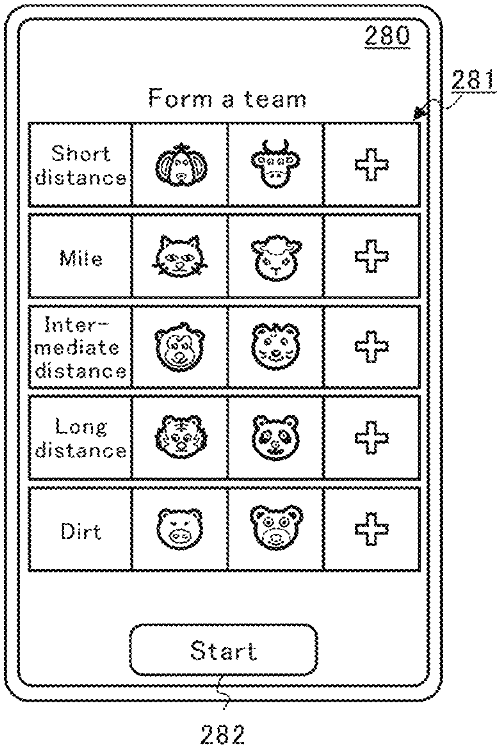
FIG. 17B is an illustration for explaining a team-racing formation screen.

FIG. 17B is an illustration for explaining a team-racing formation screen 280. When the opponent-team selection operating part 271 has been operated, the team formation screen 280 is displayed on the display 26. In the team formation screen 280, the team-formation operating part 281 is displayed. By operating the team-formation operating part 281, the player can pick up characters for the team racing by using the characters registered as the team members. In this embodiment, in the team racing, five kinds of races, namely, "short distance", "mile", "intermediate distance", "long distance", and "dirt", are executed. The game is designed such that the total outcome of the team racing is determined on the basis of the outcomes of the individual races.

Specifically, the total outcome of the team racing is determined as a player's victory in the case where the number of races won by the player's team is greater than the number of races won by the opponent's team among the five races. Meanwhile, the total outcome of the team racing is determined as a defeat in the case where the number of races won by the player's team is less than the number of races won by the opponent's team among the five races. Furthermore, the outcome is determined as a draw in the case where the number of races won by the player's team and the number of races won by the opponent's team are the same.

Note that the player can pick up three kinds of characters at most for each race from among the team members. Furthermore, here, it is not permitted to pick up the same kind of character for a plurality of races. Furthermore, in a lower part of the team formation screen 280, a start operating part 282 labeled as “Start” is displayed.

Figure 17C:
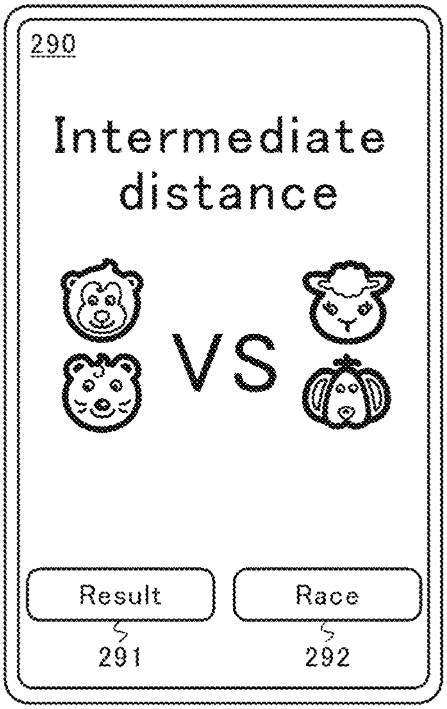
FIG. 17C is an illustration for explaining a team-racing start screen.

FIG. 17C is an illustration for explaining a team-racing start screen 290. When the start operating part 282 in the team formation screen 280 is operated, the team-racing start screen 290 shown in FIG. 17C is displayed. In this embodiment, five races are executed in the team racing, and the order of execution thereof may be a predefined order or may be determined at random.

As shown in FIG. 17C, in a central part of the team-racing start screen 290, the characters in the team formed by the player and the characters in the opponent's team, relating to the race to be executed, are displayed. Shown here is the case where the player has picked up two characters and two opponent's characters have been picked up for the “intermediate distance” race.

Furthermore, as shown in FIG. 17C, in a lower part of the team-racing start screen 290, a result operating part 291 labeled as “Result” and a race operating part 292 labeled as “Race” are displayed. In the case where the race operating part 292 is operated, a race video, which is not shown, is displayed.

Figure 17D:
FIG. 17D is an illustration for explaining a team-racing interim result screen.

FIG. 17D is an illustration for explaining a team-racing interim result screen 300. The team-racing interim result screen 300 is displayed on the display 26 in the case where the playing of the race video mentioned earlier has been finished and in the case where the result operating part 291 in the team-racing start screen 290 has been operated. In the team-racing interim result screen 300, the outcome in the relevant race (the “intermediate distance” race here) is displayed. Note that there is no particular limitation to the method of determining the outcome of each of the five races in the team racing. For example, the outcome may be determined as a victory for the team to which the character that has won the 1st place belongs. Alternatively, points may be awarded for individual places, and the outcome may be determined as a victory for the team that has acquired greatest points.

Furthermore, when the displaying of the team-racing interim result screen 300 in FIG. 17D is quit, the team-racing start screen 290 for the next race (e.g., the “short distance” race) is displayed. Then, similarly to the above, the team-racing start screen 290 and the team-racing interim result screen 300 are displayed sequentially until all the five kinds of races are finished.

FIG. 18 is a first illustration for explaining a team-racing detailed result screen 310. When the team-racing start screen 290 and the team-racing interim result screen 300 for all the five kinds of races have been displayed, as described above, the team-racing detailed result screen 310 is displayed on the display 26. In a central part of the team-racing detailed result screen 310, an outcome displaying part 311 is displayed. In the outcome displaying part 311, the outcomes of the individual races are reported to the player. As shown in FIG. 18A, shown here is the case of three victories and two defeats among the individual races.

Figure 18A:
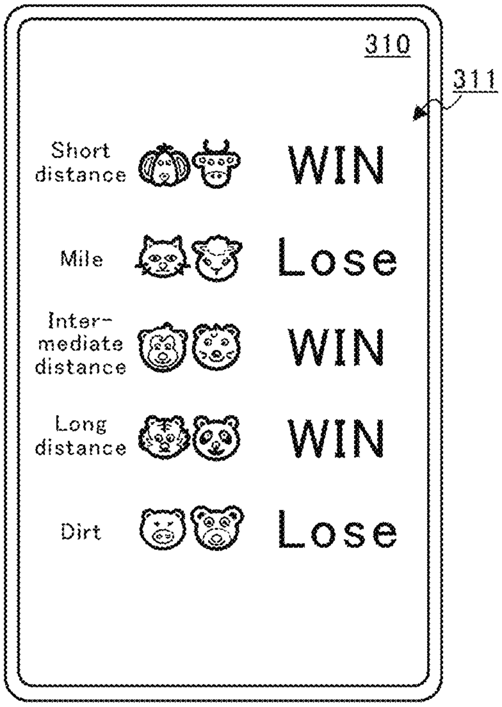
FIG. 18A is a first illustration for explaining a team-racing detailed result screen.
Figure 18B:
FIG. 18B is a first illustration for explaining a team-racing total result screen.

FIG. 18B is a first illustration for explaining a team-racing total result screen 320. When the displaying of the outcome displaying part 311 is quit, the team-racing total result screen 320 is displayed on the display 26. In the team-racing total result screen 320, the total outcome of the team racing is reported to the player. In the case of three victories and two defeats among the individual races, as shown in FIG. 18A, a victory in the team racing is reported in the team-racing total result screen 320.

Furthermore, a team ranking is displayed in the team-racing total result screen 320. In this embodiment, the team ranking changes on the basis of the outcome of the team racing. For example, the team ranking rises in the case of a victory in the team racing.

Furthermore, in the team-racing total result screen 320 reporting a victory in the team racing, a next operating part 321 labeled as “NEXT” is displayed. In the case where the next operating part 321 in the team-racing total result screen 320 has been operated, the game screen 210 for the next turn is displayed.

Figure 18C:
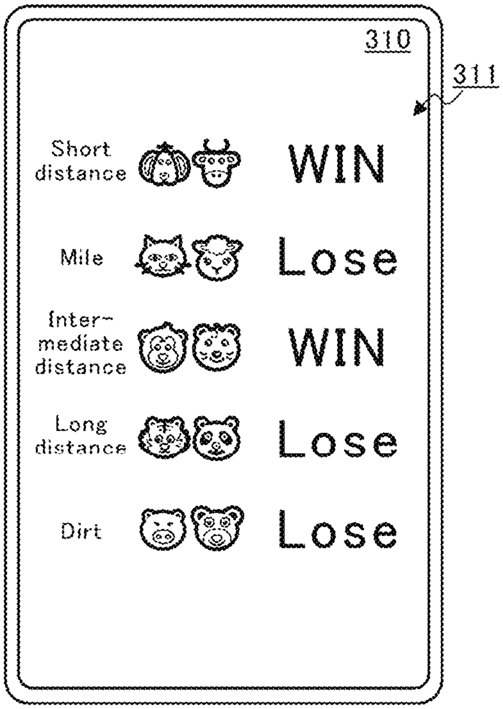
FIG. 18C is a second illustration for explaining the team-racing detailed result screen.
Figure 18D:
FIG. 18D is a second illustration for explaining the team-racing total result screen.

FIG. 18C is a second illustration for explaining the team-racing detailed result screen 310. As shown in FIG. 18C, shown here is the case of two victories and three defeats among the individual races. FIG. 18D is a second illustration for explaining the team-racing total result screen 320. In the case of two victories and three defeats among the individual races, as shown in FIG. 18C, a defeat in the team racing is reported in the team-racing total result screen 320.

Note that the team ranking drops in the case of a defeat in the team racing. Note, however, that the main nurturing game is continued irrespective of the outcome of the team racing, the next turn is started when the next operating part 321 is tapped.

As described above, in the main nurturing game, the team racing is executed every prescribed turns. With a victory in the team racing, a privilege is awarded, such as an increase in an ability parameter of the main character. Furthermore, in the main nurturing game, sub-members are promoted to team members in prescribed turns. Here, a prescribed number of sub-members are promoted to team members in the next turn after the execution of the team racing. As described above, the nurturing game is designed such that the player aims at winning team battles while gradually increasing team members.

Figure 19:
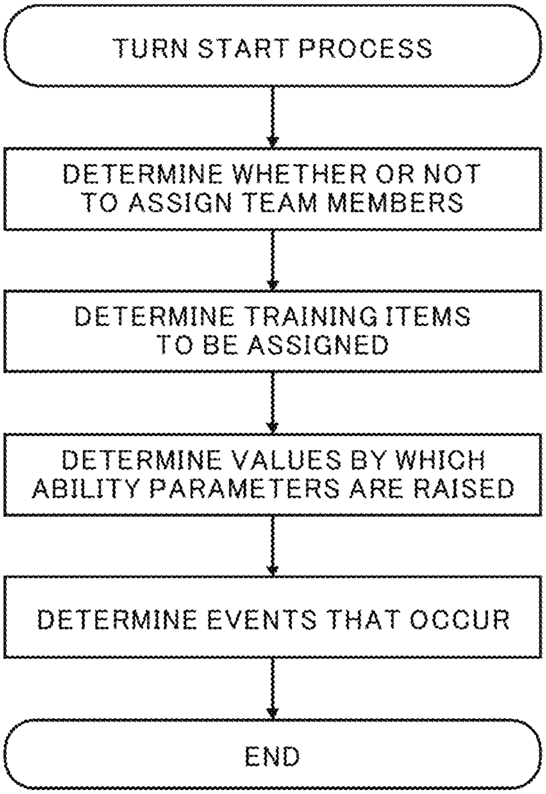
FIG. 19 is a figure for explaining a rough flow of a turn start process.

FIG. 19 is a figure for explaining a rough flow of a turn start process. The nurturing stage process includes the turn start process, which is executed when each turn in the nurturing game is started. While the turn start process will be described later in detail, here, the rough flow of the turn start process will be described.

In the turn start process, as shown in FIG. 19, “processing for determining whether or not to assign team members”, “processing for determining training items to which team members are assigned”, “processing for determining values by which ability parameters are raised”, and “processing for determining events that occur” are executed. These kinds of processing will be described below in order.

<Processing for Determining Whether or not to Assign Team Members>

FIG. 20 is a figure for explaining an assign/do-not-assign table. As shown in FIG. 20, in the assign/do-not-assign table, a selection ratio for whether or not to assign a team member (“assign” or “do not assign”) is set for each kind of character identification information of a character. In this embodiment, on the basis of the assign/do-not-assign table shown in FIG. 20, for every team member, whether or not to assign that team member is determined with reference to the character identification information table described earlier and shown in FIG. 10 or FIG. 11.

Specifically, as shown in FIG. 20, in this embodiment, for each team member registered as both “support character” and “specific character” as character identification information, “assign” is selected by a probability of 80%. Meanwhile, for each team member registered as “specific character" but not registered as "support character" as character identification information, "assign" is selected by a probability of 60%.

Furthermore, for each team member registered as "support character" but not registered as "specific character" as character identification information, "assign" is selected by a probability of 40%. Meanwhile, for each team member registered neither as "support character" nor as "specific character" as character identification information, "assign" is selected by a probability of 10%.

As described above, team members registered as support characters are more likely to be assigned in training than team members not registered as support characters. Furthermore, team members registered as specific characters are more likely to be assigned in training than team members not registered as specific characters.

<Processing for Determining Training Items to which Team Members are Assigned>

Then, for each of the team members determined to be assigned as described above, it is determined which training item the team member is to be assigned to among "Speed", "Stamina", "Power", "Spirit", and "Wisdom".

There is no particular limitation to the method of determining the training item to which each team member is assigned. For example, a lottery may be performed so that each team member will be assigned to individual training items with equal probabilities. Alternatively, instead of performing a lottery, individual characters may be assigned to training items preset therefor. Alternatively, for example, a lottery may be performed so that each character tends to be assigned to a favorite training of that character (see FIG. 9A). In the case where a lottery is performed, a lottery table defining selection ratios in the lottery may be stored in advance, or a lottery table may be created on each occasion of a lottery.

<Processing for Determining Values by which Ability Parameters are Raised>

FIG. 21A is an illustration for explaining a training level table. As shown in FIG. 21A, training levels are set so as to be raised as the team ranking becomes advanced. Specifically, the individual training levels for "Speed", "Stamina", "Power", "Spirit", and "Wisdom" are set to "level 1" in the case where the team ranking is 100th or lower, the individual training levels are set to "level 2" in the case where the team ranking is 99th or higher and 60th or lower, the individual training levels are set to "level 3" in the case where the team ranking is 59th or higher and 30th or lower, the individual training levels are set to "level 4" in the case where the team ranking is 29th or higher and 10th or lower, and the individual training levels are set to "level 5" in the case where the team ranking is 9th or higher.

Note that although this embodiment has been described in the context of the case where training levels are set so as to be raised as the team ranking becomes advanced, there is no limitation thereto. For example, favorite items of training of team members are counted for individual training items, and the training levels may be raised in accordance with the counted values (count values). Note that although it is assumed here the training levels of all the training items are the same in relation to the team ranking, the training levels may differ among the individual training items for the same team ranking.

In this embodiment, in the case where training selected by the player has been executed and has been successful, the values of prescribed ability parameters are raised depending on the training item executed.

Specifically, in this embodiment, in the case where training for "Speed" has been executed and has been successful, the values of "Speed" and "Power" ability parameters are raised.

Meanwhile, in the case where training for "Stamina" has been executed and has been successful, the values of "Stamina" and "Spirit" ability parameters are raised.

Meanwhile, in the case where training for "Power" has been executed and has been successful, the values of "Stamina" and "Power" ability parameters are raised.

Meanwhile, in the case where training for "Spirit" has been executed and has been successful, the values of "Speed", "Power", and "Spirit" ability parameters are raised.

Meanwhile, in the case where training for "Wisdom" has been executed and has been successful, the values of "Speed" and "Wisdom" ability parameters are raised.

In this embodiment, the value of an ability parameter that is raised in the case of successful training is calculated by adding a value obtained by multiplying a fixed raising value by a bonus addition rate to the fixed raising value, where the fixed raising value is determined correspondingly to the executed training item and the training level, and the bonus addition rate will be described later.

FIG. 21B is a figure for explaining a fixed raising value (speed) table. Furthermore, FIG. 21C is a figure for explaining a fixed raising value (power) table. That is, FIG. 21B shows fixed raising values in the case where the training item is "Speed". Furthermore, FIG. 21C shows fixed raising values in the case where the training item is "Power".

As shown in FIGS. 21B and 21C, in the fixed raising-value tables, fixed raising values that are determined correspondingly to the executed training item and the training level are stored. Furthermore, in this embodiment, as shown in FIGS. 21B and 21C, settings are made such that ability parameters are raised by greater values as the training level becomes higher.

Note that although not described here, fixed raising-value tables for the cases where "Stamina", "Spirit", and "Wisdom" are selected as the training item are also provided individually.

Furthermore, in addition to the fixed raising values described above, a bonus addition rate is determined on the basis of the characters assigned to each training item as well as the character identification information table described earlier and shown in FIG. 10 or FIG. 11.

FIG. 21D is a figure for explaining a bonus addition rate table. In this embodiment, a bonus addition rate is determined on the basis of the character identification information of the characters determined to be assigned to each item of training.

Specifically, as shown in FIG. 21D, in the bonus addition rate table, whether or not there is a bonus addition rate, as well as a selection ratio of the addition rate (10% up or 20% up), are set for each kind of character identification information of a character.

In the case where "support character" and "specific character" are registered as character identification information, "none" is selected by a probability of 50%, and "20% up" is selected by a probability of 50%.

Meanwhile, in the case where only "support character" is registered as character identification information, "none" is selected by a probability of 50%, and "10% up" is selected by a probability of 50%.

Meanwhile, in the case where only "specific character" is registered as character identification information, "none" is selected by a probability of 50%, and "10% up" is selected by a probability of 50%.

Meanwhile, in the case neither "support character" nor "specific character" is registered as character identification information, "none" is selected by a probability of 80%, and "10% up" is selected by a probability of 20%.

Furthermore, a value obtained by multiplying the fixed raising value determined on the basis of a fixed raising-value table by a bonus addition rate is derived as a bonus additional value. The value obtained by adding the bonus additional value to the fixed raising value is determined as the amount of raising the value of an ability parameter in the case of successful training. Note that for training to which a plurality of characters are assigned, the individual bonus additional values for the plurality of assigned characters are added to the fixed raising values. As described above, the amounts of raising the ability parameters of the main character in the case of successful training are determined for all the kinds of training.

<Processing for Determining Events that Occur>

FIG. 22 is a figure for explaining the kinds of events and event classes. During the main nurturing game, processing for determining whether or not an event is to occur is performed in each turn. Events are broadly classified into four kinds, namely, scenario events, the exclusive events 162*a* mentioned earlier, support events, and team member events, which are provided for individual main characters. Note that each scenario has predefined therefor a scenario event, an exclusive event 162*a*, a support event, and a team member event that may occur during the main nurturing game.

Scenario events are events set for individual scenarios of the main nurturing game. In this embodiment, a plurality of scenarios are provided, allowing the player to select one of the scenarios. A scenario event occurs for each scenario selected by the player. In other words, a scenario event that occurs in the main nurturing game is determined on the basis of a scenario selected by the player.

Note that scenario-specific events and scenario-common events may be provided among the scenario events. A scenario-specific event is an event associated with only one scenario. For example, a scenario-specific event associated with a first scenario occurs only in the case where the first scenario has been selected, while never occurring in the case where another scenario has been selected.

Meanwhile, a scenario-common event is an event that occurs commonly in a plurality of scenarios. Therefore, a scenario-common event occurs both in the case where the first scenario has been selected and in the case where a second scenario has been selected.

Here, it is assumed that scenario-specific events and scenario-common events are provided as scenario events. Alternatively, however, only either scenario-specific events or scenario-common events may be provided.

The exclusive events 162*a* are events set in advance for individual characters, as mentioned earlier. In the main nurturing game, the exclusive event 162*a* for the character registered by the player as the main character in the setting game, i.e., in the preparation stage process.

Support events are events set in advance for individual support cards, as mentioned earlier. In the main nurturing game, the support events associated with the support cards registered by the player in the setting game occur. Furthermore, apart from the support events associated with registered support cards, for example, support events associated with team members may occur. Note, however, that the probabilities of determining support events associated with support cards registered by the player in the setting game are set to be higher than the probabilities of determining other support events.

Team member events are events that occur in the case where training in which team members are assigned, i.e., joint training, has been executed. Furthermore, team member events may occur in the case where a prescribed condition is satisfied, irrespective of training.

As described above, with a scenario event, whether or not the scenario event occurs, etc. are determined on the basis of a scenario. Furthermore, with the exclusive events 162*a*, support events, and team member events, whether or not the events occur, etc. are determined on the basis of the main character, support cards, and team members. That is, the kinds of events are classified on the basis of information that is referred to when determining whether or not the events occur, etc.

Meanwhile, in this embodiment, each event is classified into one of five event classes depending on what results from the occurrence of that event. Here, each event is classified into one of the following event classes: hint events, ability events, aptitude events, story events, and special training events.

As mentioned earlier, a hint event is an event that makes it possible to possess or acquire a skill. An ability event is an event for raising or lowering an ability parameter of the main character. An aptitude event is an event for raising or lowering an aptitude parameter of the main character. A story event is an event for displaying a story relating to a character that appears in the nurturing game. Note that story events include events in which an ability parameter or an aptitude parameter is changed in addition to displaying a story. A special training event is an event for increasing an ability parameter of a team member.

Here, scenario events include hint events, ability events, aptitude events, and story events. Furthermore, the exclusive events 162*a* and support events include hint events and ability events. Furthermore, team member events include story events and special training events. Note that the relationship between the kinds of events and the event classes shown in FIG. 22 is merely an example. Therefore, for example, the exclusive events 162*a* may include story events or special training events.

FIG. 23 is a figure for explaining the relationship between the kind of event and the number of turns. FIG. 23 shows an example of the case where a prescribed character is registered as the main character in the case where the main nurturing game is executed. Whether or not each event occurs, etc. are determined on the basis of event determination tables provided for individual scenarios.

Here, the event determination tables include event-occurrence determination tables and event-content determination tables. In each event-occurrence determination table, information indicating whether each event is to occur as well as information indicating the probability or the like of the occurrence of the event are associated with each turn. Note that it is assumed here that information indicating whether or not an event is to occur as well as information indicating the probability or the like of the occurrence of the event is specified for every turn per kind of event.

Furthermore, in each event-content determination table, events that are to occur or events that may occur are set in advance for each turn and for each kind of event.

At the start of each turn, the event-occurrence determination table is referred to, and first, whether or not an event is to occur is determined for each kind of event. At this time, depending on the number of turns and the kind of event, there are cases where the "occurrence" of the event is necessarily determined. Furthermore, depending on the number of turns and the kind of event, there are also cases where it is specified that the event is to occur, for example, by a probability of 50%. In this case, a lottery is performed to determine the "occurrence" of the event by a probability of 50%.

Furthermore, for each kind of event with which "occurrence" is determined, the content of the event that is to occur is determined with reference to the event-content determination table. For example, according to the event-occurrence determination table, it is set that a scenario event is to necessarily occur in the 1st turn. Furthermore, each event has an event ID assigned thereto. Furthermore, in the event-content determination table, a scenario event with the event ID=0001 is associated with the 1st turn as an event that may occur. Therefore, in the case where the main nurturing game is played, the scenario event with the event ID=0001 necessarily occurs in the 1st turn.

Similarly, according to the event determination tables (the event-occurrence determination table and the event-content determination table), it is determined that scenario events with the event IDs=0002, 0003, 0004, 0005, and 0006 are to occur in the 4th turn, the 5th turn, the 6th turn, the 7th turn, and the 10th turn, respectively.

Here, the individual events are broadly classified into fixed events and random events. A fixed event is an event with which the turn in which the event occurs is fixed, in other words, an evet that may occur in a prescribed turn and that never occurs in turns other than the prescribed turn. Here, all the scenario events with the event IDs=0001, 0002, 0003, 0004, 0005, and 0006 are fixed events and are scenario-specific events.

Meanwhile, a random event is an event that occurs in the case where it has been determined that an event is to occur and that event has been determined as the event to occur. FIG. 23 shows that, in each turn labeled as "lottery", whether or not an event is to occur is determined through a lottery, and in the case where "occurrence" is determined, an event selected from random events by the lottery occurs.

Note that in the event-content determination table, for each turn in which an event selected through a lottery is to occur, event IDs that are subject to the lottery are set. For example, suppose that random events with the event IDs=0010, 0011, and 0012 are provided as scenario events. Furthermore, suppose that the scenario event with the event ID=0010 is associated with the 12th turn in the event-content determination table.

In this case, a lottery as to whether or not a scenario event is to occur is performed at the start of the 12th turn. Then, in the case where the lottery is won, the scenario event with the event ID=0010 occurs, whereas the scenario event does not occur when the lottery is not won.

Furthermore, suppose, for example, that scenario events with the event IDs=0010, 0011, and 0012 are associated with the 15th turn in the event-content determination table. Furthermore, in the case where a lottery for determining whether or not an event is to occur is won, a scenario event to occur is determined by a lottery from among the events with the event IDs=0010, 0011, and 0012, and the scenario event that has won the lottery occurs.

Note that the description has been given here in the context of the case where fixed events and random events are provided exclusively. However, fixed events may be set in addition to random events or instead of random events as subjects of a lottery in the case where a scenario event that is to occur is determined through the lottery.

Here, in this embodiment, the 4th turn to the 7th turn are set as branch turns. A branch turn refers to a turn in which the content of an event is changed in the case where a prescribed condition is satisfied. Here, as the prescribed condition, the condition that a prescribed number of specific characters are included in the team members, in other words, a prescribed number of specific characters are included among the main character or support characters, is set.

Specifically, in the 4th turn, it is determined whether or not, as a prescribed number, four specific characters are included in the team members. Then, in the case where four specific characters are included in the team members, the scenario event is replaced with a team member event. The team member event includes specific character events provided for individual specific characters. Here, in the case where a specific character is included in the team members, scenario events are replaced with specific character events in a branch turn.

Similarly, in the 5th turn, the 6th turn, and the 7th turn, it is determined whether or not, as a prescribed number, three specific characters, two specific characters, and one specific character, respectively, are included in the team members. Then, in the case where the respective prescribed number of specific characters are included in the team members, scenario events are replaced with specific character events.

Specifically, the scenario events with the event IDs=0002, 0003, 0004, and 0005 are story events. In these story events, stories are played in which the team members consider the team name but the stories are finished without any team name finally being proposed. Therefore, in the case where the specific characters are not included in the team members, no team name is proposed in four consecutive turns.

Meanwhile, in the case where the specific characters are included in the team members, a number of scenario events corresponding to the number of specific characters are replaced with specific character events. The specific character events are story events. In the specific character events, stories are played in which team names are proposed by the specific characters. Four specific characters are provided, and different team names are proposed by the individual specific characters. Therefore, in the case where specific characters are included in the team members, the same number of team names as the number of specific characters are proposed in the 4th turn to the 7th turn.

Furthermore, the scenario event with the event ID=0006, which occurs in the 10th turn, is a story event. In this story event, a story is played in which the player is prompted to select a team name. Here, a total of five kinds of team names are provided, including a preset default name in addition to the four team names individually proposed by the four specific characters.

In the case where no specific character is included in the team members and no team name is proposed in the 4th turn to the 7th turn, the team name that can be selected by the player in the 10th turn is only the default team name. In this case, the player has to select the default team name. As another example, in the case where two team name are proposed in the 4th turn to the 7th turn, the player can select one of a total of three kinds of team names, namely, the two proposed team names and the default team name.

The team name selected by the player in the 10th turn is registered as an official team name, and is subsequently used in various scenes until the main nurturing game comes to an end. Note that a privilege corresponding to the registered team name may be granted to the player at a prescribed timing before the main nurturing game comes to an end. Examples of the privilege that is granted to the player include the acquisition of a skill corresponding to the registered team name, raising an ability parameter or an aptitude parameter, and the acquisition of an in-game currency.

As described above, the scenario events with the event IDs=0002, 0003, 0004, 0005, and 0006 and the specific character events that are replaced in the 4th turn to the 7th turn are both scenario-specific events. Each scenario ID is managed in association with the ID of an event that may occur. Therefore, the scenario events and the specific character events that may occur in the 4th turn to the 7th turn and the 10th turn are associated with only one scenario ID.

Furthermore, according to the event determination tables, the exclusive events 162*a* with the event IDs=1001 and 1002 occur in the 2nd turn and the 8th turn, respectively. Furthermore, according to the event determination tables, whether or not one of the exclusive events 162*a* is to occur as well as the exclusive event 162*a* that is to occur in the 3rd turn to the 7th turn, the 9th turn, the 11th turn, and the 12th turn are determined through lotteries.

Here, the exclusive events 162*a* vary among individual characters. Furthermore, the relationship between the number of turns and the exclusive event 162*a* that is to occur is set for each character. Therefore, the turn in which each exclusive event 162*a* occurs and the exclusive event 162*a* that occurs in each turn vary depending on the character registered as the main character.

Furthermore, in the event determination tables, as shown in FIG. 23, it is set that whether or not a support event is to occur, as well as the content of the support event that is to occur, are determined through lotteries in prescribed turns. Note that also for support events, event IDs that may win lotteries may vary among individual turns or may be the same among all the turns.

The probability of "occurrence" being determined in the lottery for determining whether or not a support event is to occur is not influenced by the registered support card. In other words, the probability of determining that a support event is to occur in each turn is the same irrespective of which support card is registered. Meanwhile, in the case where the "occurrence" of a support event is determined, the content of the support event is determined; at this time, the probability of the content of the support event being determined varies depending on the registered support card.

Specifically, in the case where the "occurrence" of a support card is determined, the event IDs of support events that may occur in the relevant turn are extracted on the basis of the event-content determination table. Then, a lottery table is generated on the basis of the extracted event IDs, and one event ID is determined on the basis of the generated lottery table.

Note that the event IDs that are extracted may include the event IDs of the support events associated with the registered support cards as well as the event IDs of support cards not associated with the registered support cards. In this case, in the lottery table, the winning probabilities of the event IDs of the support events associated with the registered support cards are set to be higher than the winning probabilities of the event IDs of the support events not associated with the registered support cards. Accordingly, the support events associated with the registered support cards are more likely to occur than the other support events.

As described above, in each turn, while the probability of occurrence of each support event is not influenced by the registered support card, the content of the support event that occurs is influenced by the registered support card.

Note, however, that the probability itself of the occurrence of each support event or the content (kind) itself of the support event that occurs may be varied depending on the registered support card. That is, the number of events that occur during the main nurturing game or the probabilities of occurrence of events may be varied among the registered support cards.

Furthermore, in each turn, whether or not a team member event is to occur, etc. are determined through a lottery. The team member event determined through a lottery is limited to a special training event. The special training event will be described below in detail.

Figure 24A:
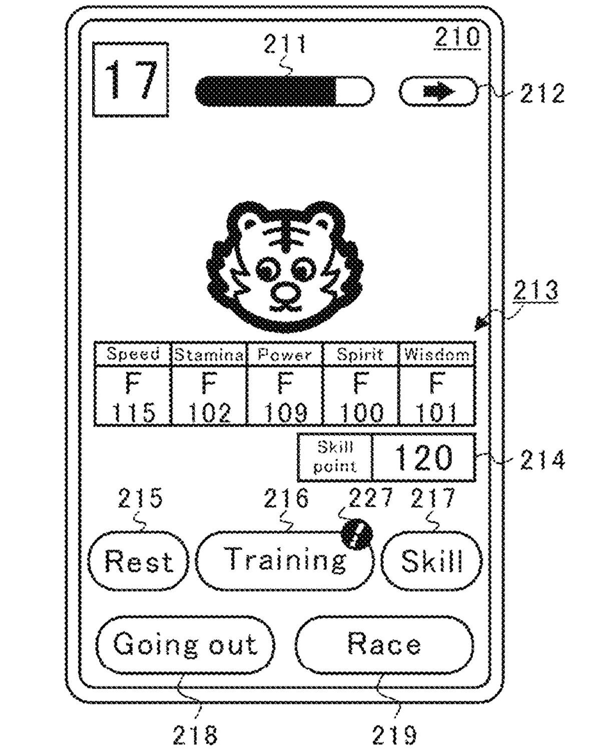
FIG. 24A is a third illustration for explaining the game screen.

FIG. 24A is a third illustration for explaining the game screen 210. FIG. 24A shows the case where a special training event occurs in the relevant turn. In this case, as shown in FIG. 24A, the event-report indication 227 is displayed in the training operating part 216 of the game screen 210.

Figure 24B:
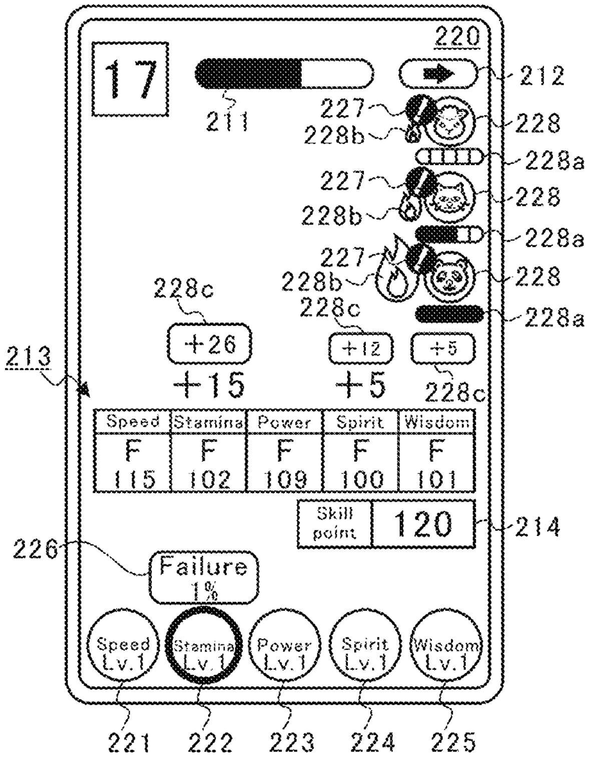
FIG. 24B is a third illustration for explaining the training screen.

FIG. 24B is a third illustration for explaining the training screen 220. When the training operating part 216 in the game screen 210 is operated, the training screen 220 is displayed on the display 26. In the case where the special training event occurs in relation to the character displayed in one of the assigned character icons 228 in the training screen 220, the event-report indication 227 is displayed in the assigned character icon 228 of the corresponding character.

Furthermore, as shown in FIG. 24B, for each of the assigned character icons 228 of characters assigned to training, a bond gauge 228*a* and a special icon 228*b* are displayed. The bond gauge 228*a* indicates a parameter (hereinafter referred to as a bond parameter) that is raised in accordance with the number of times of execution of joint training with the character of the corresponding team member. The bond parameter is initially set to 0, and is raised up to 100 at most. The bond gauge 228*a* visually indicates the value of the bond parameter.

Furthermore, the special icon 228*b* indicates the number of times of execution of the special training event relating to the character of the corresponding team member. As will be described later in detail, the special icon 228*b* is indicated in a display mode corresponding to the number of times of the special training event executed in relation to the character of the assigned character icon 228 for which the special icon 228*b* is displayed.

Figures 25A, 25B, 25C:
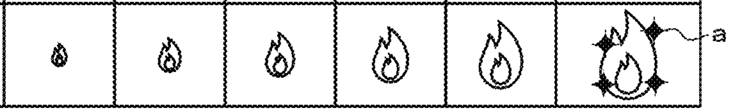
FIG. 25A is a figure for explaining a special-training-event execute/do-not-execute determination table.
FIG. 25B is a figure for explaining a special-icon determination table.
FIG. 25C is a figure for explaining a bonus-icon determination table.

FIG. 25A is a figure for explaining a special-training-event execute/do-not-execute determination table. In the case where it is determined that team members are to be assigned to each training item, on the basis of the special-training-event execute/do-not-execute determination table, whether or not to execute a special training event is determined through a lottery for each of the team members assigned to each training item. Hereinafter, a team member for whom it is determined that a special training event is to be executed will also be referred to as a team member subject to special training.

Specifically, as shown in FIG. 25A, the probabilities of selection as to whether or not a special training event is to be executed are set on the basis of the values of the bond parameters of the team members subject to special training. Here, the probabilities of selection are set such that the execution of a special training event is more likely to be selected as the value of the bond parameter becomes greater. Note that the same number of special training events as the number of team members who have won lotteries may occur.

However, a limit may be set for the number of team members subject to training that may occur simultaneously for each single training item.

FIG. 25B is a figure for explaining a special-icon determination table. A special training event includes an execution pattern for "success" and an execution pattern for "great success". In the case where a special training event is executed for the fifth time for each team member subject to special training, the exclusive event is necessarily executed according to the execution pattern for "great success". Meanwhile, in the case where a special training event is executed not for the fifth time for each team member subject to special training, the special training event is necessarily executed according to the execution pattern for "success". That is, for each single team member subject to special training, it is possible to execute a special training event according to the execution pattern for "great success" only once. Note that the event-report indication 227 may be displayed in different modes depending on the content of the special training event executed (the execution pattern for "success" or the execution pattern for "great success") or the number of team members for whom the execution of the special training event has been determined.

As shown in FIG. 25B, in the case where the number of times of execution of a special training event for each team member subject to special training is zero to four, i.e., in the case where the special training event has not yet been executed according to the execution pattern for "great success", the special icon 228*b* is displayed in a greater size as the number of times of execution of the special training event becomes greater.

Whether to execute a special training event according to the execution pattern for either "great success" or "success" may be determined through a lottery. In this case, the lottery probabilities may be set such that the execution pattern for "great success" is more likely to be selected as the number of times of execution of the special training event for a team member subject to special training becomes greater. In this case, since the execution pattern for "great success" is more likely to be selected as the size of the special icon 228*b* becomes larger, the special icon 228*b* indicates the likelihood of the execution pattern for "great success" being selected.

Furthermore, after a special training event is executed according to the execution pattern for "great success", i.e., in the case where the number of times of execution of the special training event for a team member subject to special training is greater than or equal to five, the special icon 228*b* is displayed in a size larger than in the case where the number of times of execution of the special training event for the team member subject to special training is zero to four. Furthermore, as shown in FIG. 25B, a suggestive indication a suggesting that the special training event has been executed according to the execution pattern for "great success" is displayed.

Furthermore, in the case where a special training event occurs and the execution pattern for the special training event is that for "success", the ability parameters of the team members subject to special training, as well as the ability parameters of the main character, are raised within prescribed ranges. Meanwhile, in the case where the execution pattern of the special training event is that for "great success", the ability parameters of the team members subject to special training, as well as the ability parameters of the main character, are raised beyond the abovementioned prescribed ranges.

Furthermore, as shown in FIG. 24B, in the case where it is determined that a special training event is to be executed, in the status displaying part 213 of the training screen 220, bonus icons 228*c* indicating the values by which the ability parameters of the main character are raised through the special training event are displayed.

FIG. 25C is a figure for explaining a bonus-icon determination table. The bonus icons 228*c* are displayed in different sizes depending on the values by which the ability parameters of the main character are raised through the special training event. Here, the bonus icons 228*c* are displayed in a larger size in the case where the values by which the ability parameters of the main character are raised through the special training event are 20 to 39 than in the case where the values are 0 to 19. Furthermore, the bonus icons 228*c* are displayed in a larger size in the case where the values by which the ability parameters of the main character are raised through the special training event are greater than or equal to 40 than in the case where the values are 20 to 39.

FIG. 26A is a figure for explaining a bonus fixed-value (main character) table. In the case where special training event described above is executed, the values by which the ability parameters of the main character are raised through the special training event (bonus fixed values) are determined in accordance with the number of team members for whom it has been determined that the special training event is to be executed. Here, as shown in FIG. 26A, it is set that the values by which the ability parameters of the main character are raised through the special training event (bonus fixed values) become greater as the number of team members for whom it has been determined that the special training event is to be executed becomes greater.

FIG. 26B is a figure for explaining a bonus additional-value (main character) table. In the case where the special training event is executed according to the execution pattern for "great success", in addition to the bonus fixed values described above, the values by which the ability parameters of the main character are raised through the special training event according to the execution pattern for "great success" (bonus additional values) are determined. Here, as shown in FIG. 26B, the values by which the ability parameters of the main character are raised (bonus additional values) are set depending on favorite training of the team members for whom the special training event is executed according to the execution pattern for "great success". That is, the values by which the ability parameters of the main character are raised through the special training event are the sums of the bonus fixed values described above and the bonus additional values.

FIG. 27A is a figure for explaining a fixed raising-value (special training subjects) table. In the case where the special training event described above is executed, the values by which the ability parameters of the team members subject to special training are raised through the special training event (fixed raising values) are determined. Here, as shown in FIG. 27A, the ranges of the values by which the ability parameters of the team members subject to special training (fixed raising values) are set depending on the kind of training executed. Here, values within the ranges set in FIG. 27A (fixed raising values) are determined through lotteries.

FIG. 27B is a figure for explaining a bonus raising-value (special training subjects) table. In the case where the special training event is executed according to the execution pattern for "great success", in addition to the fixed raising values described above, the values by which the ability parameters of the team members subject to special training are raised through the special training event (bonus raising values) are determined. Here, as shown in FIG. 27B, the values by which the ability parameters of the team members subject to special training are raised (bonus raising values) are set depending on favorite training of the team members subject to special training, for whom the special training event is executed according to the execution pattern for "great success".

Note that in the case where the special training event is executed according to the execution pattern for "great success", depending on the number (number of times) of exclusive events simultaneously executed according to the execution pattern for "great success", raising events for further raising the ability parameters of the team members subject to special training or the ability parameters of the main character in addition may be executed. For example, the arrangement may be such that as the number (number of times) of special training events simultaneously executed according to the execution pattern for "great success" becomes greater, the values by which the ability parameters of the team members subject to special training or the ability parameters of the main character are further raised in addition become greater.

As described above, when a special training event occurs, the ability parameters of the main character and the team members subject to special training are raised. Note that in the case where the main character or one of the team members subject to special training is a specific character, the fixed raising values or the bonus raising values may be multiplied by a prescribed addition rate. That is, the ability parameters are raised by greater values in the case where the main character or one of the team members subject to special training is a specific character than in the case where the character is not a specific character.

As described above, in the main nurturing game, the player can increase team members as turns proceed. Furthermore, the player can raise the ability parameters of the main character and the team members as the turns proceed. The ability parameters are raised with successful training or the occurrence of various kinds of events. As described earlier, in training, a bonus additional value is added if a specific character is assigned to a training item.

Furthermore, although not described in detail, in the case where the main character or a support character is a specific character, a prescribed bonus additional value is added when an ability event occurs. Therefore, the player can advantageously proceed with the main nurturing game by registering a specific character as the main character or a support character.

Furthermore, in the case where a specific character is included in team members, a specific character event occurs in each branch turn. Therefore, the player can expand options in the game by registering a specific character as the main character or a support character, which makes it possible to improve the fun of the game.

When all the turns are finished in the main nurturing game described above, the nurturing game comes to an end. When the nurturing game comes to an end, the main character nurtured in the nurturing game is stored as a nurtured character. More strictly, information concerning the nurtured character nurtured in the nurturing game (hereinafter referred to as nurtured character information) is stored in association with the player ID. As will be described later, the nurtured character information stored in association with the player ID includes ability parameters, aptitude parameters, acquired skills, inheritance information, etc.

(Team Competition Game)

Next, the team competition game will be described. For example, when the team-stadium-screen selection operating part 102*d* of the menu bar 102 is tapped in the home screen 100, a team stadium screen is displayed. The player can play the team competition game or a practice match, which will be described later, by inputting an operation in the team stadium screen.

Figure 28A:
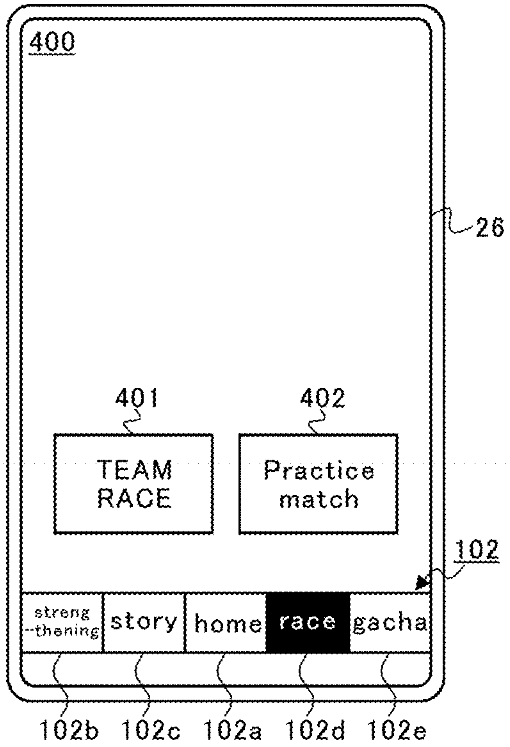
FIG. 28A is a first illustration for explaining a team stadium screen.
Figure 28B:
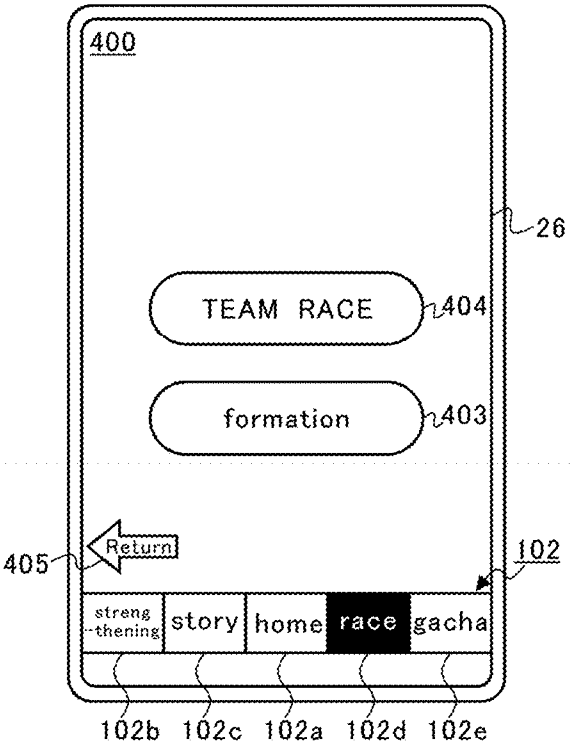
FIG. 28B is a second illustration for explaining the team stadium screen.

FIG. 28A is a first illustration for explaining a team stadium screen 400. FIG. 28B is a second illustration for explaining the team stadium screen 400. When the team-stadium-screen selection operating part 102*d* is tapped, the team stadium screen 400 shown in FIG. 28A is displayed. In the team stadium screen 400, a team-competition-game selection operating part 401 and a practice-match selection operating part 402 are displayed.

When the team-competition-game selection operating part 401 is tapped, as shown in FIG. 28B, a formation selection operating part 403, a team-competition-game start operating part 404, and a return operating part 405 are displayed in the team stadium screen 400. When the return operating part 405 is tapped, a screen transition to the team stadium screen 400 shown in FIG. 28A occurs. When the formation selection operating part 403 is tapped, a team formation screen 410 is displayed on the display 26.

Figure 28C:
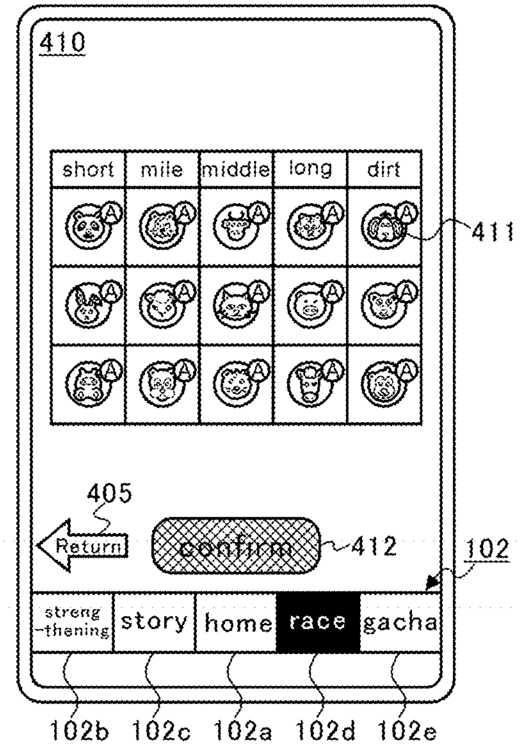
FIG. 28C is an illustration for explaining a team formation screen.

FIG. 28C is an illustration for explaining the team formation screen 410. In the team formation screen 410, the player can form a team that is used in the team competition game. The team competition game includes five kinds of races, namely, a short distance race, a mile race, an intermediate distance race, a long distance race, and a dirt race. Each of these races is played in the form of a battle between the team formed by the player (hereinafter referred to as the player team) and a team selected by the player as an opponent (hereinafter referred to as the opponent team). In each of the five kinds of races, the team to which the character placed first belongs wins. Furthermore, the player wins in the case where the number of victories for the player team is greater than the number of victories for the opponent team.

In the team formation screen 410, the player can individually form a short distance team for the short distance race, a mile team for the mile race, an intermediate distance team for the intermediate distance race, a long distance team for the long distance race, and a dirt team for the dirt race. The maximum number of characters that can be registered in each team is three. The player can register nurtured characters nurtured by the player himself or herself in the teams. Hereinafter, a nurtured character registered in a team will be referred to as a registered character.

As shown in FIG. 28C, in the team formation screen 410, character icons 411 corresponding to registered characters are displayed for each team. When one of the character icons 411 is tapped, the registered character corresponding to the tapped character icon 411 becomes tentatively selected, and a nurtured-character list screen 420 is displayed on the display 26.

Figure 28D:
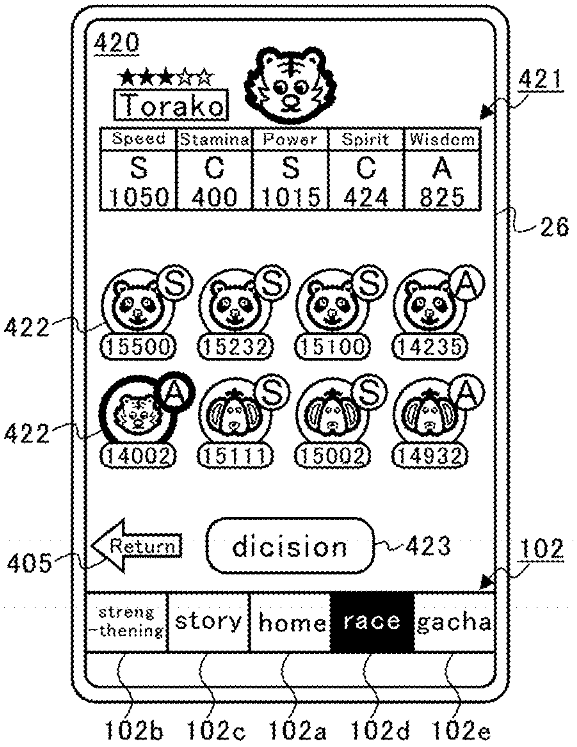
FIG. 28D is an illustration for explaining a nurtured-character list screen.

FIG. 28D is an illustration for explaining the nurtured-character list screen 420. The player can select a registered character in the nurtured-character list screen 420. Specifically, in an upper part of the nurtured-character list screen 420, an image of the tentatively selected nurtured character as well as an ability-parameter display field 421 are displayed. In the ability-parameter display field 421, the ability parameters of the tentatively selected nurtured character are displayed.

Furthermore, under the ability-parameter display field 421, nurtured-character icons 422 corresponding to nurtured characters possessed by the player are displayed. When one of the nurtured-character icons 422 is tapped, the nurtured character corresponding to the tapped nurtured-character icon 422 becomes tentatively selected. When tentatively selected nurtured character is changed, as described above, what is displayed in the ability-parameter display field 421 is also changed at the same time.

In the nurtured-character list screen 420, a decision operating part 423 is provided. When the decision operating part 423 is tapped after a nurtured character that is different from a registered character becomes tentatively selected in the nurtured-character list screen 420, the registered character is changed. When the registered character is changed, the team formation screen 410 shown in FIG. 28C is displayed. At this time, the character icon 411 corresponding to the registered character after the change is displayed in the team formation screen 410.

In the team formation screen 410, a confirmation operating part 412 is provided. As shown in FIG. 28, the confirmation operating part 412 is displayed in a grayed-out manner in the state where the registered character has not been changed. In this state, the operation of the confirmation operating part 412 is disabled. Meanwhile, in the state where the registered character has been changed, the operation of the confirmation operating part 412 is enabled. When an operation is accepted by the confirmation operating part 412, the changing of the registered character is confirmed.

Note that a return operating part 405 is provided in the team formation screen 410 and the nurtured-character list screen 420. When the return operating part 405 is tapped in the team formation screen 410, the team formation screen 410 shown in FIG. 28B is displayed. Note that the return operating part 405 is tapped in the state where the registered character has been changed, the changing of the registered character is canceled. Therefore, in this case, the registered character is not changed, and the team formation screen 410 is displayed.

Furthermore, when the return operating part 405 is tapped in the nurtured-character list screen 420, the nurtured-character list screen 420 shown in FIG. 28C is displayed. Note that in the case where the return operating part 405 is tapped in the state where the registered character has been changed, the changing of the registered character is canceled. Therefore, in this case, the registered character is not changed, and the team formation screen 410 is displayed.

Meanwhile, in the case where one of the character icons 411 is held in the team formation screen 410 and in the case where one of the nurtured-character icons 422 is held in the nurtured-character list screen 420, a character detail dialog 430 is displayed on the display 26.

Figure 29A:
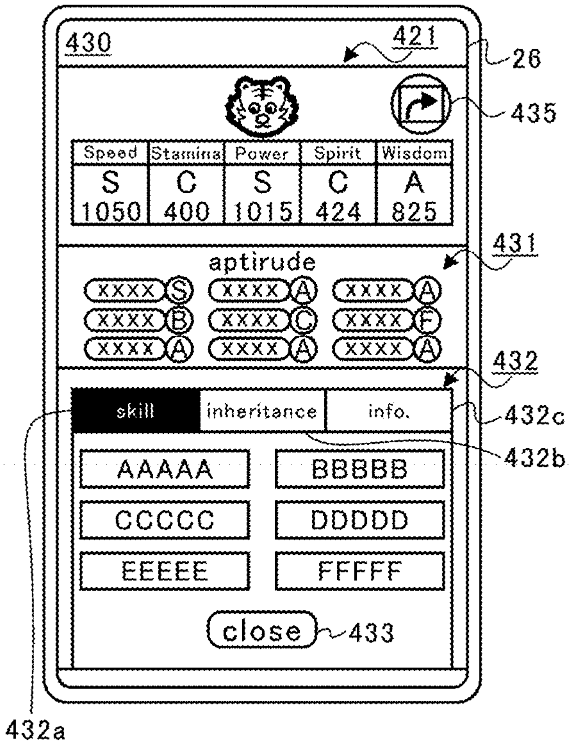
FIG. 29A is a first illustration for explaining a character detail dialog.
Figure 29B:
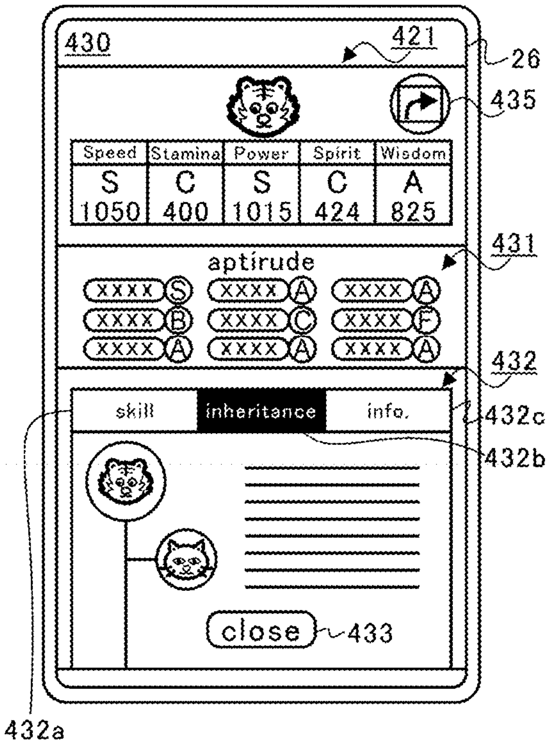
FIG. 29B is a second illustration for explaining the character detail dialog.
Figure 29C:
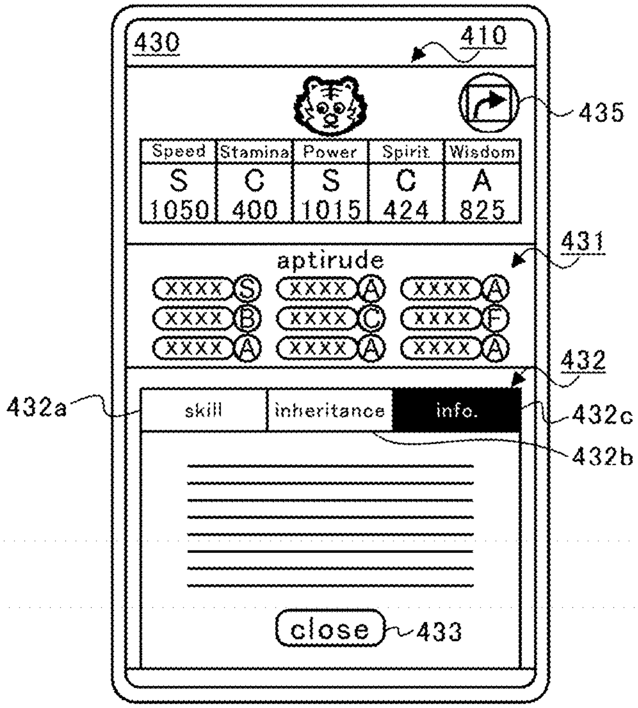
FIG. 29C is a third illustration for explaining the character detail dialog.

FIG. 29A is a first illustration for explaining the character detail dialog 430. FIG. 29B is a second illustration for explaining the character detail dialog 430. FIG. 29C is a third illustration for explaining the character detail dialog 430. In the character detail dialog 430, detailed information concerning the nurtured character corresponding to the character icon 411 or the nurtured-character icon 422 operated and held is displayed. In an upper part of the character detail dialog 430, an ability-parameter display field 421 is displayed.

Furthermore, under the ability-parameter display field 421, an aptitude-information display field 431 is displayed. In the aptitude-information display field 431, aptitude parameters concerning individual track aptitudes for turf and dirt, aptitude parameters concerning individual distance aptitudes for short distance, mile, intermediate distance, and long distance, and aptitude parameters concerning individual running-style aptitudes for early speed, front running, stretch running, and closing are displayed.

Under the aptitude-information display field 431, a various-kinds-of-information display field 432 is displayed. In the various-kinds-of-information display field 432, a skill display tab 432*a*, an inheritance-information display tab 432*b*, and a nurturing-information display tab 432*c* are provided. When the skill display tab 432*a* is tapped, as shown in FIG. 29A, the acquired skills of the nurtured character are displayed in the various-kinds-of-information display field 432. Meanwhile, when the inheritance-information display tab 432*b* is tapped, as shown in FIG. 29B, the inheritance information of the nurtured character is displayed. Note that the inheritance information includes information concerning the two characters to inherit, set in the setting game in the nurturing game when nurturing the relevant raised character.

Meanwhile, when the nurturing-information display tab 432*c* is tapped, as shown in FIG. 29C, the nurturing information of the nurtured character is displayed. Note that the nurturing information includes the kinds of support cards set in the setting game in the nurturing game when nurturing the relevant nurtured character, as well as an evaluation score calculated by using the records of individual races in the nurturing game and various kinds of parameters such as the ability parameters.

As described above, the character detail dialog 430 makes it possible for the player to confirm various kinds of information concerning nurtured characters. Although not described in detail, the character detail dialog 430 can be displayed from various screens in which nurtured characters can be displayed, without limitation to the team formation screen 410 and the nurtured-character list screen 420. For example, it is possible to display the character detail dialog 430 also in the case where a prescribed operation is input in the strengthening screen or the main-character selection screen 150 in the nurturing game. Note that a close operating part 433 is provided in the character detail dialog 430. When the close operating part 433 is tapped, the character detail dialog 430 is closed, and the preceding screen is displayed on the display 26.

Meanwhile, when the team-competition-game start operating part 404 is tapped in the team stadium screen 400 shown in FIG. 28B, an opponent-team selection screen 440 is displayed. As will be described later in detail, when the team-competition-game start operating part 404 is tapped, opponent teams are extracted at the server 1000.

Figure 30A:
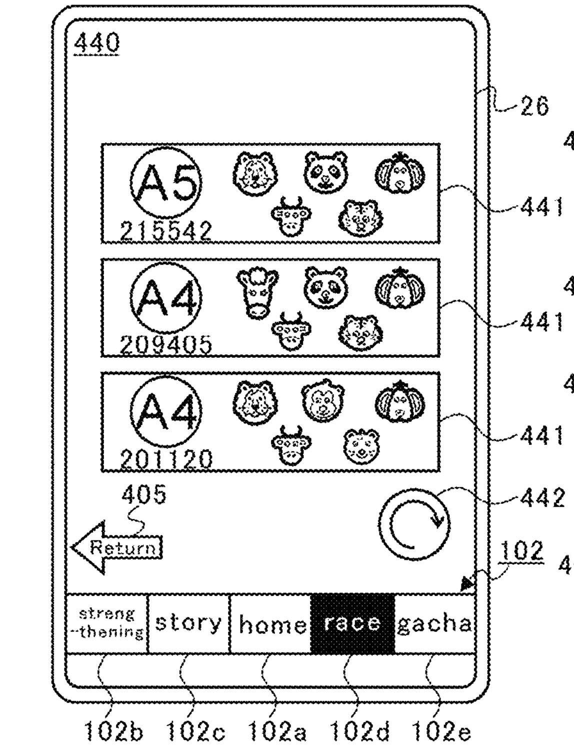
FIG. 30A is an illustration for explaining an opponent-team selection screen.

FIG. 30A is an illustration for explaining the opponent-team selection screen 440. In the opponent-team selection screen 440, opponent-team icons 441 corresponding to opponent teams are displayed. Here, three opponent teams are extracted at the server 1000. Therefore, three opponent-team icons 441 are displayed in the opponent-team selection screen 440. In each of the opponent-team icons 441, a total evaluation score of the team as well as a rank corresponding to the total evaluation score are shown. The total evaluation score is calculated by summing the evaluation scores, various kinds of aptitudes, etc. of all the registered characters included in the team.

At the server 1000, opponent teams are extracted on the basis of the total evaluation score of the currently set player team. Here, one team is extracted individually from teams having higher scores than the total evaluation score of the player team within a first range (e.g., within the range from +8000 to +10000), from teams with differences from the total evaluation score of the player team within a second range (e.g., within the range from −2000 to +2000), and from teams having scores lower than the total evaluation score of the player team within a third range (e.g., within the range from −8000 to −10000). Note that the teams extracted as opponent teams at this time are teams currently set by other players as their own player teams.

Furthermore, in each of the opponent-team icons 441, character images of the leaders of the five teams individually corresponding to the five kinds of races are displayed. The registered characters corresponding to the character icons 411 displayed in the uppermost rows for the individual teams in the team formation screen 410 are the leaders.

Furthermore, a reload operating part 442 is provided in a lower part of the opponent-team selection screen 440. When the reload operating part 442 is tapped, three opponent teams are again extracted at the server 1000, and the opponent-team icons 441 are changed. Note that when the return operating part 405 is tapped in the opponent-team selection screen 440, the team stadium screen 400 shown in FIG. 28B is displayed. Then, when one of the opponent-team icons 441 is tapped in the opponent-team selection screen 440, a start confirmation screen 450 is displayed.

Figure 30B:
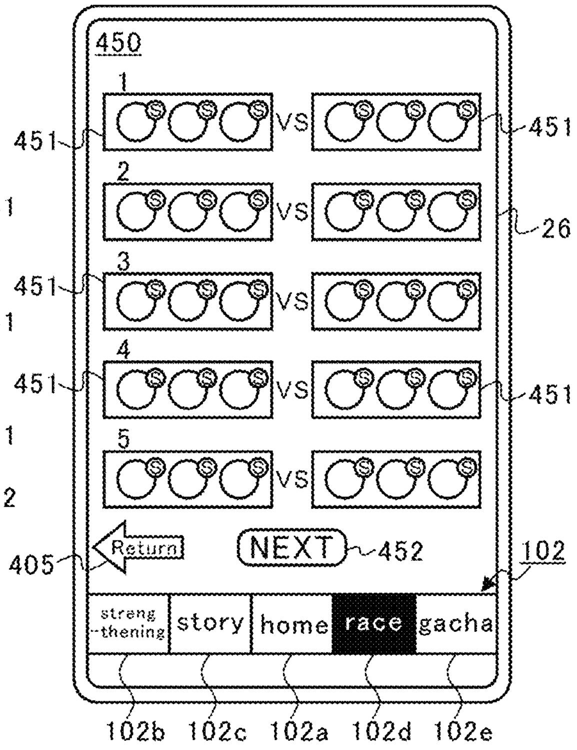
FIG. 30B is an illustration for explaining a start confirmation screen.

FIG. 30B is an illustration for explaining the start confirmation screen 450. In the start confirmation screen 450, for each of the five kinds of races, namely, the short distance race, the mile race, the intermediate distance race, the long distance race, and the dirt race, team icons 451 indicating the participating characters are shown. The team icons 451 are provided individually for the player team and the opponent team. Here, the team icons 451 for the player team are displayed on the left side of the start confirmation screen 450, and the team icons 451 for the opponent team are displayed on the right side of the start confirmation screen 450.

Furthermore, in a lower part of the start confirmation screen 450, a return operating part 405 and a start operating part 452 are provided. When the return operating part 405 is tapped, the team stadium screen 400 shown in FIG. 28B is displayed. Note, however, that even if a screen transition to the team stadium screen 400 occurs, the player cannot cancel the opponent teams once selected. Therefore, when the return operating part 405 is tapped in the start confirmation screen 450, the opponent teams are saved. Furthermore, when the team-competition-game start operating part 404 is tapped in the team stadium screen 400 in the state where the opponent teams have been saved, the start confirmation screen 450 shown in FIG. 30B is displayed again.

When the start operating part 452 is tapped in the start confirmation screen 450, a result list screen 460 is displayed.

Figure 30C:
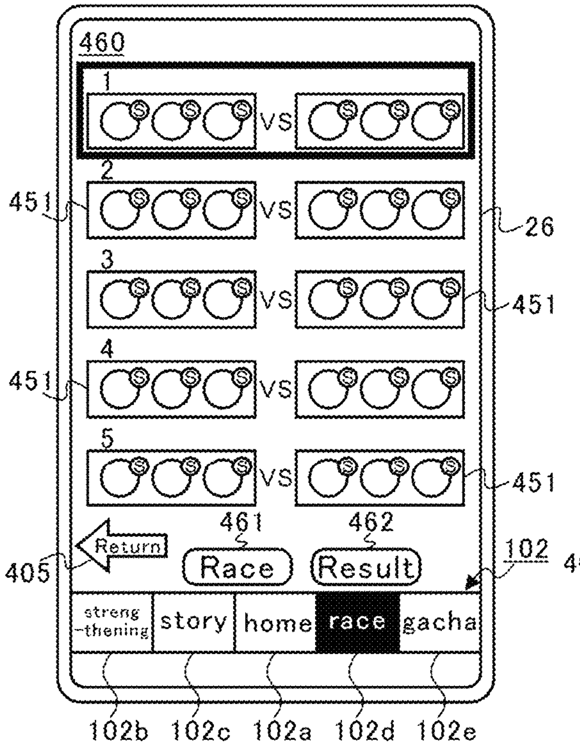
FIG. 30C is a first illustration for explaining a result list screen.
Figure 30D:
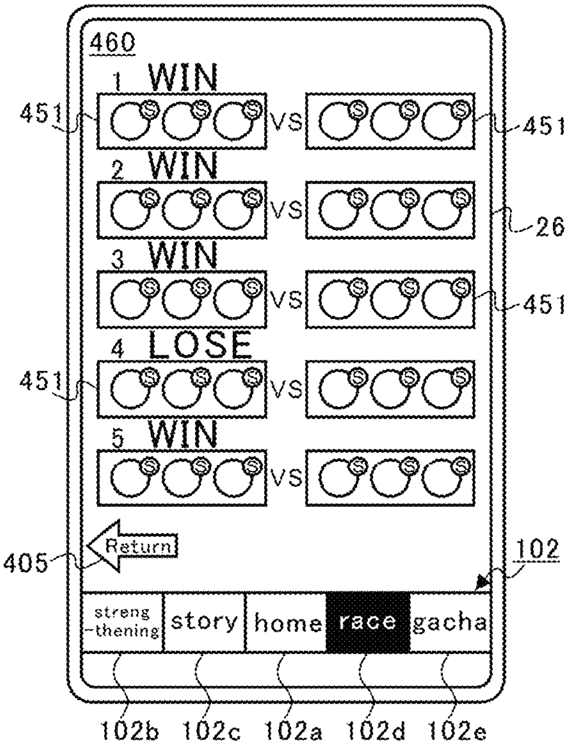
FIG. 30D is a second illustration for explaining the result list screen.

FIG. 30C is a first illustration for explaining the result list screen 460. FIG. 30D is a second illustration for explaining the result list screen 460. Also in the result list screen 460, similarly to the start confirmation screen 450, team icons 451 are displayed for the individual kinds of races, and the team icons 451 for the race for which the race result is to be displayed are displayed in a highlighted manner. In FIG. 30C, the team icons 451 for the first race, which is displayed uppermost, are displayed in a highlighted manner.

In a lower part of the result list screen 460, a race-video-play selection part 461 and a result-display selection part 462 are provided. When the race-video-play selection part 461 is tapped, a race video of the race displayed in a highlighted manner is played. Furthermore, when the playing of the race video is finished, as shown in FIG. 30D, a distinction as to whether the player team has won or has been defeated is displayed. Meanwhile, when the result-display selection part 462 is tapped, the race video is not played, and only the race results are displayed, as shown in FIG. 30D.

Note that when the race results are displayed, in the team icons 451, the individual places of the participating characters are displayed. Furthermore, although not described in detail, in the team competition game, point granting conditions for granting points to players are set. For example, the point granting conditions specify points to be granted on the basis of places, points to be granted in the case of consecutive victories by a team, etc. The points are reported to the player on a per-race basis, and the total points are reported when all the five kinds of races are finished. The team competition game is designed as a game in which the player competes for ranking with other players in terms of the total points.

As described above, in the team competition game, the player can form a team by using nurtured characters nurtured by the player and can play battles against teams formed by other players. Furthermore, since the player competes for ranking with other players in terms of the total points acquired through the battles, the player is given a motivation for nurturing stronger nurtured characters.

Here, in order to nurture stronger nurtured characters in the nurturing game, it is necessary to select more suitable support cards and characters to inherit. Thus, it is desired that the player collects information for nurturing stronger nurtured characters. In this embodiment, in the team competition game, it is possible to view the character detail dialog 430 for each of the registered characters of the opponent team by holding one of the team icons 451 of the opponent team displayed in the result list screen 460.

Thus, for example, the player can confirm the inheritance information and the nurturing information of nurtured characters having high evaluation scores in nurturing nurtured characters similar to registered characters of opponent teams. However, considering that the winning rates of nurtured characters having high evaluation scores are not necessarily high in the team competition game, it is difficult to obtain information for forming an optimal team. If it becomes difficult to obtain suitable information, as described above, the motivation for the player to play the game will be compromised.

Thus, in this embodiment, the player is allowed to play practice matches in which nurtured characters nurtured by other players participate. In such a practice match, the player can let nurtured characters possessed by the player himself or herself as well as nurtured characters possessed by other players participate in a desired race and can check the outcome of the race. This makes it easier for the player to obtain information for nurturing stronger nurtured characters. The following explains practice matches.

Figure 31A:
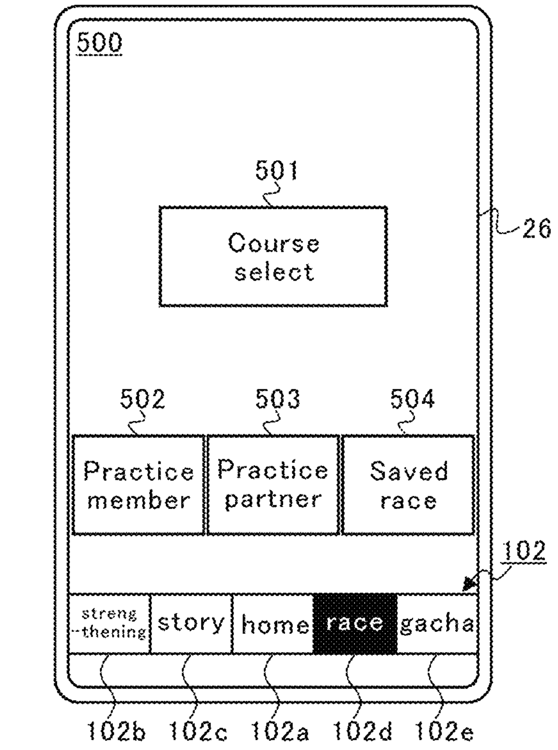
FIG. 31A is an illustration for explaining a practice-match top screen.

FIG. 31A is an illustration for explaining a practice-match top screen 500. When the practice-match selection operating part 402 is tapped in the team stadium screen 400 shown in FIG. 28A, the practice-match top screen 500 shown in FIG. 31A is displayed. The player can set various kinds of race conditions, such as the course, the characters to participate in a race, etc. from the practice-match top screen 500. When a course selection operating part 501 is tapped in the practice-match top screen 500, a race-condition setting screen, which is not shown, is displayed.

FIG. 32 is a figure for explaining race conditions. The player can arbitrarily set race conditions in the race-condition setting screen. Specifically, the player can select a course in which a race is to be run from existing courses or can set a course individually. Furthermore, the player can set the number of participants to one of eleven to eighteen. Furthermore, the player can set the season to one of random, spring, summer, autumn, and winter. In the case where random is selected, the season is determined at random through a lottery when a race is started.

Furthermore, the player can set the weather and track conditions to one of random and the twelve patterns shown in the figure. Note that in the case where random is selected, the weather and track conditions are set at random through a lottery when a race is started. Furthermore, the player can set the character conditions to one of random and the five patterns shown in the figure. Note that in the case where random is selected, the character conditions are determined at random through a lottery when a race is started. Meanwhile, in the case where one of the patterns other than random is determined, the character conditions of all the participating characters are uniformly set to the selected character conditions. Furthermore, the player can set the strength of NPCs to one of the five patterns shown in the figure.

Figure 31B:
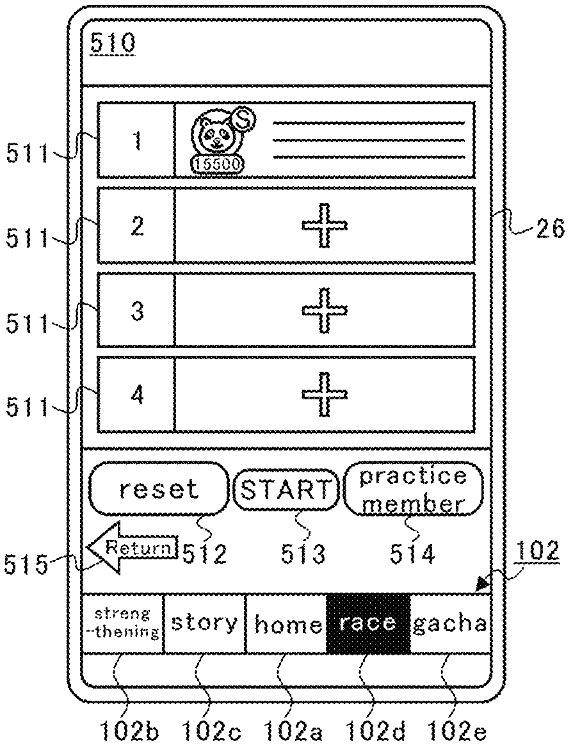
FIG. 31B is an illustration for explaining a participating-character setting screen.

FIG. 31B is an illustration for explaining a participating-character setting screen 510. When race conditions have been set in the race-condition setting screen, the participating-character setting screen 510 is displayed on the display 26. In the participating-character setting screen 510, character setting tabs 511, a reset operating part 512, a start operating part 513, a practice-member display operating part 514, and a return operating part 515 are displayed. The same number of character setting tabs 511 as the number of participants set in the race-condition setting screen are displayed. When the displaying of the participating-character setting screen 510 is started, all the character setting tabs 511 are displayed as being blank. When one of the character setting tabs 511 is tapped, a participating-character selection screen 520 is displayed.

Figure 31C:
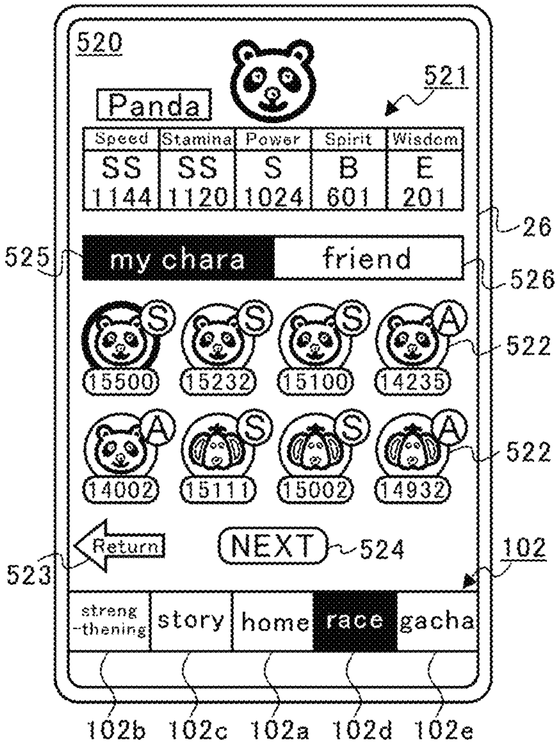
FIG. 31C is a first illustration for explaining a participating-character selection screen.
Figure 31D:
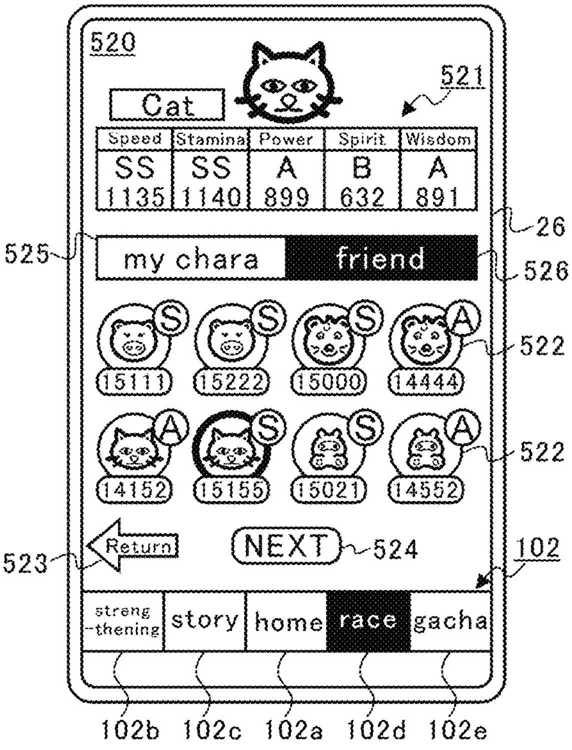
FIG. 31D is a second illustration for explaining the participating-character selection screen.

FIG. 31C is a first illustration for explaining the participating-character selection screen 520. FIG. 31D is a second illustration for explaining the participating-character selection screen 520. In the participating-character selection screen 520, the player can select characters to participate in the practice match. Specifically, in an upper part of the participating-character selection screen 520, an image of the tentatively selected nurtured character and an ability-parameter display field 521 are displayed. In the ability-parameter display field 521, the ability parameters of the tentatively selected nurtured character are displayed.

Furthermore, under the ability-parameter display field 521, nurtured-character icons 522 corresponding to the nurtured characters possessed by the player are displayed. When one of the nurtured-character icons 522 is tapped, the nurtured character corresponding to the tapped nurtured-character icon 522 becomes tentatively selected. When the tentatively selected nurtured character is changed, as described above, what is displayed in the ability-parameter display field 521 is also changed at the same time.

Furthermore, in the participating-character selection screen 520, a return operating part 523 and a next operating part 524 are provided. When the return operating part 523 is tapped, the participating-character setting screen 510 shown in FIG. 31B is displayed. In this case, the tentatively selected nurtured character is cancelled. Meanwhile, when the next operating part 524 is tapped, the tentatively selected nurtured character is set as a participating character. In this case, a screen transition occurs from the participating-character selection screen 520 to the participating-character setting screen 510. At this time, as shown in FIG. 31B, information concerning the nurtured character set as the participating character is displayed in the character setting tab 511.

Furthermore, in the participating-character selection screen 520, a my-character display tab 525 and a rental-character display tab 526 are provided. In the state where the my-character displaying tab 525 has been tapped, as shown in FIG. 31C, nurtured-character icons 522 corresponding to the nurtured characters possessed by the player are displayed. Meanwhile, in the state where the rental-character display tab 526 has been tapped, as shown in FIG. 31D, representative characters of friends or nurtured-character icons 522 corresponding to the characters registered as practice partners, which will be described later, are displayed.

The player can arbitrarily select a plurality of characters to participate in the practice match from the nurtured characters nurtured by the player himself or herself, the representative characters of friends, and the practice partners. Furthermore, when a specific number of characters, the specific number being greater than or equal to 2, have been set as participating characters, it becomes possible to execute the practice match. The specific number of characters may be an arbitrary one of or an arbitrary combination of a plurality of characters among the nurtured characters nurtured by the player himself or herself, the representative characters of friends, and the practice partners. As described above, the participating-character selection screen 520 makes it possible for the player to let nurtured characters nurtured by other players, as well as the nurtured characters possessed by the player himself or herself, participate in the practice match.

Note that when one of the nurtured-character icons 522 is held in the participating-character selection screen 520, the character detail dialog 430 described earlier is displayed. Therefore, the player can also confirm detailed information concerning the nurtured character from the participating-character selection screen 520.

As described above, the player can individually select a number of nurtured characters to participate in the practice match in the participating-character selection screen 520. Note that when the reset operating part 512 shown in FIG. 31B is tapped, the nurtured characters that have been set as characters to participate in the practice match are cancelled. Meanwhile, when the start operating part 513 is tapped in the state where a number of nurtured characters corresponding to the number of participants have been set, the practice match is started. Meanwhile, when the return operating part 515 is tapped, the nurtured characters that have been set are cancelled, and the race-condition setting screen is displayed.

Note that the work of individually setting a number of nurtured characters to participate in the practice match, corresponding to the number of participants, is laborious. Thus, in this embodiment, a practice-member registration function is provided, with which a practice member including a plurality of nurtured characters is registered and the registered practice member is read out as nurtured characters to participate in the practice match. When the practice-member display operating part 514 is tapped in the participating-character setting screen 510, a practice-member selection screen 530 is displayed.

Figure 33:
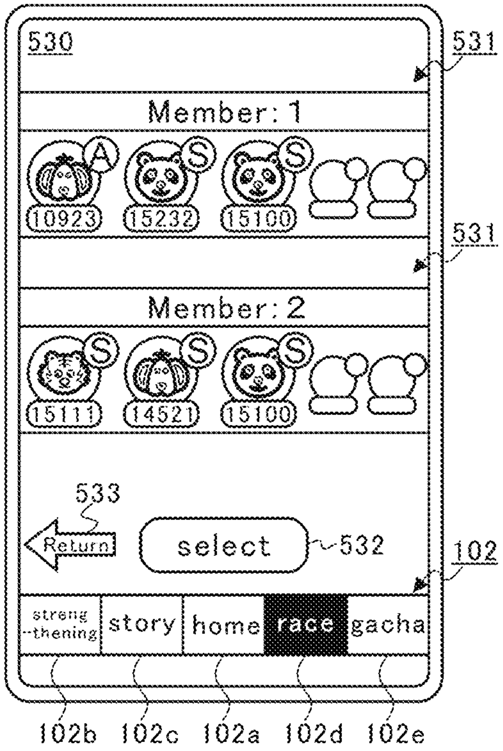
FIG. 33 is an illustration for explaining a practice-member selection screen.

FIG. 33 is an illustration for explaining the practice-member selection screen 530. As will be described later in detail, the player can register characters that have participated in the practice match simultaneously as a practice member. In the practice-member selection screen 530, practice-member display fields 531 are displayed. The practice-member display fields 531 are displayed for the individual registered members. In each of the practice-member display fields 531, icons corresponding to characters included in the practice member are displayed. In the case where one of the icons is held, similarly to the case described earlier, the character detail dialog 430 is displayed.

Furthermore, when one of the practice-member display fields 531 is tapped, the practice member corresponding to the practice-member display field 531 becomes tentatively selected. When a select operating part 532 provided in the practice-member selection screen 530 is tapped in the state where one of the practice members is tentatively selected, the characters included in the tentatively selected practice member are set as characters to participate in the practice match. More specifically, all the characters constituting the practice member are set as participating characters. In this case, a screen transition from the practice-member selection screen 530 to the participating-character setting screen 510 occurs. Note that when the return operating part 533 provided in the practice-member selection screen 530 is tapped, the tentatively selected practice member is canceled, and the participating-character setting screen 510 is displayed.

Furthermore, as shown in FIG. 31A, in the practice-match top screen 500, a practice-member operating part 502, a practice-partner operating part 503, and a saved-race operating part 504 are provided. When the practice-member operating part 502 is tapped, a practice-member list screen, which is not shown, is displayed. In the practice-member list screen, a list of registered practice members is displayed.

Furthermore, as described earlier, in this embodiment, a practice-partner registration function is provided, which makes it possible to register, as practice partners, nurtured characters nurtured by other players such as friends. The nurtured characters of the other players, registered as practice partners via the practice-partner registration function, are displayed in the participating-character selection screen 520.

Figure 34A:
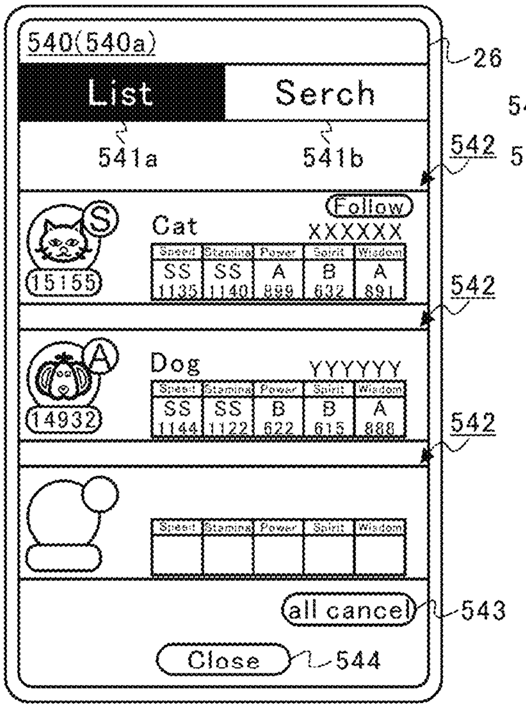
FIG. 34A is a first illustration for explaining a practice partner screen.
Figure 34B:
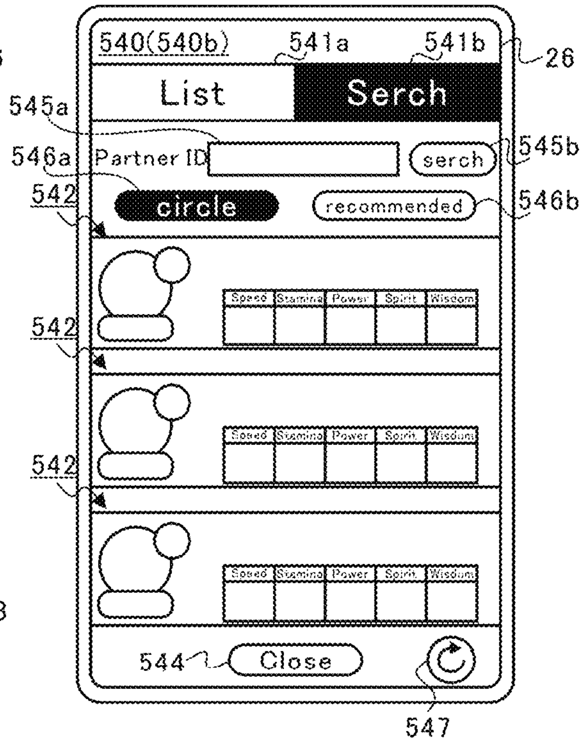
FIG. 34B is a second illustration for explaining the practice partner screen.
Figure 34C:
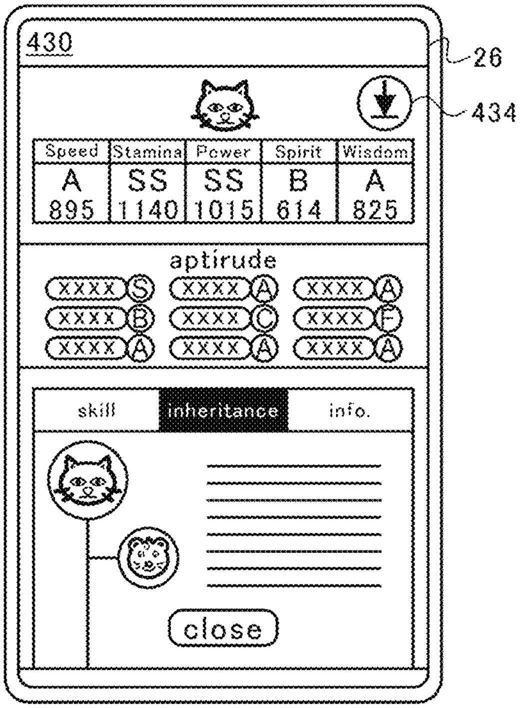
FIG. 34C is a fourth illustration for explaining the character detail dialog.

FIG. 34A is a first illustration for explaining a practice partner screen 540. FIG. 34B is a second illustration for explaining the practice partner screen 540. FIG. 34C is a fourth illustration for explaining the character detail dialog 430. When the practice-partner operating part 503 is tapped in the practice-match top screen 500 shown in FIG. 31A, the practice partner screen 540 is displayed. The practice partner screen 540 includes a practice-partner list screen 540*a* and a practice-partner search screen 540*b*. At the time of transition to the practice partner screen 540, the practice-partner list screen 540*a* is displayed on the display 26.

In the practice partner screen 540, a list tab 541*a* and a search tab 541*b* are provided. The practice-partner list screen 540*a* is displayed when the list tab 541*a* is tapped, and the practice-partner search screen 540*b* is displayed when the search tab 541*b* is tapped. In the practice-partner list screen 540*a*, an information display field 542 is displayed for each of the characters currently registered as practice partners (hereinafter referred to as partner characters).

In the information display field 542, the character image, the evaluation score, the rank, the character name, and the ability parameters of the partner character, as well as the player name of the player who nurtured the partner character, are displayed. Furthermore, for example, in the case where another player has a certain relationship with the player, such as a follower, information indicating the relationship between the player is displayed. For example, in the information display field 542 displayed in the uppermost row in FIG. 34A, "Follow" is displayed. This indicates that the partner character was nurtured by a player set as a follower.

Note that under the information display fields 542, a cancel operating part 543 is provided. The player can cancel the registration of partner characters by tapping the cancel operating part 543. Furthermore, when a close operating part 544 provided in the practice partner screen 540 is tapped, the practice partner screen 540 is closed, and a screen transition to the practice-match top screen 500 occurs.

Furthermore, as shown in FIG. 34B, in the practice-partner search screen 540*b*, an input field 545*a* in which it is possible to input a partner ID, as well as a search operating part 545*b*, are provided. As will be described later in detail, a partner ID is assigned to a nurtured character that a player has allowed another player to register as a practice partner. When the input field 545*a* is tapped, an input screen in which numerals can be input, which is not shown, is displayed. It is possible to input a partner ID to the input field 545*a* by inputting an operation to the input screen. When the search operating part 545*b* is tapped in the state where a partner ID has been input to the input field 545*a*, information concerning the nurtured character having the partner ID assigned thereto is displayed in the information display field 542.

Furthermore, in the practice-partner search screen 540*b*, a circle tab 546*a* and a recommendation tab 546*b* are provided. When the circle tab 546*a* is tapped, information concerning the representative characters of other players belonging to the same circle as the player is displayed in the information display field 542. Meanwhile, when the recommendation tab 546*b* is tapped, information concerning nurtured characters possessed by other players is displayed in the information display field 542 according to a prescribed search condition. Note that although there is no particular limitation to the search condition, for example, nurtured characters possessed by friends may be searched for.

In the practice-partner search screen 540*b*, a reload operating part 547 is provided. When the reload operating part 547 is operated, for example, the search condition is changed and searching is performed again.

When one of the information display fields 542 is tapped in the practice partner screen 540, as shown in FIG. 34C, the character detail dialog 430 is displayed. The character detail dialog 430 displayed at this time is the same as, for example, that in the case where one of the team icons 451 of the opponent team is held in the result list screen 460 (see FIG. 30D) displayed in the team competition game.

Here, the character detail dialog 430 is displayed both in the case where a nurtured character nurtured by the player himself or herself is selected and in the case where a nurtured character nurtured by another player is selected. At this time, different icons are displayed in the character detail dialog 430 depending on whether the nurtured character was nurtured by the player himself or herself or another player.

Specifically, in the character detail dialog 430 for a nurtured character nurtured by another player, a partner registration icon 434 is displayed. By tapping the partner registration icon 434, the player can register the nurtured character as a partner character.

Meanwhile, in the character detail dialog 430 for a nurtured character nurtured by the player himself or herself, as shown in FIGS. 29A and 29B, a share icon 435 is displayed. The share icon 435 is provided in order to let other players register the nurtured characters as a practice partner. The share icon 435 will be described later in detail.

Referring back to FIG. 31B, when the start operating part 513 is tapped in the state where all the participating characters have been set as described above in the participating-character setting screen 510, the practice match is started. When the start operating part 513 is tapped, a simulated result of the race is derived on the basis of the ability parameters of the participating characters, etc. Then, a race video is played on the basis of the derived simulated result. Note that similarly to the team competition game described earlier, also with the practice match, the player can select whether to play the race video or to display only the race result.

Figure 35A:
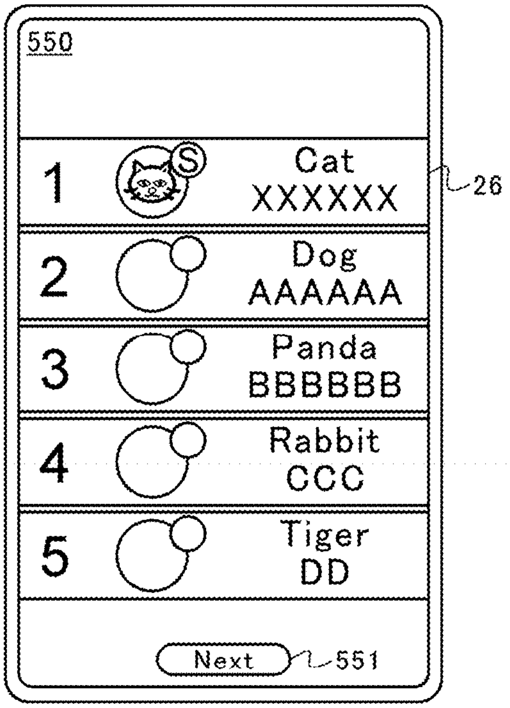
FIG. 35A is an illustration for explaining a practice-match result screen.

FIG. 35A is an illustration for explaining a practice-match result screen 550. When the playing of the race video is finished or an operation for displaying the race result is input, the practice-match result screen 550 shown in FIG. 35A is displayed. In the practice-match result screen 550, as shown in the figure, the places of the participating characters are displayed. Furthermore, when a next operating part 551 provided in the practice-match result screen 550 is tapped, a practice-member registration screen 560 is displayed.

Figure 35B:
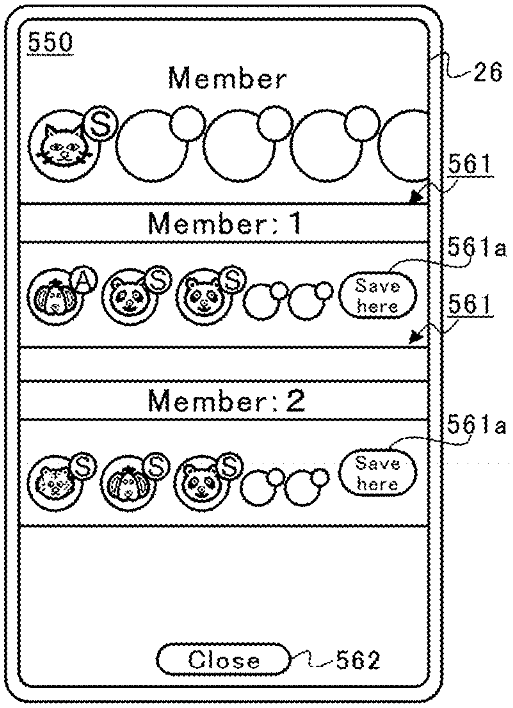
FIG. 35B is an illustration for explaining a practice-member registration screen.

FIG. 35B is an illustration for explaining the practice-member registration screen 560. In the uppermost row of the practice-member registration screen 560, individual icons for the characters that have participated in the current practice match, i.e., all the characters included in the current practice member, are displayed. Furthermore, in the practice-member registration screen 560, practice-member display fields 561 are displayed. The practice-member display fields 561 are displayed for the individual registered practice members. In each of the practice-member display fields 561, icons corresponding to the characters included in the practice member are displayed. Also in the case where this icon is held, similarly to the case described earlier, the character detail dialog 430 is displayed.

Furthermore, in each of the practice-member display fields 561, a save operating part 561*a* is provided. When the save operating part 561*a* is tapped, the currently registered practice member is overwritten with the current practice member. Specifically, in FIG. 35B, the practice-member display field 561 displayed in the upper row corresponds to a first currently registered practice member, and the practice-member display field 561 displayed in the lower row corresponds to a second currently registered practice member, which is different from the first member. Furthermore, when the save operating part 561*a* provided in the practice-member display field 561 in the upper row is tapped, the current practice member is registered as a new first practice member. Similarly, when the save operating part 561*a* provided in the practice-member display field 561 in the lower row is tapped, the current practice member is registered as a new second practice member.

After the practice match is finished and the practice-match result screen 550 is displayed, as described above, the player can register the practice member used in the current practice match. Then, when a close operating part 562 provided in the practice-member registration screen 560 is tapped, the practice-member registration screen 560 is closed, and a race-result saving dialog 570 is displayed.

Figure 35C:
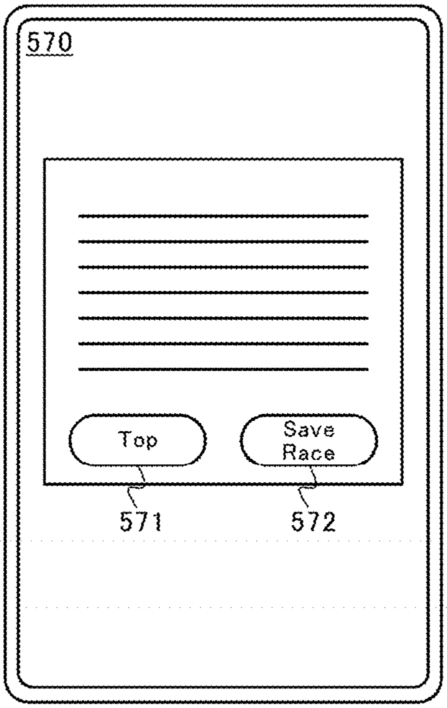
FIG. 35C is an illustration for explaining a race-result saving dialog.

FIG. 35C is an illustration for explaining the race-result saving dialog 570. In the race-result saving dialog 570, a quit button 571 and a race-result saving button 572 are provided. Furthermore, in the race-result saving dialog 570, a message to the effect that it is possible to save the race result is displayed. When the race-result saving button 572 is tapped, the race result of the current practice match is saved.

The player can repeatedly confirm the saved race result by tapping the saved-race operating part 504 in the practice-match top screen 500 shown in FIG. 31A. Here, the race result includes information concerning the participating characters, the result of a simulation, etc. The player can confirm only the race result or can play the race video. Note that when the quit button 571 is tapped in the race-result saving dialog 570, the race result of the current practice match is discarded, and the practice-match top screen 500 is displayed.

As described above, by executing a practice match, the player can obtain information for nurturing stronger nurtured character. Furthermore, since it is possible to play battles between nurtured characters nurtured by other players in the practice match, it is not necessary for the player himself or herself to possess strong nurtured characters. Thus, there is no bias in information that can be obtained among players, and all the players can equally obtain necessary information.

Furthermore, since it is possible to register practice members and practice partners, as described above, the convenience for the players is high. Furthermore, in this embodiment, an information sharing function is provided, which makes it easier to share information concerning nurtured characters that can participate in practice matches among a plurality of players. The information sharing function will be described below.

Figure 36A:
FIG. 36A is a first illustration for explaining an example circle screen.
Figure 36B:
FIG. 36B is a second illustration for explaining the example circle screen.

FIG. 36A is a first illustration for explaining an example of a circle screen 600. FIG. 36B is a second illustration for explaining an example of the circle screen 600. As described earlier, a circle icon 134 is provided in the home screen 100 (see FIG. 3A). When the circle icon 134 is tapped, the circle screen 600 shown in FIGS. 36A and 36B is displayed on the display 26.

In an upper part of the circle screen 600, the profile characters of the players belonging to the same circle are displayed. Furthermore, in a central part of the circle screen 600, messages posted via the circle function are displayed. The messages posted via the circle function are displayed on the player terminals 1 of the players belonging to the same circle.

In a lower part of the circle screen 600, a message input field 601 and a send operating part 602 are provided. When the message input field 601 is tapped, an input screen in which text can be input, which is not shown, is displayed. When an operation is input to the input screen, a message is displayed in the message input field 601. When the send operating part 602 is tapped in the state where a message has been input in the message input field 601, the message input to the message input field 601 is posted. When the message is posted, as shown in FIG. 36B, the posted message is displayed. Furthermore, the posted message is also displayed at the player terminals 1 belonging to the same circle.

As described above, the circle function makes it possible to send and receive messages among players belonging to the same circle. Furthermore, in this embodiment, the circle function makes it possible for the player to readily inform other players of information concerning the nurtured characters possessed by the player himself or herself.

Figure 37A:
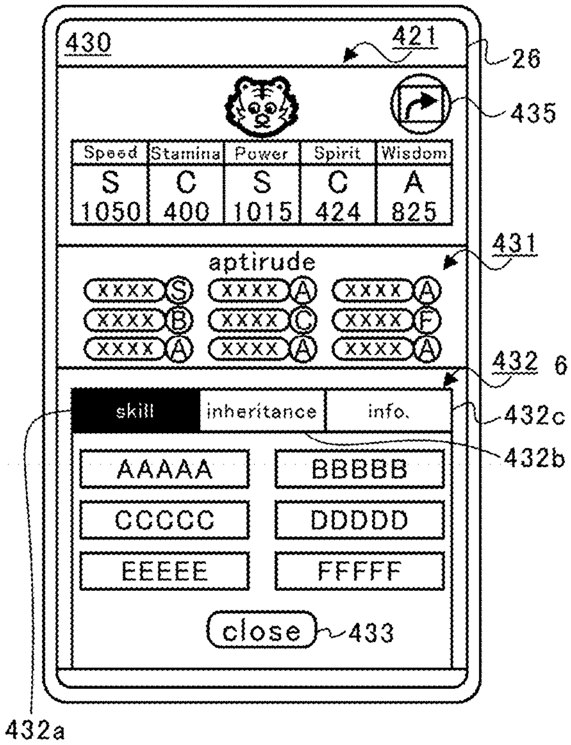
FIG. 37A is a fifth illustration for explaining the character detail dialog.

FIG. 37A is a fifth illustration for explaining the character detail dialog 430. As described earlier, in the character detail dialog 430 for a nurtured character possessed by the player himself or herself, a share icon 435 is displayed. When the share icon 435 is displayed, a sharing-method selection screen 610 is displayed.

Figure 37B:
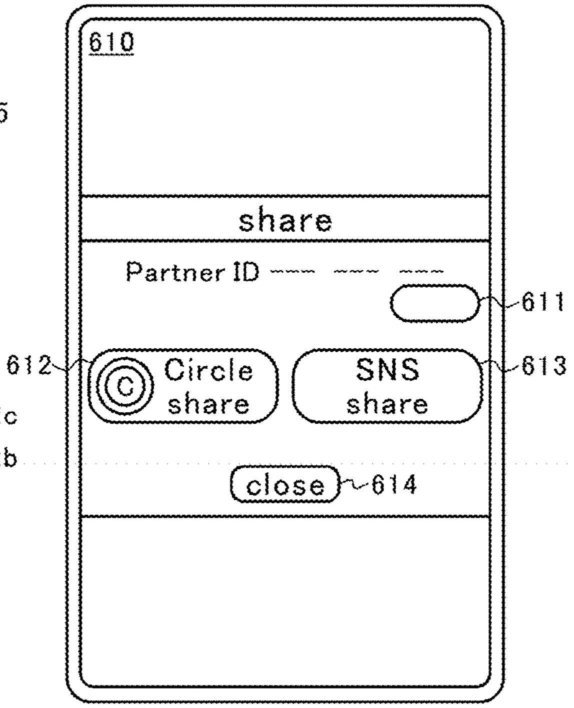
FIG. 37B is an illustration for explaining an example sharing-method selection screen.

FIG. 37B is an illustration for explaining an example of the sharing-method selection screen 610. In the sharing-method selection screen 610, an ID display field in which a partner ID is displayed is provided, and a partner-ID operating part 611 is displayed in proximity to the ID display field. The player can create a partner ID associated with the nurtured character displayed in the character detail dialog 430, nurtured by the player himself or herself. This partner ID is assigned in order to let other players share the nurtured character nurtured by the player himself or herself, and differs from the nurtured-character ID assigned to each nurtured character.

In the state where a partner ID has not been created for the nurtured character, as shown in FIG. 37B, a partner ID is not displayed in the ID display field. When the partner-ID operating part 611 is tapped in this state, a partner ID is created, and the created partner ID is displayed in the ID display field.

Note that an upper limit (e.g., twenty) is set for the number of partner IDs that can be created by a player per day. In the state where the number of partner IDs created has reached the upper limit, the partner-ID operating part 611 is displayed in a grayed-out manner. When the partner-ID operating part 611 displayed in a grayed-out manner is tapped, a dialog that is not shown is displayed, notifying the player that the number of partner IDs created has reached the upper limit.

Suppose that the search operating part 545*b* is tapped in the state where the partner ID created as described above has been input by another player in the input field 545*a* shown in FIG. 34B. In this case, the nurtured character is identified on the basis of the partner ID at the server 1000, and information concerning the identified nurtured character is displayed in the information display field 542. Note that the partner ID has an effective period set thereto, and the partner ID is invalidated when the effective period is over.

Meanwhile, suppose that the share icon 435 is tapped in the character detail dialog 430 for a nurtured character for which a partner ID has been created and the partner ID is effective. In this case, the sharing-method selection screen 610 shown in FIG. 37B is displayed, and the created partner ID is displayed in the ID display field at this time. Furthermore, when the partner-ID operating part 611 is tapped in this state, the partner ID is copied to the clipboard of the player terminal 1.

Note that the function for copying information to the clipboard may be a function of the player terminal 1 itself or may be a function of the application for executing the game in this embodiment. The partner ID copied to the clipboard can be pasted, for example, to the message input field 601 of the circle screen 600. As another example, the partner ID copied to the clipboard can be pasted in various applications on the player terminal 1.

Furthermore, in the sharing-method selection screen 610, a circle share button 612, an SNS share button 613, and a close operating part 614 are provided. When the circle share button 612 is tapped, the circle function is activated, and the circle screen 600 is displayed on the display 26. In this case, information concerning the nurtured character selected by the player is posted to the other players belonging to the same circle.

Figure 37C:
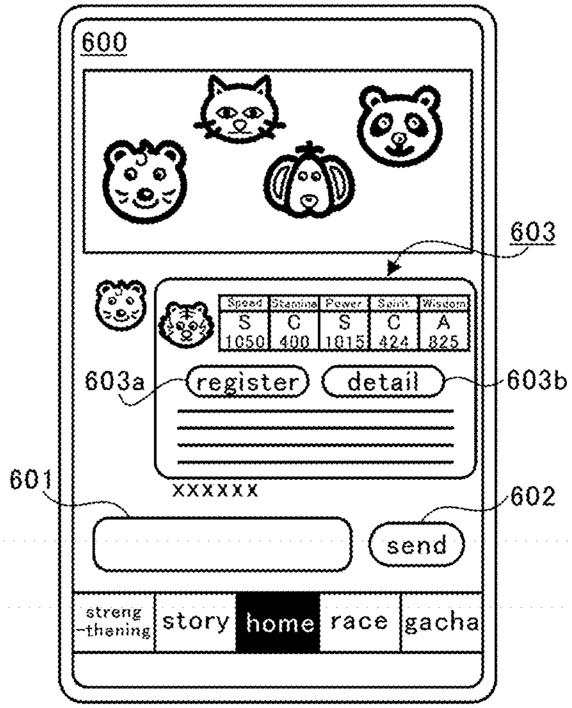
FIG. 37C is a third illustration for explaining the example circle screen.

FIG. 37C is a third illustration for explaining an example of the circle screen 600. FIG. 37C shows the circle screen 600 that is displayed on the player terminal 1 of another player in the case where the player has posted information concerning a nurtured character. In the circle screen 600 displayed on the player terminal 1 of the other player, a nurtured-character-information display field 603 is displayed. In the nurtured-character-information display field 603, information concerning a nurtured character selected by the player, in other words, a nurtured character selected for displaying the character detail dialog 430, is displayed.

Note that there is no particular limitation to the information that is displayed in the nurtured-character-information display field 603. Here, the ability parameters of the nurtured character selected by the player are displayed in the nurtured-character-information display field 603. Furthermore, in the nurtured-character-information display field 603, a register button 603*a* and a details button 603*b* are provided. When the register button 603*a* is tapped, the nurtured character is registered as a partner character, i.e., as a practice partner, on the player terminal 1 of the other player.

Meanwhile, when the details button 603*b* of the nurtured-character-information display field 603 is tapped, the character detail dialog 430 is displayed.

Figure 37D:
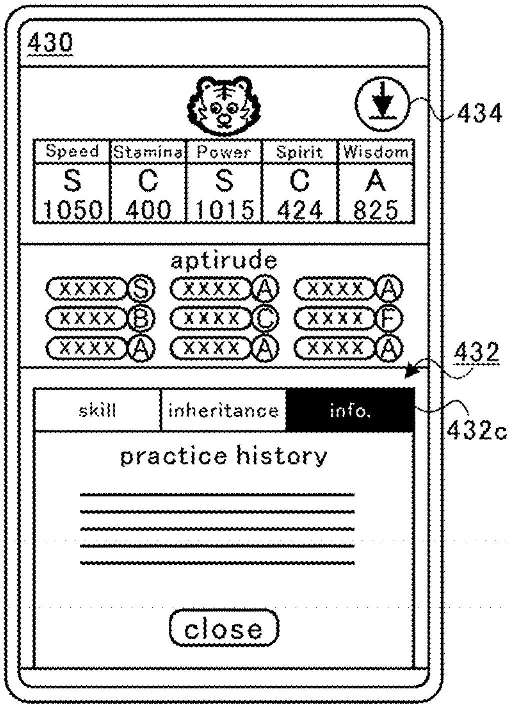
FIG. 37D is a sixth illustration for explaining the character detail dialog.

FIG. 37D is a sixth illustration for explaining the character detail dialog 430. FIG. 37D shows the character detail dialog 430 that is displayed on the player terminal 1 of another player in the case where the player has posted information concerning a nurtured character. When the details button 603*b* is tapped in the nurtured-character-information display field 603 in which information concerning a nurtured character nurtured by the other player is displayed, the character detail dialog 430 for the nurtured character nurtured by the other player is displayed. Therefore, in this case, a partner registration icon 434 is displayed in the character detail dialog 430. When this partner registration icon 434 is tapped, similarly to the case where the register button 603*a* in the nurtured-character-information display field 603 is tapped, the nurtured character is registered as a partner character, i.e., as a practice partner.

When the nurturing-information display tab 432*c* of the character detail dialog 430 is tapped, as shown in FIG. 37D, nurturing information of the nurtured character is displayed. The nurturing information displayed at this time includes history information concerning practice partners (partner characters) of the nurtured character. The history information may include the number of times of participation in a practice match as a practice partner, the records of battles, the number of players who have registered the nurtured character as a practice partner, etc. As described above, history information concerning a practice partner serves as a criterion for other players in determining whether or not to register the character as a practice partner.

Note that the history information concerning a practice partner may be displayed in the character detail dialog 430 for a nurtured character nurtured by the player himself or herself. Alternatively, the history information concerning a practice partner may be displayed only in the character detail dialog 430 for a nurtured character nurtured by another player.

As described above, the player can post various kinds of information concerning nurtured characters via the circle function. Furthermore, the player can readily obtain information concerning nurtured characters nurtured by other players. Furthermore, the player can register nurtured characters nurtured by other players as partner characters and can readily let the partner characters participate in practice matches.

Referring back to FIG. 37B, when the SNS share button 613 is tapped in the sharing-method selection screen 610, the information concerning the nurtured character is expanded in a social networking service (SNS) tool. By selecting an SNS tool, the player can post the information concerning the nurtured character to the selected SNS tool and can let other users view the information.

As an example, when the SNS share button 613 is tapped in the state where a partner ID has not been created, first, a partner ID is created. Then, a prescribed SNS tool is activated, and a URL associated with the partner ID is input in a posting area of the SNS tool. This makes it possible for the player to share the URL with other players via the SNS tool. Note that when the URL is input to a browser or a like at a terminal having the game application according to this embodiment, the game application is activated, and the character detail dialog 430 shown in FIG. 37D is displayed on the basis of the partner ID associated with the URL. Note that when the close operating part 614 is tapped, the sharing-method selection screen 610 is closed, and the immediately preceding screen is displayed.

Next, the functional configurations of the player terminal 1 and the server 1000 for executing the game described above will be described. Note that in the following, descriptions will be directed to the functional configurations concerning the nurturing game, the team competition game, the practice match, and the information sharing function described above, while not describing other configurations.

(Functional Configuration of Player Terminal 1)

Figure 38:
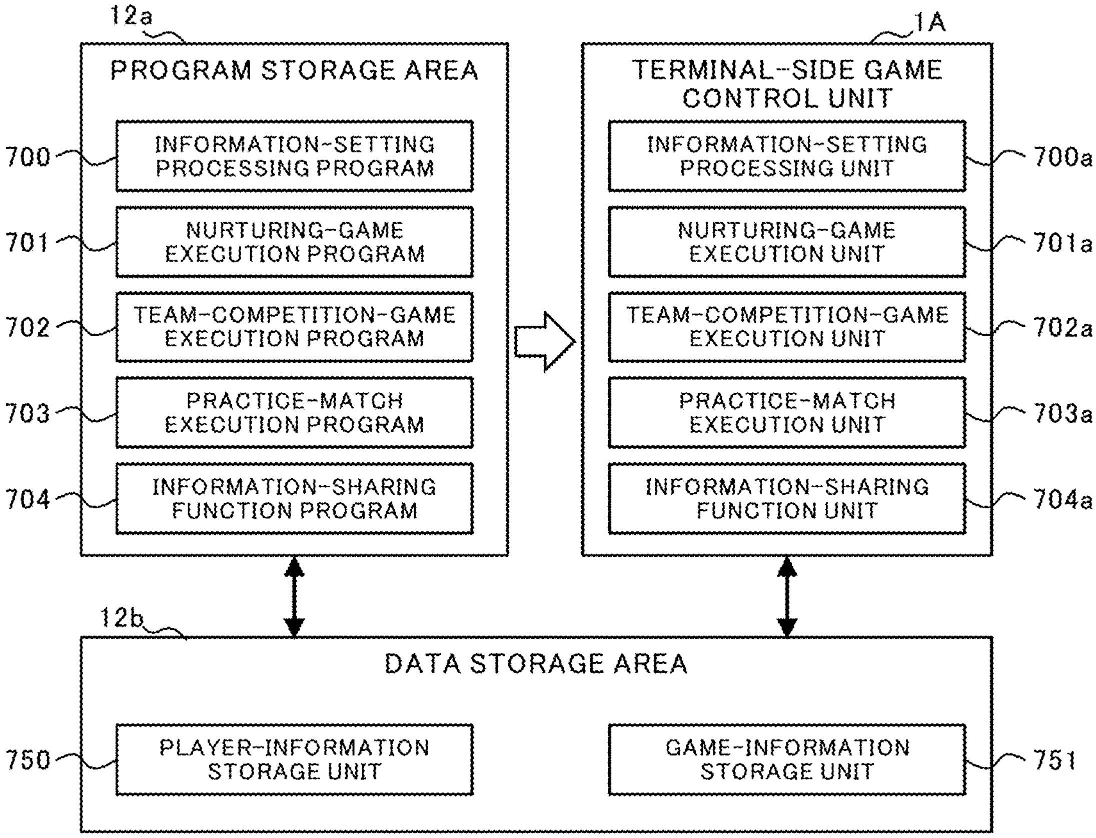
FIG. 38 is a diagram for explaining the configuration of a memory at the player terminal, as well as the functions thereof as a computer.

FIG. 38 is a diagram for explaining the configuration of the memory 12 at the player terminal 1, as well as the functions thereof as a computer. In the memory 12, a program storage area 12*a* and a data storage area 12*b* are provided. Upon the start of the game, the CPU 10 stores terminal-side game control programs (modules) in the program storage area 12*a*.

The terminal-side game control programs include an information-setting processing program 700, a nurturing-game execution program 701, a team-competition-game execution program 702, a practice-match execution program 703, and an information-sharing function program 704. Note that the programs listed in FIG. 38 are examples, and the terminal-side game control programs include a large number of other programs.

In the data storage area 12*b*, a player-information storage unit 750 and a game-information storage unit 751 are provided as storage units for storing data. Note that a large number of other storage units are provided in the data storage area 12*b*. Here, information directly relating to games (hereinafter referred to as game information), such as the nurturing game, the team competition game, and practice matches, is stored in the game-information storage unit 751. Note that various kinds of information are also tentatively stored in the game-information storage unit 751 while each game such as the nurturing game is in progress. Meanwhile, all information other than game information, such as information concerning the player or other player, as well as setting information of the player terminal 1, is considered as player information. The player information is stored in the player-information storage unit 750.

The CPU 10 runs the individual programs stored in the program storage area 12*a* to update the data in the individual storage units in the data storage area 12*b*. Then, by running the individual programs stored in the program storage area 12*a*, the CPU 10 causes the player terminal 1 (computer) to function as a terminal-side game control unit 1A. The terminal-side game control unit 1A includes an information-setting processing unit 700*a*, a nurturing-game execution unit 701*a*, a team-competition-game execution unit 702*a*, a practice-match execution unit 703*a*, and an information-sharing function unit 704*a*.

Specifically, the CPU 10 runs the information-setting processing program 700, thereby causing the computer to function as the information-setting processing unit 700*a*. Similarly, the CPU 10 runs the nurturing-game execution program 701, the team-competition-game execution program 702, the practice-match execution program 703, and the information-sharing function program 704, thereby causing the computer to function as the nurturing-game execution unit 701*a*, the team-competition-game execution unit 702*a*, the practice-match execution unit 703*a*, and the information-sharing function unit 704*a*, respectively.

The information-setting processing unit 700*a* stores information concerning settings in the player-information storage unit 750 as player information in the case where various kinds of information have been set at the player terminal 1. Furthermore, in the case where the information in the player-information storage unit 750 has been updated, the information-setting processing unit 700*a* transmits update information to the server 1000.

Furthermore, the nurturing-game execution unit 701*a*, the team-competition-game execution unit 702*a*, the practice-match execution unit 703*a*, and the information-sharing function unit 704*a* execute all processing relating to the nurturing game, the team competition game, practice matches, and the information sharing function, respectively.

(Functional Configuration of Server 1000)

Figure 39:
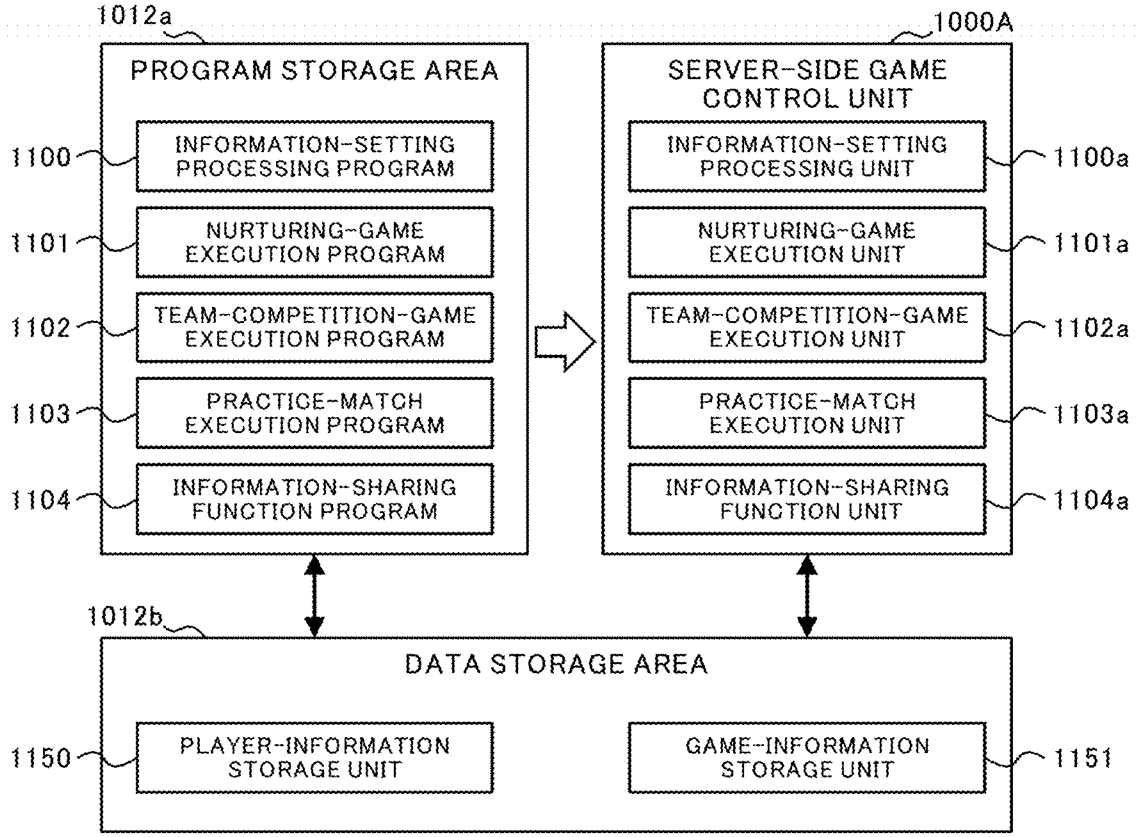
FIG. 39 is a diagram for explaining the configuration of a memory at the server, as well as the functions thereof as a computer.

FIG. 39 is a diagram for explaining the configuration of the memory 1012 at the server 1000, as well as the functions thereof as a computer. In the memory 1012, a program storage area 1012*a* and a data storage area 1012*b* are provided. Upon the start of the game, the CPU 1010 stores server-side game control programs (modules) in the program storage area 1012*a*.

The server-side game control programs include an information-setting processing program 1100, a nurturing-game execution program 1101, a team-competition-game execution program 1102, a practice-match execution program 1103, and an information-sharing function program 1104. Note that the programs listed in FIG. 39 are examples, and the server-side game control programs include a large number of other programs.

In the data storage area 1012*b*, a player-information storage unit 1150 and a game-information storage unit 1151 are provided as storage units for storing data. Note that a large number of other storage units are provided in the data storage area 1012*b*. Here, the game information of all the players is stored in the game-information storage unit 1151 in association with player IDs. Furthermore, the player information of all the players is stored in the player-information storage unit 1150 in association with player IDs.

The CPU 1010 runs the individual programs stored in the program storage area 1012*a* to update the data in the individual storage units in the data storage area 1012*b*. Then, by running the individual programs stored in the program storage area 1012*a*, the CPU 1010 causes the server 1000 (computer) to function as a server-side game control unit 1000A. The server-side game control unit 1000A includes an information-setting processing unit 1100*a*, a nurturing-game execution unit 1101*a*, a team-competition-game execution unit 1102*a*, a practice-match execution unit 1103*a*, and an information-sharing function unit 1104*a*.

Specifically, the CPU 1010 runs the information-setting processing program 1110, thereby causing the computer to function as the information-setting processing unit 1100*a*. Similarly, the CPU 1010 runs the nurturing-game execution program 1101, the team-competition-game execution program 1102, the practice-match execution program 1103, and the information-sharing function program 1104, thereby causing the computer to function as the nurturing-game execution unit 1101*a*, the team-competition-game execution unit 1102*a*, the practice-match execution unit 1103*a*, and the information-sharing function unit 1104*a*, respectively.

In the case where various kinds of information have been set at the player terminal 1, the information-setting processing unit 1100*a* updates the player information in the player-information storage unit 1150 on the basis of update information received from the player terminal 1.

Furthermore, the nurturing-game execution unit 1101*a*, the team-competition-game execution unit 1102*a*, the practice-match execution unit 1103*a*, and the information-sharing function unit 1104*a* execute all processing relating to the nurturing game, the team competition game, practice matches, and the information sharing function, respectively.

Note that the information-setting processing unit 700*a* in the player terminal 1 and the information-setting processing unit 1100*a* in the server 1000 are common in that both store player information, but the kinds of specific processing and the range of player information to store therein differ from each other. Furthermore, the nurturing-game execution unit 701*a* in the player terminal 1 and the nurturing-game execution unit 1101*a* in the server 1000 are common in that both execute processing relating to the nurturing game, but these units have different roles, i.e., these units are in charge of different ranges. Note that the relationships between the team-competition-game execution unit 702*a* and the team-competition-game execution unit 1102*a*, between the practice-match execution unit 703*a* and the practice-match execution unit 1103*a*, and between the information-sharing function unit 704*a* and the information-sharing function unit 1104*a* are also the same.

The processes that are carried out by the individual units in the player terminal 1 and the server 1000 described above will be described with reference to flowcharts. In the following, processes relating to the nurturing game, processes relating to the team competition game, processes relating to a practice match, and processes relating to the information sharing function will be described in order.

(Processes at Player Terminal 1 and Server 1000)

<Processes Relating to Nurturing Game>

Figure 40:
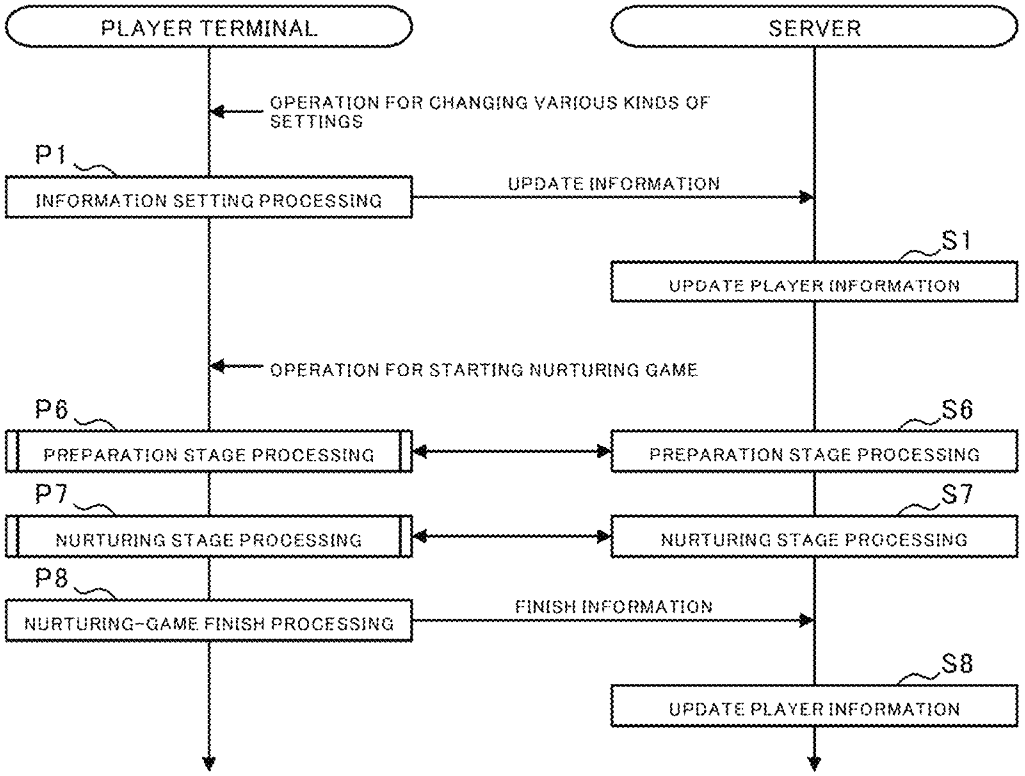
FIG. 40 is a sequence chart for explaining processes at the player terminal and the server, relating to the nurturing game.

FIG. 40 is a sequence chart for explaining processes at the player terminal 1 and the server 1000, relating to the nurturing game. Note that in the following description, processes at the player terminal 1 will be signified by Pn (n is an arbitrary integer). Furthermore, processes at the server 1000 will be signified by Sn (n is an arbitrary integer).

When the player has performed an operation to change various kinds of settings at the player terminal 1, the information-setting processing unit 700*a* of the player terminal 1 performs information setting processing (P1) for updating the player-information storage unit 750 on the basis of the operation input by the player. In the information setting processing, update information is transmitted to the server 1000. At the server 1000, upon receiving the update information, the information-setting processing unit 1100*a* updates the player information in the player-information storage unit 1150 (S1).

Note that the player information that is updated in P1 and S1 includes, for example profile information that can be set by the player. Furthermore, for example, when an operation for adding another player as a friend or unregistering another player who has been a friend is input as a setting changing operation, friend information, which is information concerning friends, is updated.

FIG. 41 is a figure for explaining example player information. FIG. 41B is a figure for explaining example profile information. FIG. 41C is a figure for explaining example friend information. The player can set and change player information by inputting operations at the player terminal 1. The player information set by the player is stored in the player-information storage unit 750 of the player terminal 1 and the player-information storage unit 1150 of the server 1000.

As shown in FIG. 41A, the player information includes profile information, friend information, and practice-match related information. As shown in FIG. 41B, the profile information includes a player ID, a player name, the player's sex, a circle to which the player belongs, a representative character, a profile character, comments, and a team rank. The player can set and change profile information except the player ID and the team rank by inputting operations to the player terminal 1.

As shown in FIG. 41C, the friend information includes friend numbers and the player IDs of friends. Here, the player can register thirty players at most as friends.

Furthermore, the practice-match related information includes information concerning a practice member registered by the player (hereinafter referred to as practice member information), information concerning practice partners (hereinafter referred to as practice partner information), and information concerning race results of practice matches (hereinafter referred to as race result information), saved by the player.

FIG. 42A is a figure for explaining example game information. FIG. 42B is a figure for explaining example nurtured character information. FIG. 42C is a figure for explaining example team formation information. The game information includes nurtured character information and team formation information. The nurtured character information is information concerning nurtured characters nurtured by the player, and is stored for each nurtured character. In each of the game-information storage units 751 and 1151, 200 items of nurtured character information is stored at most.

As shown in FIG. 42B, each nurtured character has a nurtured-character ID assigned thereto. The nurtured-character ID is associated with the player ID, which makes it possible to identify the player who nurtured the nurtured character. Furthermore, the nurtured character information includes character IDs, various kinds of parameters such as ability parameters and skill information, and inheritance information. These items of nurtured character information are stored in association with nurtured-character IDs.

The team formation information is information concerning a team that is used in the team competition game. As shown in FIG. 42C, in the team formation information, three nurtured-character IDs are stored in association with each of the five kinds of races, namely, a short distance race, a mile race, an intermediate distance race, a long distance race, and a dirt race.

Referring back to FIG. 40, when a nurturing-game start operation (tapping of the nurturing-game operating part 104) for starting the nurturing game is input at the player terminal 1, the nurturing-game execution unit 701*a* executes a preparation stage process (P6). Furthermore, during the preparation stage process, communication processing is carried out between the player terminal 1 and the server 1000. At the server 1000, the nurturing-game execution unit 1101*a* executes preparation stage processing (S6) on the basis of information received from the player terminal 1.

Figure 43:
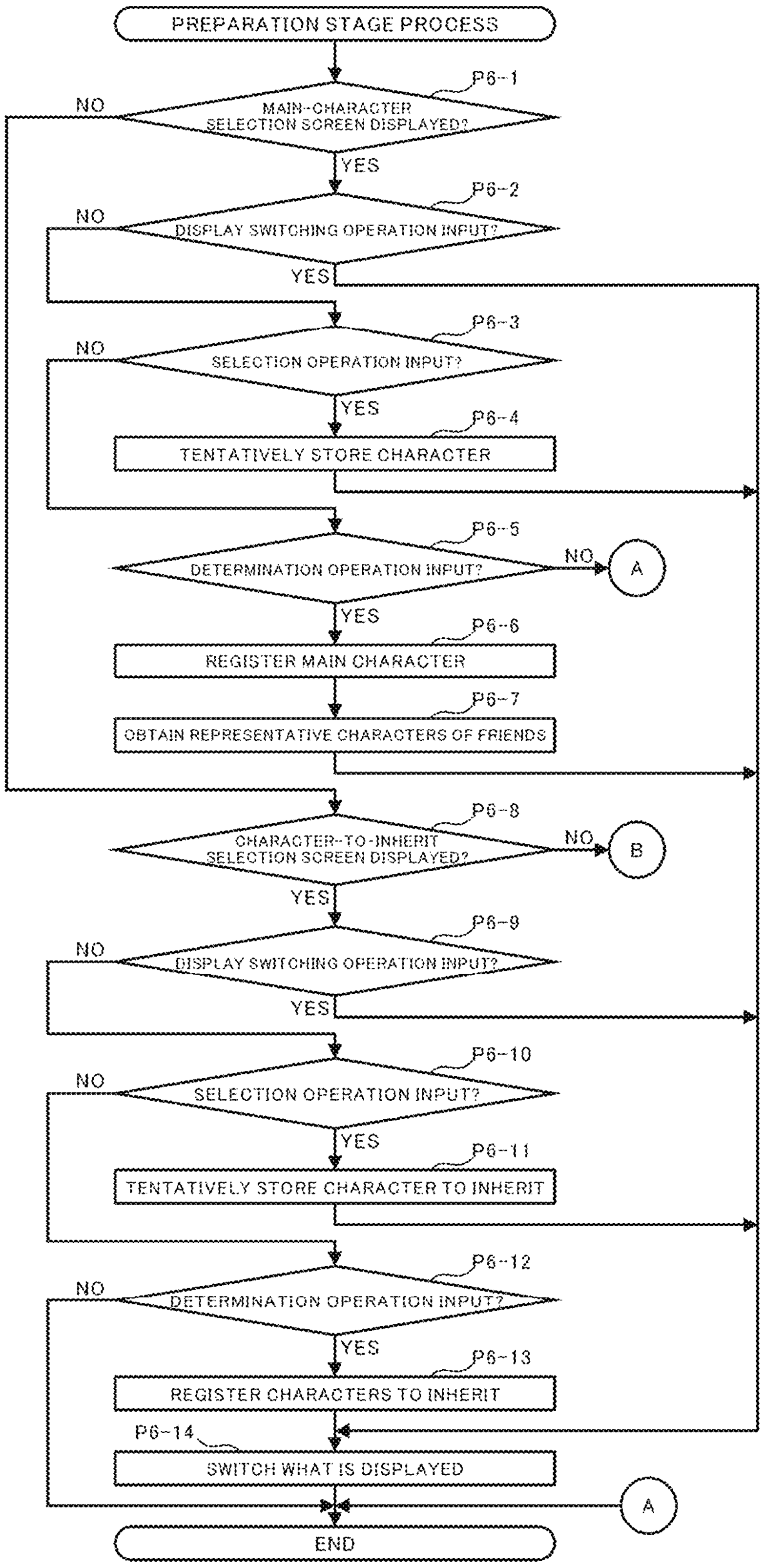
FIG. 43 is a first flowchart for explaining a preparation stage process at the player terminal.
Figure 44:
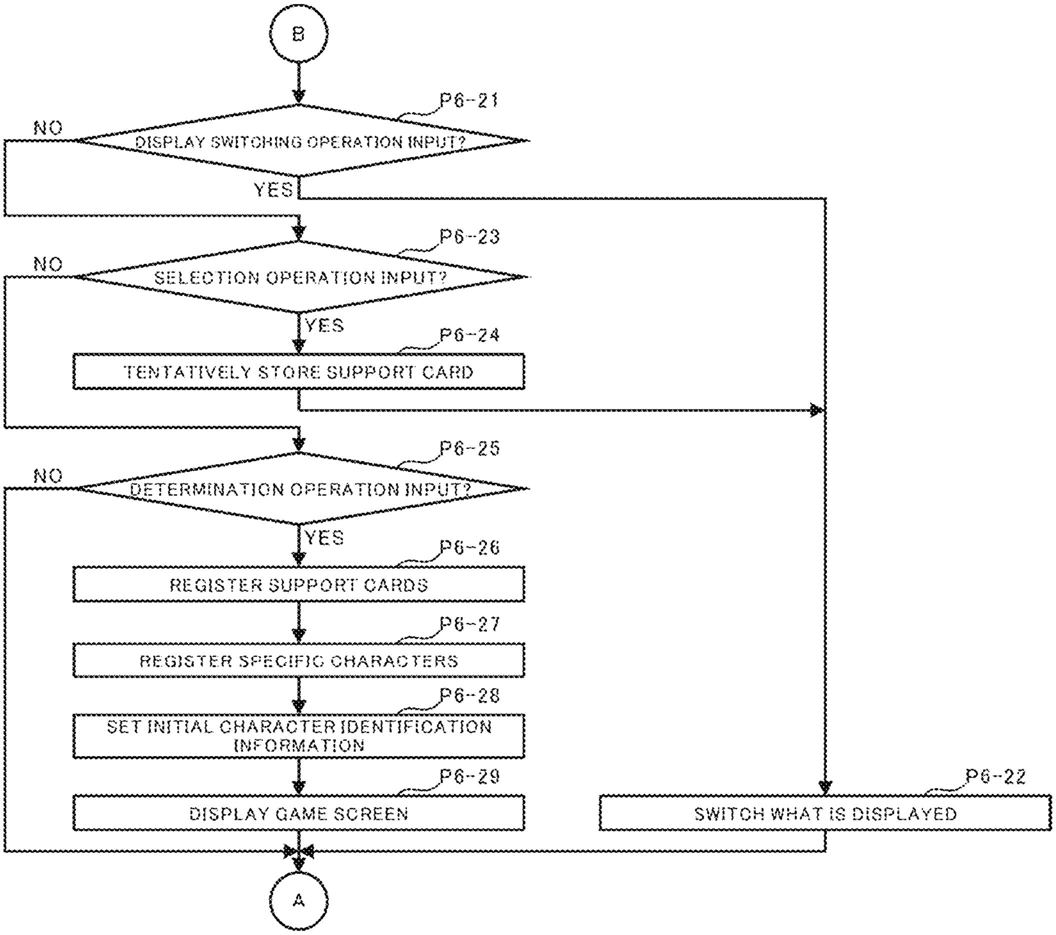
FIG. 44 is a second flowchart for explaining the preparation stage process at the player terminal.

FIG. 43 is a first flowchart for explaining the preparation stage process (P6) at the player terminal 1. FIG. 44 is a second flowchart for explaining the preparation stage process (P6) at the player terminal 1. The nurturing-game execution unit 701*a* of the player terminal 1 determines whether or not the main-character selection screen 150 is displayed on the display 26 (P6-1). In the case where the main-character selection screen 150 is displayed (YES in P6-1) and a display switching operation for switching what is displayed on the screen is input (YES in P6-2), the nurturing-game execution unit 701*a* switches the screen displayed on the display 26 (P6-14).

Meanwhile, when a selection operation (tapping of one of the character icons 151) is input in the main-character selection screen 150 (YES in P6-3), the nurturing-game execution unit 701*a* tentatively stores the character corresponding to the character icon 151 via which the selection operation is input (P6-4) and switches the displayed screen (P6-14).

Meanwhile, when a determination operation (tapping of the next operating part 154) is input in the main-character selection screen 150 (YES in P6-5), the nurturing-game execution unit 701*a* registers the character tentatively stored in P6-4 described above as the main character (P6-6). Furthermore, the nurturing-game execution unit 701*a* obtains information concerning the representative characters of friends from the server 1000 (P6-7) and switches the displayed screen (P6-14).

Meanwhile, in the case where the character-to-inherit selection screen 170 is displayed (YES in P6-8) and a display switching operation for switching what is displayed on the screen is input (YES in P6-9), the nurturing-game execution unit 701*a* switches the screen displayed on the display 26 (P6-14). Meanwhile, when a selection operation (tapping of one of the nurtured-character icons 182) is input in the character-to-inherit selection screen 170 (YES in P6-10), the nurturing-game execution unit 701*a* tentatively stores the character corresponding to the nurtured-character icon 182 via which the selection operation is input (P6-11) and switches the displayed screen (P6-14).

Meanwhile, when a determination operation (tapping of the next operating part 154) is input in the character-to-inherit selection screen 170 (YES in P6-12), the nurturing-game execution unit 701*a* registers the character tentatively stored in P6-11 described above as a character to inherit (P6-13) and switches the displayed screen (P6-14).

Meanwhile, in the case where the support-card setting screen 190 is displayed (NO in P6-8) and a display switching operation for switching what is displayed on the screen is input (YES in P6-21), the nurturing-game execution unit 701*a* switches the screen displayed on the display 26 (P6-22). Meanwhile, when a selection operation (tapping of one of the card icons 201 of support cards) is input in the support-card setting screen 190 (YES in P6-23), the nurturing-game execution unit 701*a* tentatively stores the support card corresponding to the card icon 201 via which the selection operation is input (P6-24) and switches the displayed screen (P6-22).

Meanwhile, when a determination operation (tapping of the start operating part 193) is input in the support-card setting screen 190 (YES in P6-25), the nurturing-game execution unit 701*a* registers the support card tentatively stored in P6-24 descried above (P6-26). Furthermore, the nurturing-game execution unit 701*a* registers the character IDs of the characters set as specific characters on the basis of specific character information (P6-27). Furthermore, the nurturing-game execution unit 701*a* sets initial character identification information (P6-28) and displays the game screen 210 on the display 26 (P6-29).

Referring back to FIG. 40, when the preparation stage process (P6) is finished, the nurturing-game execution unit 701*a* executes the nurturing stage process (P7). Furthermore, during the nurturing stage process, communication processing is carried out between the player terminal 1 and the server 1000. At the server 1000, the nurturing-game execution unit 1101*a* executes nurturing stage processing (S7) on the basis of information received from the player terminal 1. Note that actually, the player terminal 1 and the server 1000 share roles such that the main nurturing game proceeds through the nurturing stage process (P7) at the player terminal 1 and the nurturing stage processing (S7) at the server 1000. However, in order to facilitate understanding, the description will be given here while assuming that all the processing is carried out in the nurturing stage process (P7) at the player terminal 1. Alternatively, however, some or all of the individual processing steps in the nurturing stage process (P7) may be carried out in the nurturing stage processing (S7) at the server 1000.

Figure 45:
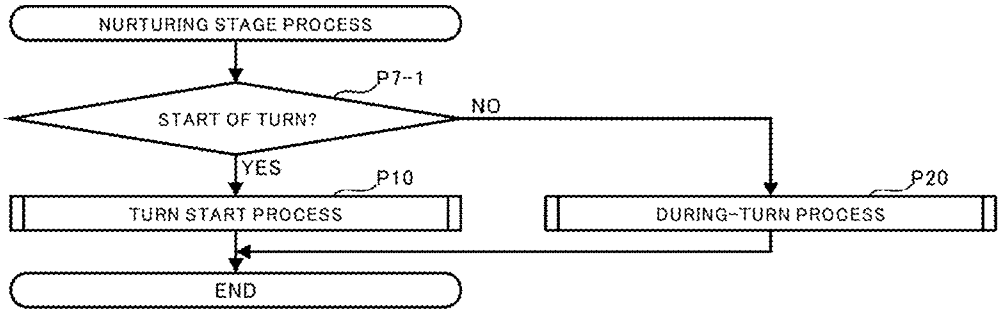
FIG. 45 is a flowchart for explaining a nurturing stage process at the player terminal.

FIG. 45 is a flowchart for explaining the nurturing stage process at the player terminal 1. The nurturing-game execution unit 701*a* of the player terminal 1 executes a turn start process (P10) when the current timing is the start of a turn (YES in P7-1), while executing a during-turn process (P20) when the current timing is not the start of a turn.

Figure 46:
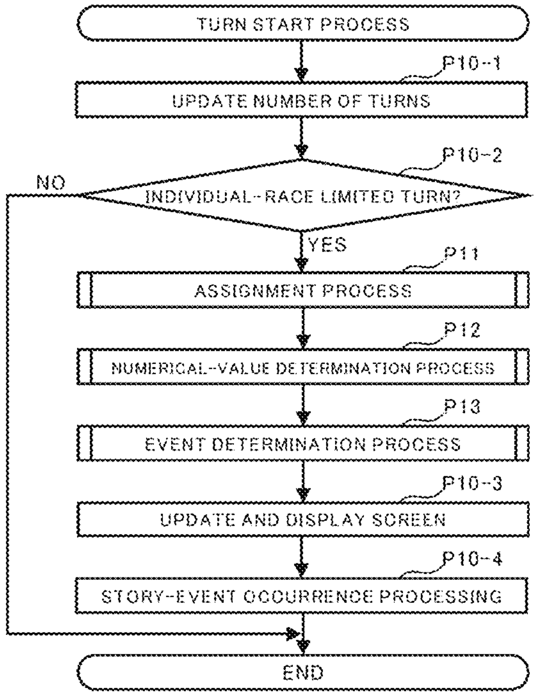
FIG. 46 is a flowchart for explaining a turn start process at the player terminal.

FIG. 46 is a flowchart for explaining the turn start process at the player terminal 1. The nurturing-game execution unit 701*a* updates the current number of turns stored in the game-information storage unit 751 (P10-1).

Furthermore, the nurturing-game execution unit 701*a* refers to the selection item table (FIG. 12) stored in the data storage area 12*b* to determine whether or not the current turn is a turn in which only an individual race, i.e., only the individual-race operating part 219, can be selected (an individual-race limited turn) (P10-2). The process is finished in the case where the current turn is not an individual-race limited turn (NO in P10-2), whereas an assignment process (P11), a numerical-value determination process (P12), and an event determination process (P13) are performed in order in the case where the current turn is an individual-race limited turn (YES in P10-2).

Note that it is assumed here that the assignment process (P11), the numerical-value determination process (P12), and the event determination process (P13) are executed only at the player terminal 1. Alternatively, some or all of the assignment process (P11), the numerical-value determination process (P12), and the event determination process (P13) may be executed at the server 1000. Alternatively, parts of processing, which will be described later, in the assignment process (P11), the numerical-value determination process (P12), and the event determination process (P13) may be executed at the server 1000. In the case where the processing mentioned above is executed at the server 1000, at the player terminal 1, processing is carried out on the basis of information received from the server 1000.

Figure 47:
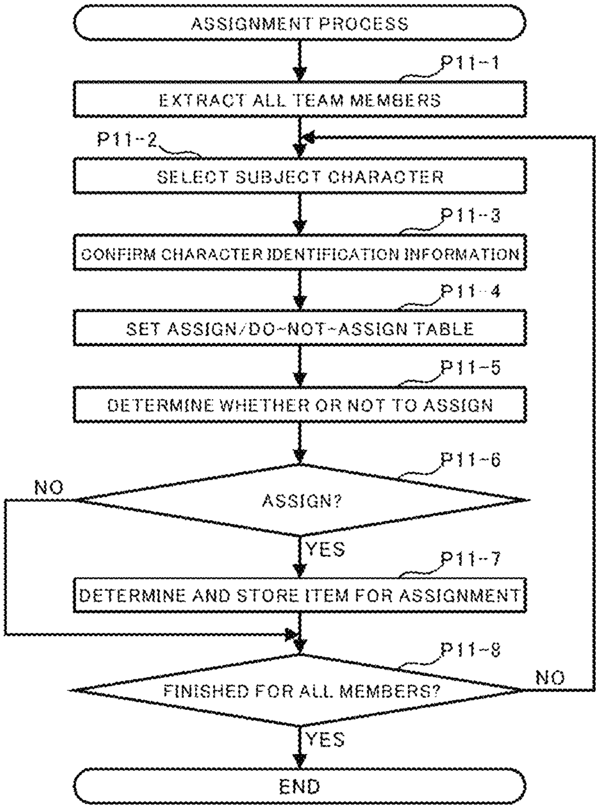
FIG. 47 is a flowchart for explaining an assignment process at the player terminal.

FIG. 47 is a flowchart for explaining an assignment process at the player terminal 1. The nurturing-game execution unit 701*a* refers to the character identification information table (FIGS. 10 and 11) to extract all the characters registered as team members (P11-1). Then, from among the team members extracted in P11-1, the nurturing-game execution unit 701*a* selects, as a subject character for carrying out processing, a character for which the processing in P11-3 to P11-7, which will be described below, has not been executed (P11-2).

Furthermore, the nurturing-game execution unit 701*a* refers to the character identification information table to confirm the character identification information of the subject character selected in P11-2 described above. Furthermore, the nurturing-game execution unit 701*a* sets the assign/do-not-assign table (FIG. 20) on the basis of the character identification information confirmed in P11-3 described above (P11-4). Furthermore, the nurturing-game execution unit 701*a* determines "assign" or "do not assign" through a lottery on the basis of the assign/do-not-assign table set in P11-4 described above (P11-5).

Then, in the case where "assign" is determined (YES in P11-6), the nurturing-game execution unit 701*a* determines and stores training items to which the subject character is to be assigned (P11-7). In the case where the processing has not been finished for all the team members extracted in P11-1 described above (NO in P11-8), the nurturing-game execution unit 701*a* repeats the processing from P11-2 until the processing is finished for all the team members. Meanwhile, when the processing is finished for all the team members (YES in P11-8), the nurturing-game execution unit 701*a* quits the assignment process and executes the numerical-value determination process (P12).

Figure 48:
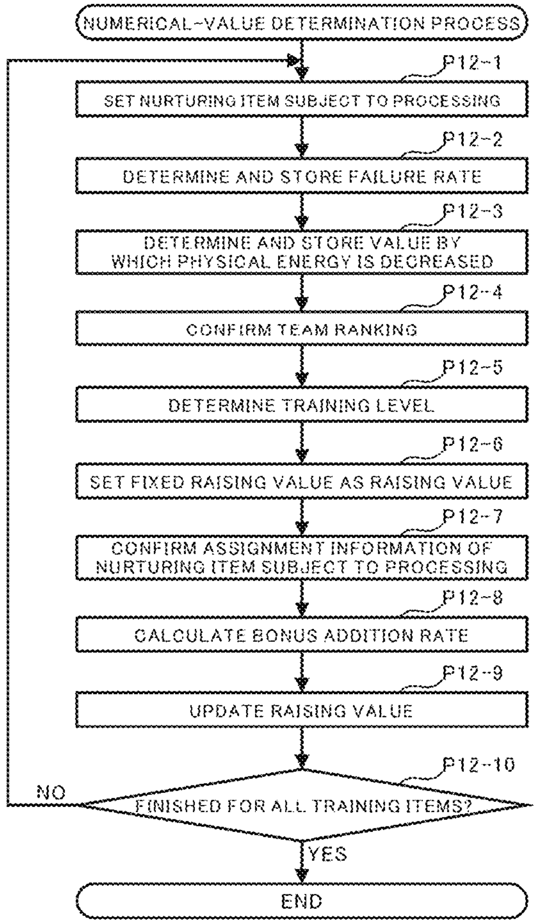
FIG. 48 is a flowchart for explaining a numerical-value determination process at the player terminal.

FIG. 48 is a flowchart for explaining the numerical-value determination process at the player terminal 1. The nurturing-game execution unit 701*a* sets a processing subject item for which the processing in P12-2 to P12-9, which will be described below, has not been executed from among the individual training items, namely, "Speed", "Stamina", "Power", "Spirit", and "Wisdom" (P12-1).

Furthermore, for the processing subject item set in P12-1, the nurturing-game execution unit 701*a* determines and stores a failure rate in the case where training is executed on the basis of the current physical energy of the main character (P12-2). Furthermore, for the processing subject item set in P12-1, the nurturing-game execution unit 701*a* determines and stores a value by which the physical energy is to be decreased in the case where training is executed (P12-3).

Furthermore, the nurturing-game execution unit 701*a* confirms the current team ranking (P12-4), and refers to the training level table (FIG. 21A) to determine a training level on the basis of the team ranking (P12-5).

Furthermore, the nurturing-game execution unit 701*a* refers to the fixed raising-value table (FIGS. 21B and 21C) corresponding to the processing subject item set in P12-1 to determine and set a fixed raising value on the basis of the training level determined in P12-5 (P12-6). Furthermore, the nurturing-game execution unit 701*a* confirms information concerning the characters determined to be assigned in P11 (assignment information) for the training of the processing subject item (P12-7).

Furthermore, on the basis of the assignment information confirmed in P12-7, the nurturing-game execution unit 701*a* refers to the bonus addition rate table (FIG. 21D) to calculate a bonus addition rate (P12-8). Furthermore, the nurturing-game execution unit 701*a* updates the raising value for the training of the processing subject item on the basis of the bonus addition rate calculated in P12-8 (P12-9).

Furthermore, in the case where the processing in P12-2 to P12-9 is not finished for all the training items (NO in P12-10), the nurturing-game execution unit 701*a* repeats the processing from P12-1. Meanwhile, when the processing is finished for all the training items (YES in P12-10), the nurturing-game execution unit 701*a* quits the numerical-value determination process and executes the event determination process (P13).

Figure 49:
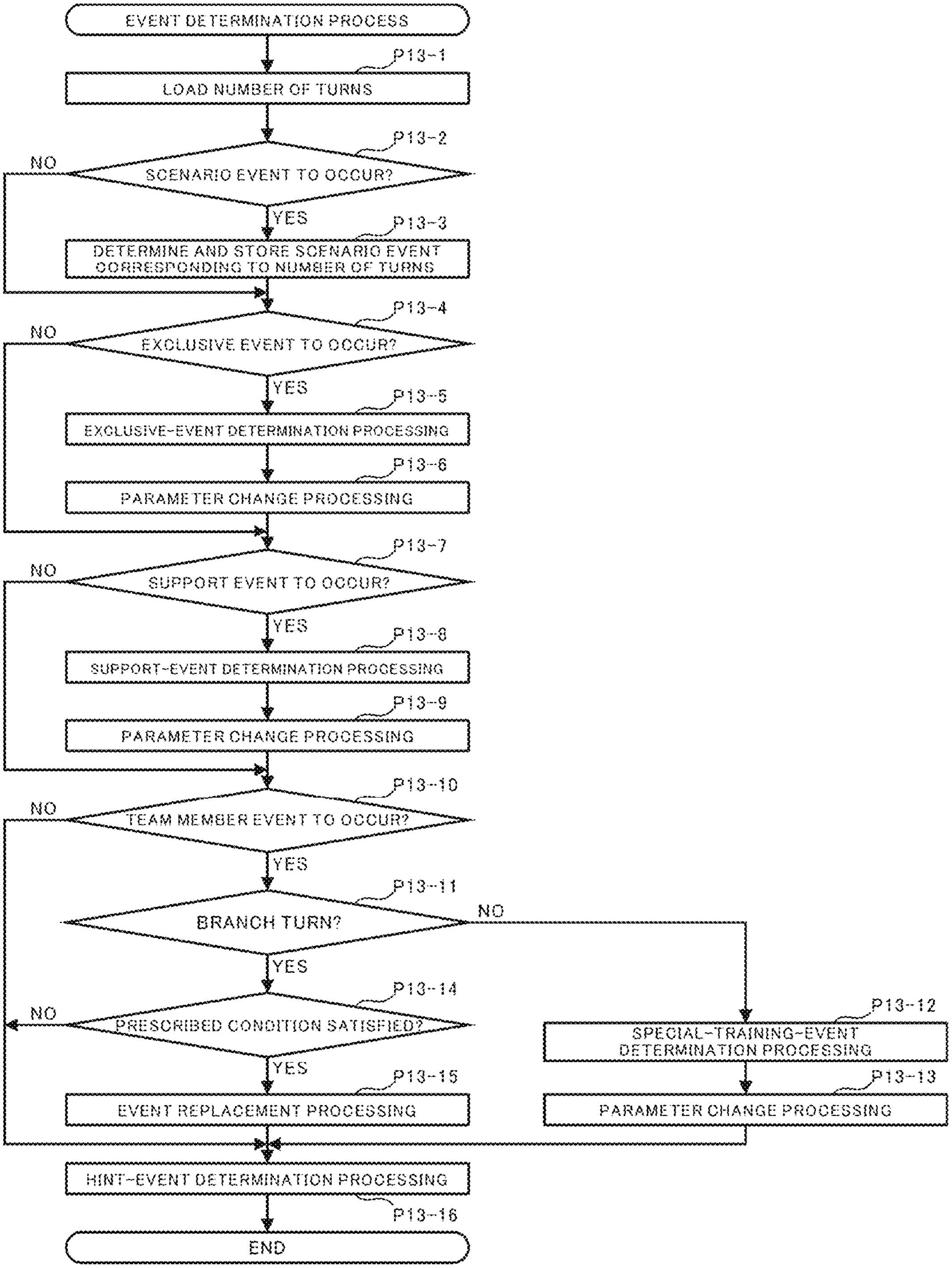
FIG. 49 is a flowchart for explaining an event determination process at the player terminal.

FIG. 49 is a flowchart for explaining the event determination process at the player terminal 1. The nurturing-game execution unit 701*a* loads the current number of turns (P13-1). Furthermore, the nurturing-game execution unit 701*a* refers to the event-occurrence determination table stored in the data storage area 12*b* to determine whether or not a scenario event is to occur (P13-2). Then, in the case where it is determined that a scenario event is to occur, i.e., in the case where the current turn is a scenario-event occurring turn (YES in P13-2), the nurturing-game execution unit 701*a* determines and stores the content (event ID) of the scenario event on the basis of the event-content determination table (P13-3).

Specifically, on the basis of the event-content determination table, the nurturing-game execution unit 701*a* generates a lottery table based on the event IDs of scenario events that can occur. Then, by using the lottery table generated, the nurturing-game execution unit 701*a* determines the content, i.e., the event ID, of the scenario event through a lottery. Note that in the case where the scenario event determined is an event with which a parameter is changed, such as an ability event, the value of change thereof is determined.

Furthermore, the nurturing-game execution unit 701*a* refers to the event-occurrence determination table to determine whether or not an exclusive event 162*a* is to occur (P13-4). Furthermore, in the case where it is determined that an exclusive event 162*a* is to occur, i.e., in the case where the current turn is an exclusive-event occurring turn (YES in P13-4), the nurturing-game execution unit 701*a* determines and stores the content (event ID) of the exclusive event 162*a* on the basis of the event-content determination table (P13-5).

Specifically, on the basis of the event-content determination table, the nurturing-game execution unit 701*a* generates a lottery table based on the event IDs of exclusive events 162*a* that can occur. Then, by using the lottery table generated, the nurturing-game execution unit 701*a* determines the content, i.e., the event ID, of the exclusive event 162*a* through a lottery. Note that in the case where the exclusive event 162*a* determined is an event with which a parameter is changed, such as an ability event, the value of change thereof is determined.

Meanwhile, the nurturing-game execution unit 701*a* executes parameter change processing (P13-6) in which the value by which the parameter is to be changed as a result of the exclusive event 162*a* is changed in the case where the main character is a specific character. For example, in the parameter change processing, a prescribed fixed value is added to or subtracted from the value of change determined in P13-5, or the value of change is multiplied by a prescribed factor. Here, the value of change is changed advantageously for the player. Thus, the parameter changes more advantageously as a result of the exclusive event 162*a* in the case where the main character is a specific character.

Furthermore, the nurturing-game execution unit 701*a* refers to the event-occurrence determination table to determine whether a support event is to occur (P13-7). Then, in the case where it is determined that a support event is to occur, i.e., in the case where the current turn is a support-event occurring turn (YES in P13-7), the nurturing-game execution unit 701*a* determines and stores the content (event ID) of the support event on the basis of the event-content determination table (P13-8).

Specifically, on the basis of the event-content determination table, the nurturing-game execution unit 701*a* generates a lottery table based on the event ID of support events that can occur. At this time, the winning probabilities of support events associated with registered support cards are set to be higher than the winning probabilities of other support events. Furthermore, by using the lottery table generated, the nurturing-game execution unit 701*a* determines the content, i.e., the event ID, of the support event through a lottery. Note that in the case where the support event determined is an event with which a parameter is changed, such as an ability event, the value of change thereof is determined.

Furthermore, the nurturing-game execution unit 701*a* executes parameter change processing (P13-9) in which the value by which the parameter is to be changed as a result of the support event is changed in the case where the main character or the support character associated with the support event is a specific character.

Furthermore, the nurturing-game execution unit 701*a* refers to the event-occurrence determination table to determine whether or not a team member event is to occur (P13-10). In the case where it is determined that the a team member event is to occur, i.e., in the case where the current turn is a team-member-event occurring turn (YES in P13-10), the nurturing-game execution unit 701*a* determines whether or not the current turn is a branch turn (P13-11).

When the current turn is not a branch turn (NO in P13-11), on the basis of the event-content determination table, the nurturing-game execution unit 701*a* determines and stores a special training event corresponding to the current number of turns as an event to occur (P13-12). Here, various kinds of raising values relating to the special training event are determined.

Furthermore, the nurturing-game execution unit 701*a* executes parameter change processing (P13-13) in which the value by which the parameter is to be changed as a result of the special training event is changed in the case where the main character or the character subject to special training is a specific character.

Meanwhile, when the current turn is a branch turn (YES in P13-11), the nurturing-game execution unit 701*a* determines whether or not a prescribed condition is satisfied (P13-14). As described earlier, it is determined whether or not the number of specific characters included in the team members is a prescribed number specified for each number of turns. Then, in the case where the prescribed condition is satisfied (YES in P13-14), the nurturing-game execution unit 701*a* replaces the scenario event stored in P13-3 with a specific character event (P13-15). Note that here, the specific character event for replacement may be determined through a lottery, or a specific character event set in advance for each turn may be determined.

Furthermore, the nurturing-game execution unit 701*a* performs hint-event determination processing relating to a hint event for each character assigned in training (P13-16). Here, whether or not a hint event is to occur is determined through a lottery for each character assigned in training. Furthermore, in the case where a hint event is to occur, which hint event is to occur is determined.

Referring back to FIG. 46, the nurturing-game execution unit 701*a* updates the screen displayed on the display 26 (P10-3). Furthermore, in the case where a story event is to occur at the start of a turn, a story event is caused to occur among the events determined in P13 (P10-4).

Referring back to FIG. 45, in the case where the current timing is not the start of a turn (NO in P7-1), the nurturing-game execution unit 701*a* executes the during-turn process (P20).

Figure 50:
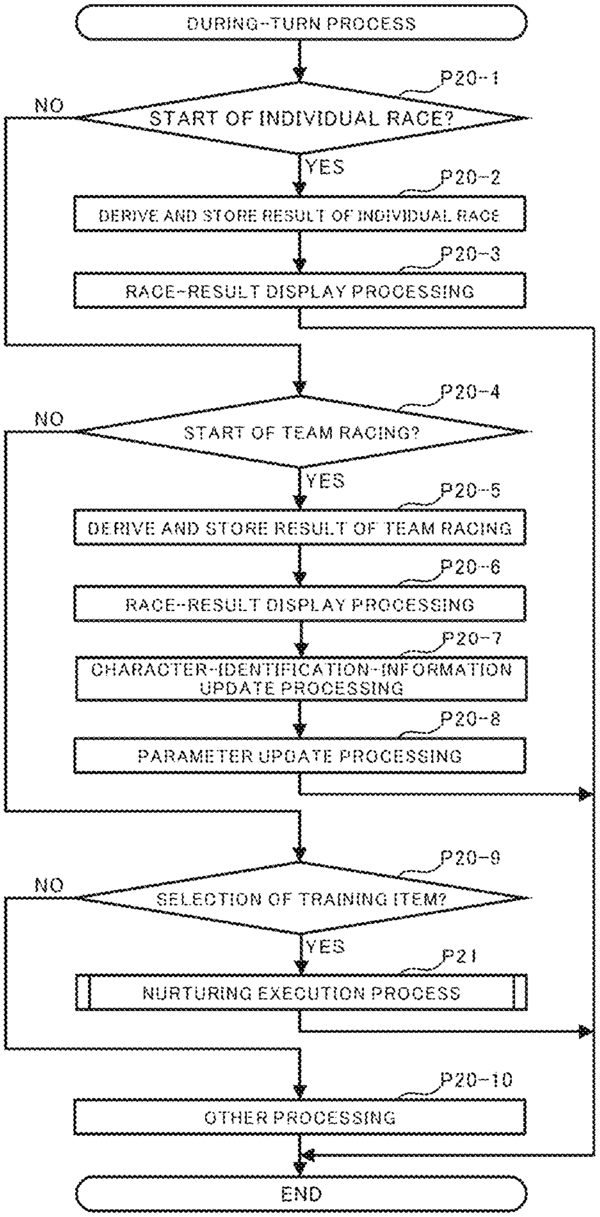
FIG. 50 is a flowchart for explaining a during-turn process at the player terminal.

FIG. 50 is a flowchart for explaining the during-turn process at the player terminal 1. The nurturing-game execution unit 701*a* determines whether or not the result operating part 253 or the race operating part 254 in the individual-race start screen 250 has been operated to start an individual race (P20-1). In the case where an individual race has been started (YES in P20-1), the nurturing-game execution unit 701*a* derives the result of the individual race and stores the result in the game-information storage unit 751 (P20-2).

Specifically, for example, a formula including weights for the individual ability parameters and acquired skills of NPCs and the main character is set in advance, and places in an individual race are determined on the basis of the results of computation according to the formula. Note that the formula may be set so as to vary among individual races. Alternatively, for example, a plurality of patterns of ability parameters of NPCs may be provided for each race, and which ability parameters to use may be determined through a lottery. That is, the race result is not necessarily the same even if the ability parameters and acquired skills of the main character as well as the race to participate in are exactly the same. Alternatively, a plurality of patterns of formulas, such as weights, may be provided for each race such that the result varies depending on the selected formula.

Note that it is assumed here that the result of an individual race is derived at the player terminal 1. Alternatively, the result of an individual race may be derived at the server 1000. In this case, information for requesting that the result of an individual race be derived, as well as information necessary for deriving the result of the individual race, are transmitted from the player terminal 1 to the server 1000. Then, the result of the individual race, derived at the server 1000, may be received by the player terminal 1.

Furthermore, the nurturing-game execution unit 701*a* executes race-result display processing in which the individual-race result screen 260 or a race video is displayed on the display 26 on the basis of the result of the individual race, derived in P20-2 (P20-3).

Furthermore, the nurturing-game execution unit 701*a* determines whether or not the result operating part 291 or the race operating part 292 in the team-race start screen 290 has been operated to start team racing (P20-4). The process proceeds to P20-5 in the case where team racing has been started, while proceeding to P20-9 in the case where team racing has not been started.

The nurturing-game execution unit 701*a* derives the result of team racing and stores the result in the game-information storage unit 751 (P20-5). Specifically, for example, a formula including weights for the individual ability parameters and acquired skills of NPCs, the main character, and the other team members is set in advance, and places in team racing are determined on the basis of the results of computation according to the formula. Note that the formula mentioned above may be set so as to vary among individual races. Alternatively, for example, a plurality of patterns of the ability parameters of NPCs may be provided for each race, and which ability parameters to use may be determined through a lottery. That is, the race result is not necessarily the same even if the ability parameters and acquired skills of the main character and the other team members, as well as the race to participate in, are exactly the same. Alternatively, a plurality of patterns of formulas, such as weights, may be provided for each race such that the result varies depending on the formula selected.

Note that it is assumed here that the result of team racing is derived at the player terminal 1. Alternatively, the result of team racing may be derived at the server 1000. In this case, information for requesting that the result of team racing be derived, as well as information necessary for deriving the result of team racing, are transmitted from the player terminal 1 to the server 1000. Then, the result of team racing, derived at the server 1000, may be received by the player terminal 1.

The nurturing-game execution unit 701*a* executes race-result display processing (P20-6) for displaying the team-racing interim result screen 300, the team-racing detailed result screen 310, and the team-racing total result screen 320 on the display 26 on the basis of the result of team racing, derived in P20-5 described above.

Furthermore, the nurturing-game execution unit 701*a* executes character-identification-information update processing (P20-7). Here, a prescribed number of characters are extracted according to a prescribed condition from among the characters currently registered as sub-members. Then, the character identification information of the extracted characters is updated to team members. That is, in this embodiment, the number of team members increases each time team racing is finished.

Furthermore, the nurturing-game execution unit 701*a* executes parameter update processing for updating information concerning the team ranking on the basis of the result of team racing, derived in P20-5 described above (P20-8).

Furthermore, in the case where one of the training items is selected (YES in P20-9), the nurturing-game execution unit 701*a* carries out a nurturing execution process (P21). Meanwhile, in the case where none of the training items is selected (NO in P20-9), the nurturing-game execution unit 701*a* executes other processing, such as acquiring a skill by consuming skill points (P20-10).

Figure 51:
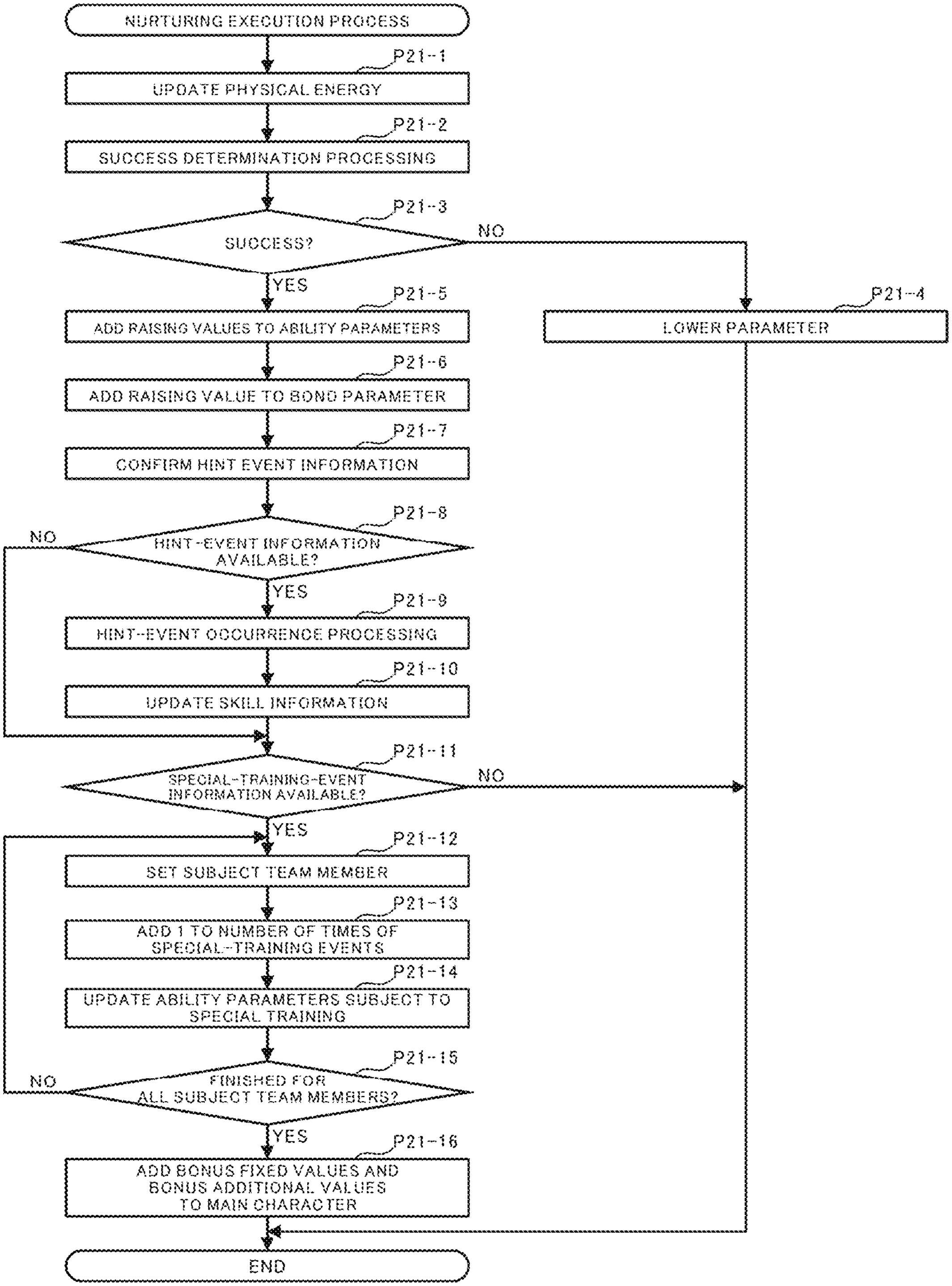
FIG. 51 is a flowchart for explaining a nurturing execution process at the player terminal.

FIG. 51 is a flowchart for explaining the nurturing execution process at the player terminal 1. For the selected training item, the nurturing-game execution unit 701*a* updates the physical energy of the main character on the basis of the value by which the physical energy is to be decreased, determined in P12-3 described earlier (P21-1).

Furthermore, for the selected training item, the nurturing-game execution unit 701*a* executes success determination processing for determining whether or not the training has been successful on the basis of the failure rate determined in P12-2 described earlier (P21-2). In the case where the training has failed (NO in P21-3), the nurturing-game execution unit 701*a* lowers an ability parameter, e.g., lowers character conditions, on the basis of the failure of the training (P21-4).

Meanwhile, in the case where the training has been successful (YES in P21-3), the nurturing-game execution unit 701*a* adds the raising values derived in P12-9 described earlier to the ability parameters of the main character (P21-5). Furthermore, the nurturing-game execution unit 701*a* adds the raising value to the value of the bond parameter, determined in P13-12 and P13-13 (P21-6). Furthermore, the nurturing-game execution unit 701*a* confirms the hint event information stored in the hint-event determination processing (P21-7).

In the case where hint event information is stored for the selected training item (YES in P21-8), the nurturing-game execution unit 701*a* causes a hint event to occur on the basis of the hint event information relating to the selected training item (P21-9). Note that in the case where a plurality of items of hint event information are stored for the selected training item, one of the hint events occurs. Furthermore, on the basis of the hint event information caused to occur in P21-9, the nurturing-game execution unit 701*a* updates the skill information relating to the main character, stored in the game-information storage unit 751 (P21-10).

Furthermore, in the case where special-training event information is stored for the selected training item (YES in P21-11), the nurturing-game execution unit 701*a* sets team members for which the special training event is to be executed on the basis of the special-training event information relating to the selected training item (P21-12).

Furthermore, the nurturing-game execution unit 701*a* adds "1" to the number of times of instruction events for the team members subject to the execution, set in P21-12 described above (P21-13). Furthermore, the nurturing-game execution unit 701*a* updates the ability parameters of the subjects of the special training (P21-14). When the processing from P21-13 to P21-14 is finished for all the team members for which the special training event is to be executed (YES in P21-15), the nurturing-game execution unit 701*a* adds bonus additional values to the ability parameters of the main character on the basis of the selected training item and the special-training event information (P21-16).

Referring back to FIG. 40, when the nurturing stage process described above is finished, at the player terminal 1, the nurturing-game execution unit 701*a* executes nurturing-game finish processing (P8). In the nurturing-game finish processing, the nurturing-game execution unit 701*a* stores information concerning the nurtured characters nurtured in the nurturing game in the game-information storage unit 751. Furthermore, the nurturing-game execution unit 701*a* transmits finish information to the server 1000. The finish information includes information concerning the nurtured characters, etc. At the server 1000, upon receiving the finish information, the nurturing-game execution unit 1101*a* stores the nurtured character information in the game-information storage unit 1151 in association with the player ID of the player (S8).

The nurturing game described above is realized through the processes described above. Note that the above-described processes at the player terminal 1 are merely examples. Furthermore, each of the processes described above may be executed only by the player terminal 1 or may be executed only by the server 1000. For example, the server 1000 may execute a process for determining whether or not an event is to occur, as well as the content of the event, and the player terminal 1 may perform displaying based on information determined at the server 1000.

<Processes Relating to Team Competition Game>

Figure 52:
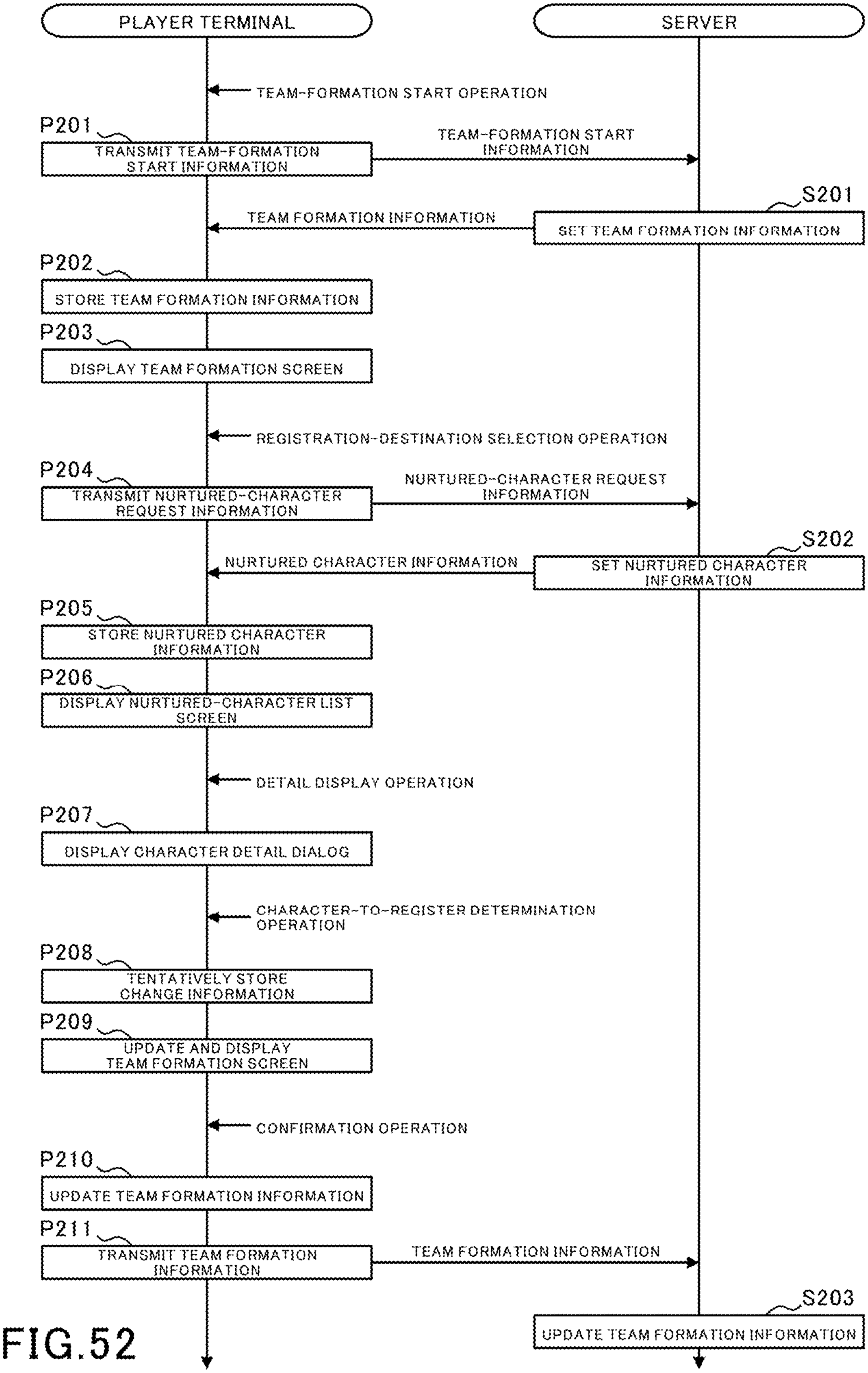
FIG. 52 is a first sequence chart for explaining processes at the player terminal and the server, relating to a team competition game.
Figure 53:
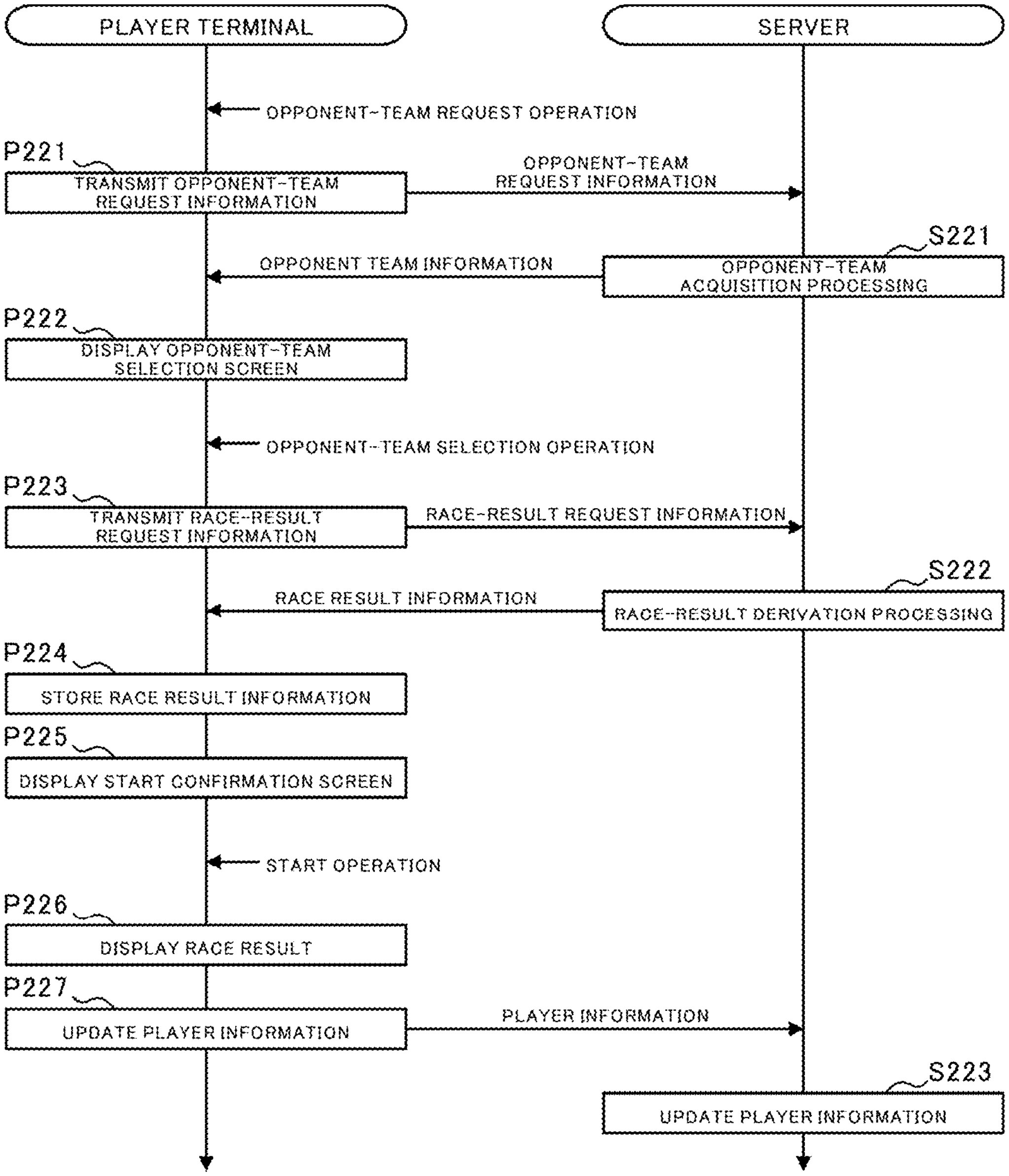
FIG. 53 is a second sequence chart for explaining processes at the player terminal and the server, relating to the team competition game.

FIG. 52 is a first sequence chart for explaining processes at the player terminal 1 and the server 1000, relating to the team competition game. FIG. 53 is a second sequence chart for explaining processes at the player terminal 1 and the server 1000, relating to the team competition game. As shown in FIG. 52, when a team-formation start operation (tapping of the formation selection operating part 403) is input in the team stadium screen 400, the team-competition-game execution unit 702*a* transmits team-formation start information to the server 1000 (P201). At the server 1000, upon receiving the team-formation start information, the team-competition-game execution unit 1102*a* obtains team formation information and sets the team formation information such that the player terminal 1 can receive the team formation information (S201). Here, the team-competition-game execution unit 1102*a* identifies the player ID from the team-formation start information received, and obtains the team formation information associated with the identified player ID from the game-information storage unit 1151 and sets the team formation information.

When the team formation information is received by the player terminal 1, the team-competition-game execution unit 702*a* stores the received team formation information in the game-information storage unit 751 (P202). Furthermore, the team-competition-game execution unit 702*a* displays the team formation screen 410 on the display 26 on the basis of the received team formation information (P203).

Here, in the case where a team-formation start operation is input, the team-competition-game execution unit 702*a* displays the team formation screen 410 on the basis of the team formation information received from the server 1000.

Alternatively, in the case where a team-formation start operation is input, the team-competition-game execution unit 702*a* may display the team formation screen 410 on the basis of the team formation information stored in the game-information storage unit 751, without having to carry out communication with the server 1000.

When a registration-destination selection operation (tapping of one of the character icons 411) is input in the team formation screen 410, the team-competition-game execution unit 702*a* transmits nurtured-character request information to the server 1000 (P204). At the server 1000, upon receiving the nurtured-character request information, the team-competition-game execution unit 1102*a* obtains nurtured-character information and sets the nurtured-character information so that the player terminal 1 can receive the nurtured-character information (S202). Here, the team-competition-game execution unit 1102*a* identifies the player ID from the nurtured-character request information received, and obtains the nurtured-character information associated with the identified player ID from the game-information storage unit 1151 and sets the nurtured-character information.

When the nurtured-character information is received by the player terminal 1, the team-competition-game execution unit 702*a* stores the received nurtured-character information in the game-information storage unit 751 (P205). Furthermore, the team-competition-game execution unit 702*a* displays the nurtured-character list screen 420 on the display 26 on the basis of the received nurtured-character information (P206).

Here, in the case where a registration-destination selection operation is input, the team-competition-game execution unit 702*a* displays the nurtured-character list screen 420 on the basis of the nurtured-character information received from the server 1000. Alternatively, in the case where a registration-destination selection operation is input, the team-competition-game execution unit 702*a* may display the nurtured-character list screen 420 on the basis of the nurtured-character information stored in the game-information storage unit 751, without having to carry out communication with the server 1000.

When a detail display operation (a holding operation of one of the character icons 411 or the nurtured-character icons 422) is input in the team formation screen 410 or the nurtured-character list screen 420, the team-competition-game execution unit 702*a* displays the character detail dialog 430 on the display 26 (P207).

Furthermore, when one of the nurtured-character icons 422 is tapped in the nurtured-character list screen 420, the team-competition-game execution unit 702*a* tentatively selects the nurtured character corresponding to the tapped nurtured-character icon 422. Then, when a character-to-register determination operation (tapping of the determination operating part 423) is input, the team-competition-game execution unit 702*a* tentatively stores the tentatively selected nurtured character as change information (P208). Furthermore, the team-competition-game execution unit 702*a* updates and displays the team formation screen 410 on the display 26 (P209). In this updating and displaying, the character icon 411 corresponding to the nurtured character tentatively stored as the change information is displayed in the team formation screen 410.

When a confirmation operation (tapping of the confirmation operating part 412) is input in the team formation screen 410, the team-competition-game execution unit 702*a* updates the team formation information in the game-information storage unit 751 on the basis of the change information (P210). Furthermore, the team-competition-game execution unit 702*a* transmits the updated team formation information to the server 1000 (P211). At the server 1000, the team-competition-game execution unit 1102*a* updates the team formation information in the game-information storage unit 1151 on the basis of the team formation information received (S203).

Furthermore, as shown in FIG. 53, when an opponent-team request operation (tapping of the team competition game in the team stadium screen 400 or tapping of the reload operating part 442 in the opponent-team selection screen 440) is input, the team-competition-game execution unit 702*a* transmits opponent-team request information to the server 1000 (P221). At the server 1000, upon receiving the opponent-team request information, the team-competition-game execution unit 1102*a* executes opponent-team acquisition processing (S221).

In the opponent-team acquisition processing, the team-competition-game execution unit 1102*a* extracts three items of team formation information from the team formation information stored in the game-information storage unit 1151. Here, the teams having total evaluation scores in a first range, a second range, and a third range with respect to the total evaluation score of the player team are individually extracted according to prescribed conditions. Then, the team-competition-game execution unit 1102*a* determines one of the teams extracted in each of the individual ranges mentioned above through lotteries, thereby determining three opponent teams. Then, the team-competition-game execution unit 1102*a* sets opponent-team information including information concerning the three opponent teams determined.

When the opponent-team information is received by the player terminal 1, the team-competition-game execution unit 702*a* displays the opponent-team selection screen 440 on the display 26 (P222). Then, when an opponent-team selection operation (tapping of one of the opponent-team icons 441) is input at the player terminal 1, the team-competition-game execution unit 702*a* transmits race-result request information to the server 1000 (P223). At the server 1000, upon receiving the race-result request information, the team-competition-game execution unit 1102*a* executes race-result derivation processing (S222).

In the race-result derivation processing, the team-competition-game execution unit 1102*a* derives race simulation results for the individual five kinds of races and sets race result information including the simulation results. Furthermore, here, the team-competition-game execution unit 1102*a* calculates points according to point granting conditions.

When the race result information is received by the player terminal 1, the team-competition-game execution unit 702*a* stores the received race result information in the game-information storage unit 751 (P224). Furthermore, the team-competition-game execution unit 702*a* displays the start confirmation screen 450 on the display 26 (P225).

When a start operation (tapping of the start operating part 452) is input in the start confirmation screen 450, the team-competition-game execution unit 702*a* displays the result list screen 460 on the display 26 (P226). Note that when the race-video play selection part 461 is tapped in the result list screen 460, the team-competition-game execution unit 702*a* plays a race video. Meanwhile, when the result-display selection part 462 is tapped in the result list screen 460, the team-competition-game execution unit 702*a* displays race results.

When the race results are displayed at the player terminal 1, the team-competition-game execution unit 702*a* updates the player information in the player-information storage unit 750 (P227). Here, for example, the player information includes information concerning the number of times of the team competition game, information concerning the highest points of the total points acquired within a prescribed period, etc. Furthermore, here, the team-competition-game execution unit 702*a* transmits the updated player information to the server 1000. At the server 1000, upon receiving the player information, the team-competition-game execution unit 1102*a* updates the player information in the player-information storage unit 1150 (S223).

The team competition game described above is realized through the processes described above. Note that the above-described processes at the player terminal 1 and the server 1000 are merely examples. Furthermore, each of the processes described above may be executed only by the player terminal 1 or may be executed only by the server 1000.

<Processes Relating to Practice Match>

Figure 54:
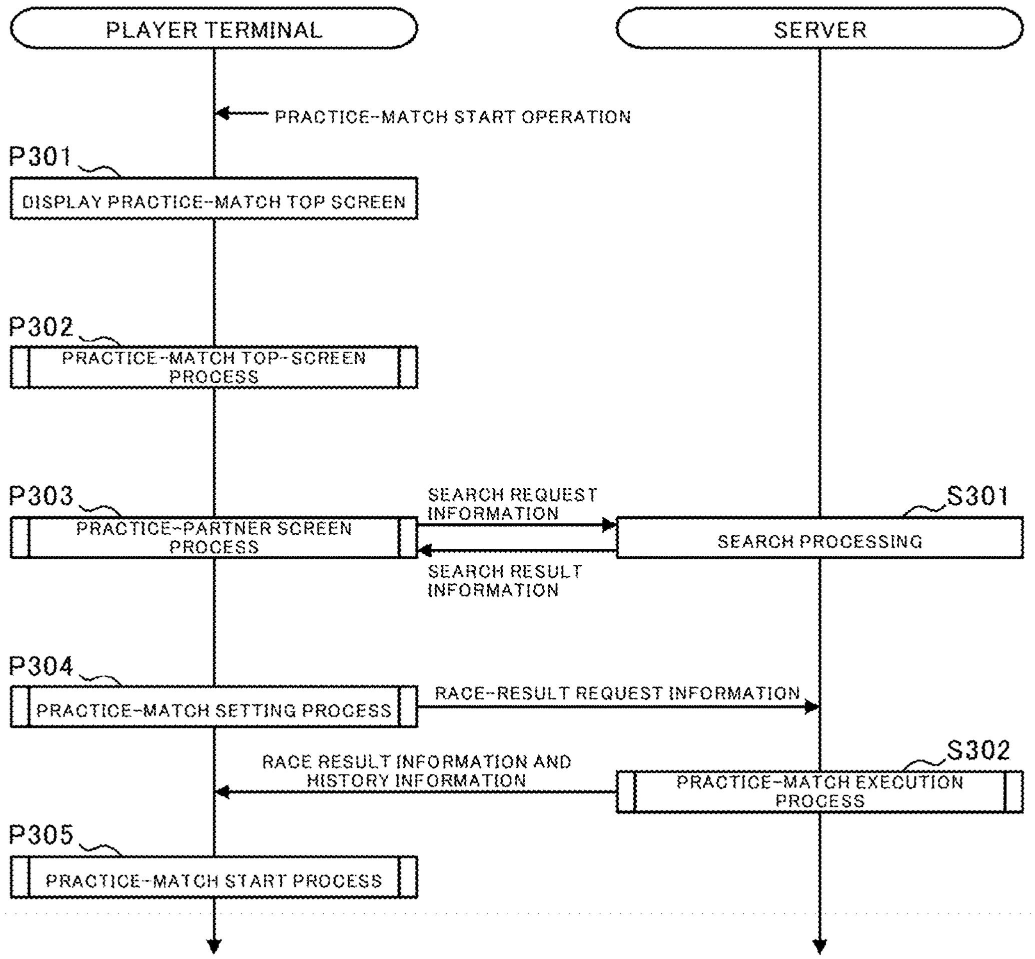
FIG. 54 is a sequence chart for explaining processes at the player terminal and the server, relating to a practice match.

FIG. 54 is a sequence chart for explaining processes at the player terminal 1 and the server 1000, relating to a practice match. When a practice-match start operation (tapping of the practice-match selection operating part 402 in the team stadium screen 400 shown in FIG. 28A) is input at the player terminal 1, the practice-match execution unit 703*a* displays the practice-match top screen 500 (see FIG. 31A) (P301). When the practice-match top screen 500 is displayed, the practice-match execution unit 703*a* executes a practice-match top-screen process (P302).

Figure 55:
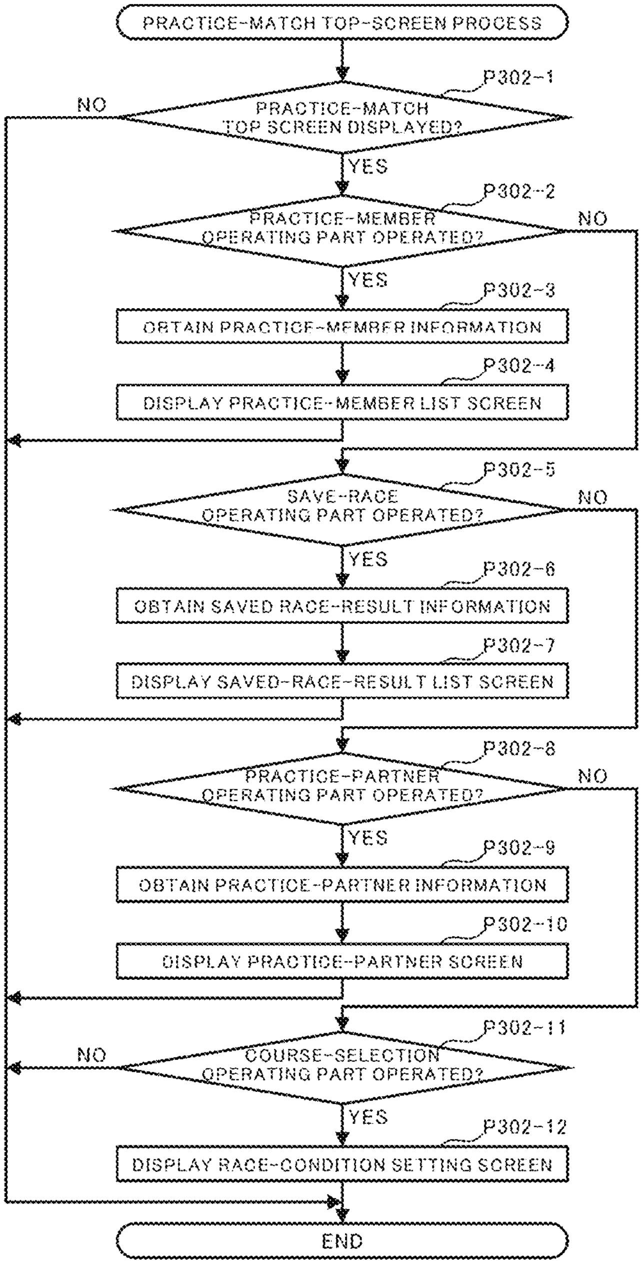
FIG. 55 is a flowchart for explaining a practice-match top screen process at the player terminal.

FIG. 55 is a flowchart for explaining the practice-match top-screen process at the player terminal 1. When the practice-member operating part 502 is tapped (YES in P302-2) while the practice-match top screen 500 is displayed (YES in P302-1), the practice-match execution unit 703*a* obtains practice-member information from the player-information storage unit 750 (P302-3) and displays a practice-member list screen on the display 26 (P302-4).

Furthermore, when the save-race operating part 504 is tapped in the practice-match top screen 500 (YES in P302-5), the practice-match execution unit 703*a* obtains saved race result information from the player-information storage unit 750 (P302-6) and displays a saved-race-result list screen on the display 26 (P302-7).

Furthermore, when the practice-partner operating part 503 is tapped in the practice-match top screen 500 (YES in P302-8), the practice-match execution unit 703*a* obtains practice-partner information from the player-information storage unit 750 (P302-9) and displays the practice partner screen 540 (see FIGS. 34A and 34B) on the display 26 (P302-10).

Furthermore, when the course-selection operating part 501 is tapped in the practice-match top screen 500 (YES in P302-11), the practice-match execution unit 703*a* displays a race-condition setting screen on the display 26 (P302-12).

Referring back to FIG. 54, when the practice-partner screen 540 is displayed (P302-10 in FIG. 55) in the practice-match top-screen process (P302), the practice-match execution unit 703*a* executes a practice-partner screen process (P303).

Figure 56:
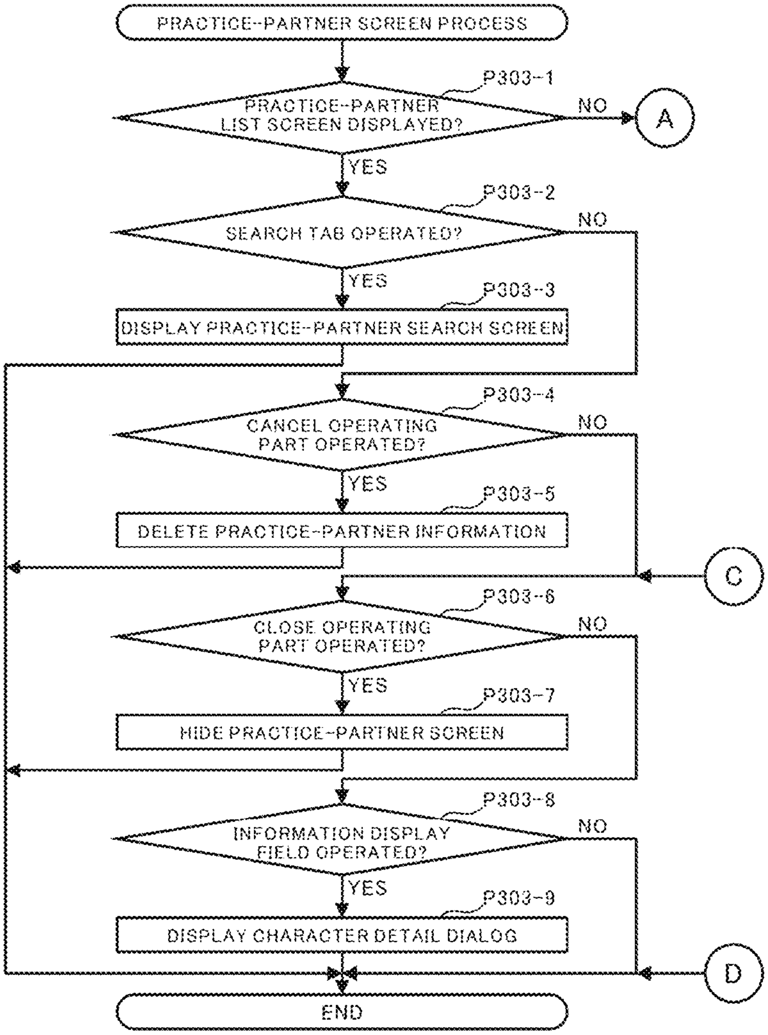
FIG. 56 is a first flowchart for explaining a practice-partner screen process at the player terminal.
Figure 57:
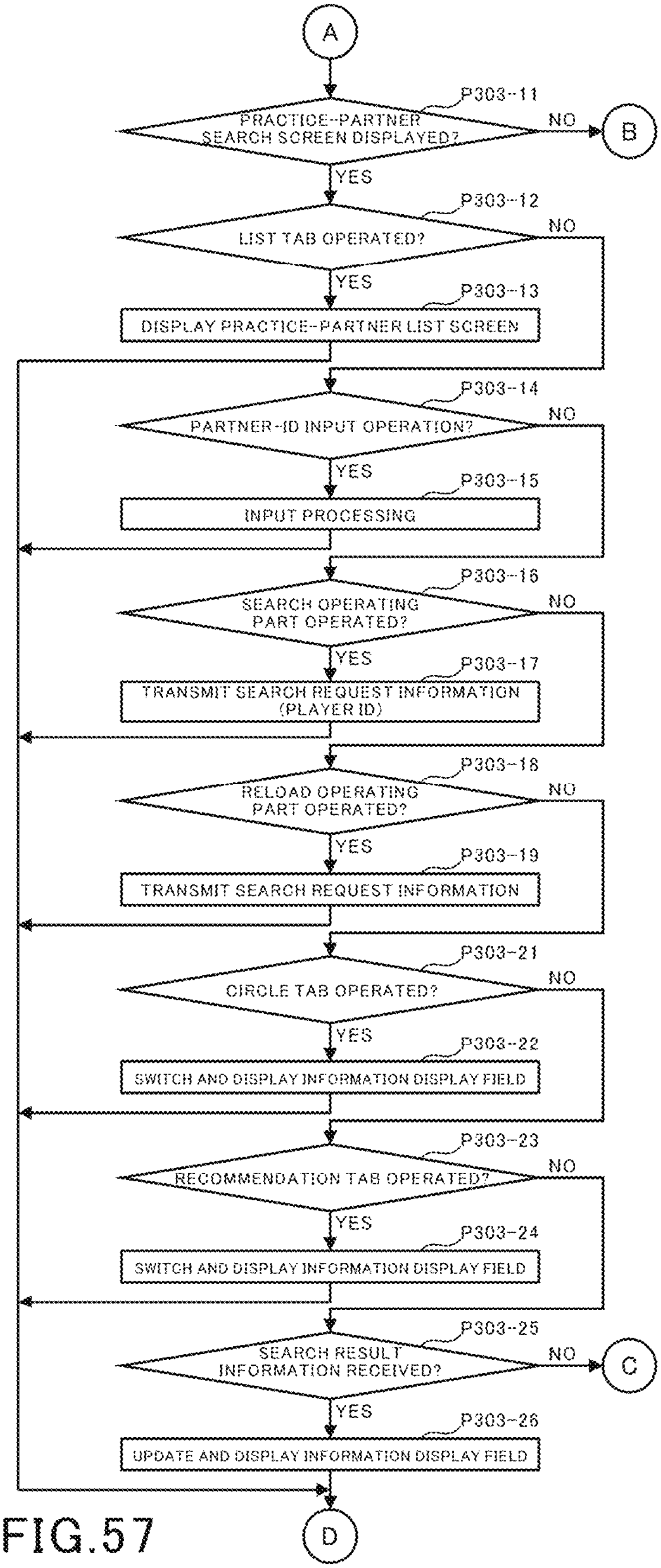
FIG. 57 is a second flowchart for explaining the practice-partner screen process at the player terminal.
Figure 58:
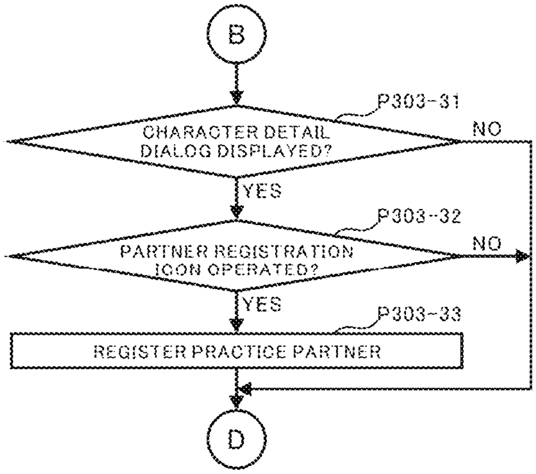
FIG. 58 is a third flowchart for explaining the practice-partner screen process at the player terminal.

FIG. 56 is a first flowchart for explaining the practice-partner screen process at the player terminal 1. FIG. 57 is a second flowchart for explaining the practice-partner screen process at the player terminal 1. FIG. 58 is a third flowchart for explaining the practice-partner screen process at the player terminal 1. When the search tab 541*b* is tapped (YES in P303-2) while the practice-partner list screen 540 (see FIG. 34A) is displayed (YES in P303-1), the practice-match execution unit 703*a* displays the practice-partner search screen 540*b* (see FIG. 34B) (P303-3).

Furthermore, when the cancel operating part 543 is tapped while the practice-partner list screen 540*a* is displayed (YES in P303-4), the practice-match execution unit 703*a* deletes the practice partner information registered in the player-information storage unit 750 (P303-5).

Furthermore, when the close operating part 544 is tapped while the practice partner screen 540 (the practice-partner list screen 540*a* or the practice-partner search screen 540*b*) is displayed (YES in P303-6), the practice-match execution unit 703*a* hides the practice partner screen 540 and displays the practice-match top screen 500 on the display 26 (P303-7).

Furthermore, when the information display field 542 is tapped while the practice partner screen 540 is displayed (YES in P303-8), the practice-match execution unit 703*a* displays the character detail dialog 430 (see FIG. 34C) on the display 26 (P303-9).

As described earlier, by tapping the partner registration icon 434 in the character detail dialog 430 for a nurtured character nurtured by another player, the player can register the nurtured character as a practice partner. As will be described later in detail, when the nurtured character has been registered as a practice partner, practice-partner information is stored in the player-information storage unit 750. At this time, the practice-partner information includes information that affects race results, such as the ability parameters of the nurtured character, as well as nurturing information; meanwhile, the practice-partner information does not include inheritance information or other information that do not affect race results. This serves to alleviate the occupation of the storage capacities of the player-information storage units 750 and 1150.

Meanwhile, inheritance information is included in the nurtured-character information stored in the game-information storage unit 751 of the player terminal 1 who nurtured a nurtured character and in the nurtured-character information stored in the game-information storage unit 1151 of the server 1000 and associated with the player ID of the player who nurtured the nurtured character.

Therefore, when displaying the character detail dialog 430 for a nurtured character nurtured by another player, request information for requesting the inheritance information of the nurtured character is transmitted to the server 1000. Upon receiving the request information, at the server 1000, the nurtured-character information stored in the game-information storage unit 1151 and associated with the player ID of the player who nurtured the nurtured character is searched for. Then, in the case where the corresponding nurtured-character information is found, the player terminal 1 obtains the inheritance information from the server 1000, and the inheritance information obtained is displayed in the character detail dialog 430.

Note that the player can delete nurtured characters nurtured by the player himself or herself. Thus, there are case where a nurtured character registered by another player as a practice partner has already been deleted by the player who nurtured the nurtured character. In such cases, for the player who registered the nurtured character as a practice partner, since practice-partner information is stored in the player-information storage units 750 and 1150, it is possible to use the nurtured character in a practice match.

Furthermore, the practice-partner information includes information that affects races, such as ability parameters, as well as nurturing information. Therefore, regardless of whether or not the nurtured character has been deleted, information other than the inheritance information can be displayed in the character detail dialog 430. Meanwhile, in the case where a nurtured character registered as a practice partner has been deleted by the player who nurtured the nurtured character, it is not possible to obtain the inheritance information. In this case, the inheritance information is not displayed in the character detail dialog 430. Note that the practice partner information may include the inheritance information. In this case, other players can confirm the inheritance information regardless of whether or not the nurtured character has been deleted.

Note that in the practice-partner screen process, the practice-match execution unit 703*a* displays the character detail dialog 430 in the manner described above. However, the character detail dialog 430 can be displayed in various scenes in the game, and processing and displaying similar to the case described above are also performed in the case where the character detail dialog 430 is displayed in other scenes.

When the list tab 541*a* is tapped (YES in P303-12) while the practice-partner list screen 540*a* is not displayed (NO in P303-1) and the practice-partner search screen 540*b* is displayed (YES in P303-11 in FIG. 57), the practice-match execution unit 703*a* displays the practice-partner list screen 540*a* (P303-13).

Meanwhile, when an operation for inputting a partner ID is performed at the input field 545*a* while the practice-partner search screen 540*b* is displayed (YES in P303-14), the practice-match execution unit 703*a* executes input processing for inputting the partner ID (P303-15).

Meanwhile, the search operating part 545*b* is tapped while the practice-partner search screen 540*b* is displayed (YES in P303-16), the practice-match execution unit 703*a* transmits search request information to the server 1000, the search request information including the partner ID input in the input processing (P303-17).

Meanwhile, when the reload operating part 547 is tapped while the practice-partner search screen 540*b* is displayed (YES in P303-18), the practice-match execution unit 703*a* transmits the search request information to the server 1000 (P303-19).

Note that, as shown in FIG. 54, upon receiving the search request information, at the server 1000, the practice-match execution unit 1103*a* executes search processing (S301). In the search processing, nurtured characters matching the search request information are searched for, and search result information based on the search result is set.

Meanwhile, in the case where the circle tab 546*a* is tapped (YES in P303-21) or the recommendation tab 546*b* is tapped (YES in P303-23) while the practice-partner search screen 540*b* is displayed, the practice-match execution unit 703*a* switches and displays the information display field 542 (P303-22 and P303-24).

Furthermore, when search result information is received from the server 1000 while the practice-partner search screen 540*b* is displayed (YES in P303-25), the practice-match execution unit 703*a* updates and displays the information display field 542 (P303-26).

Meanwhile, when the partner registration icon 434 is tapped (YES in P303-32) while the practice-partner search screen 540*b* is not displayed (NO in P303-11) and the character detail dialog 430 is displayed (YES in P303-31 in FIG. 58), the practice-match execution unit 703*a* registers the nurtured character displayed in the character detail dialog 430 as a practice partner (P303-33). Here, the practice-match execution unit 703*a* stores practice-partner information in the player-information storage unit 750, the practice partner information including information that affects races, such as ability parameters, as well as nurturing information.

Referring back to FIG. 54, when the race-condition setting screen is displayed (P302-12 in FIG. 55) in the practice-match top-screen process (P302), the practice-match execution unit 703*a* executes a practice-match setting process (P304).

Figure 59:
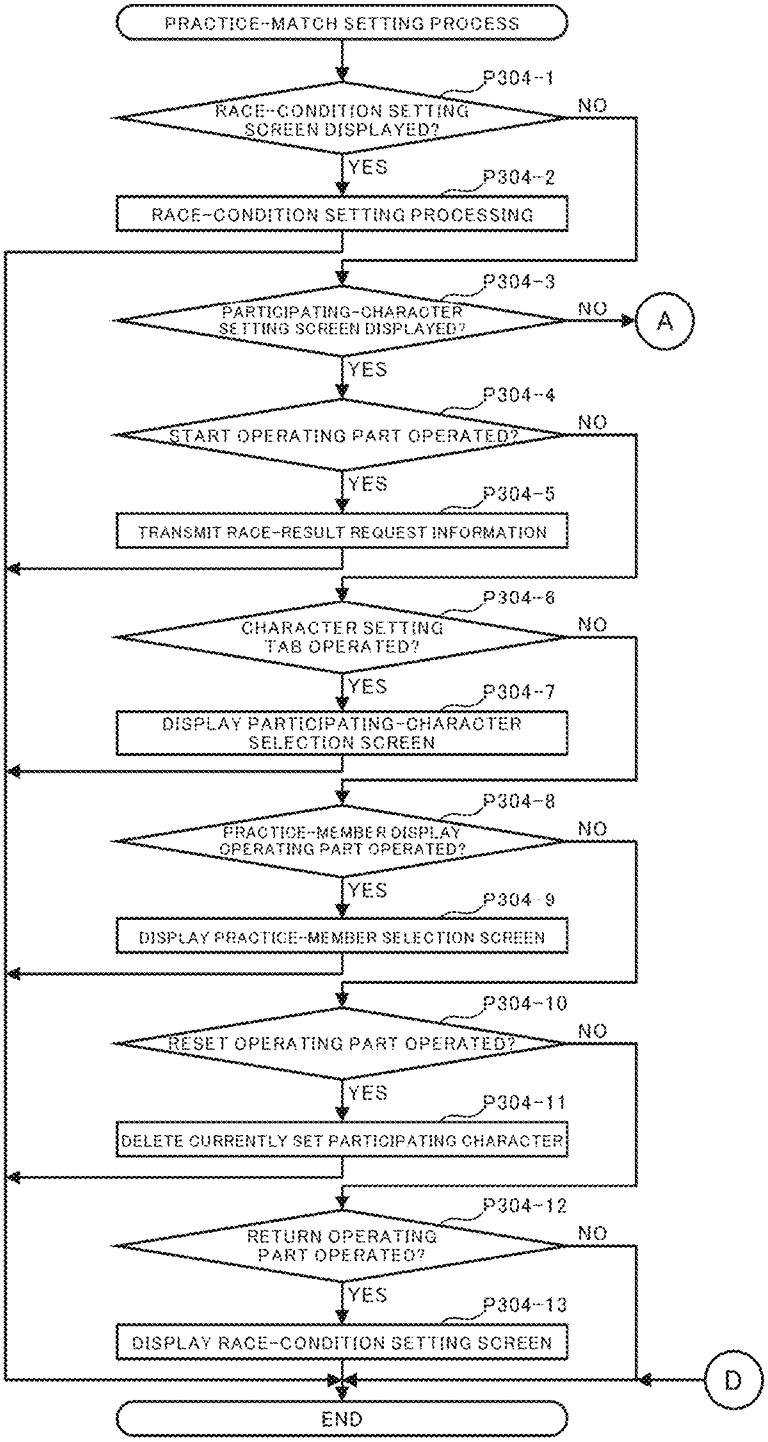
Figure 60:
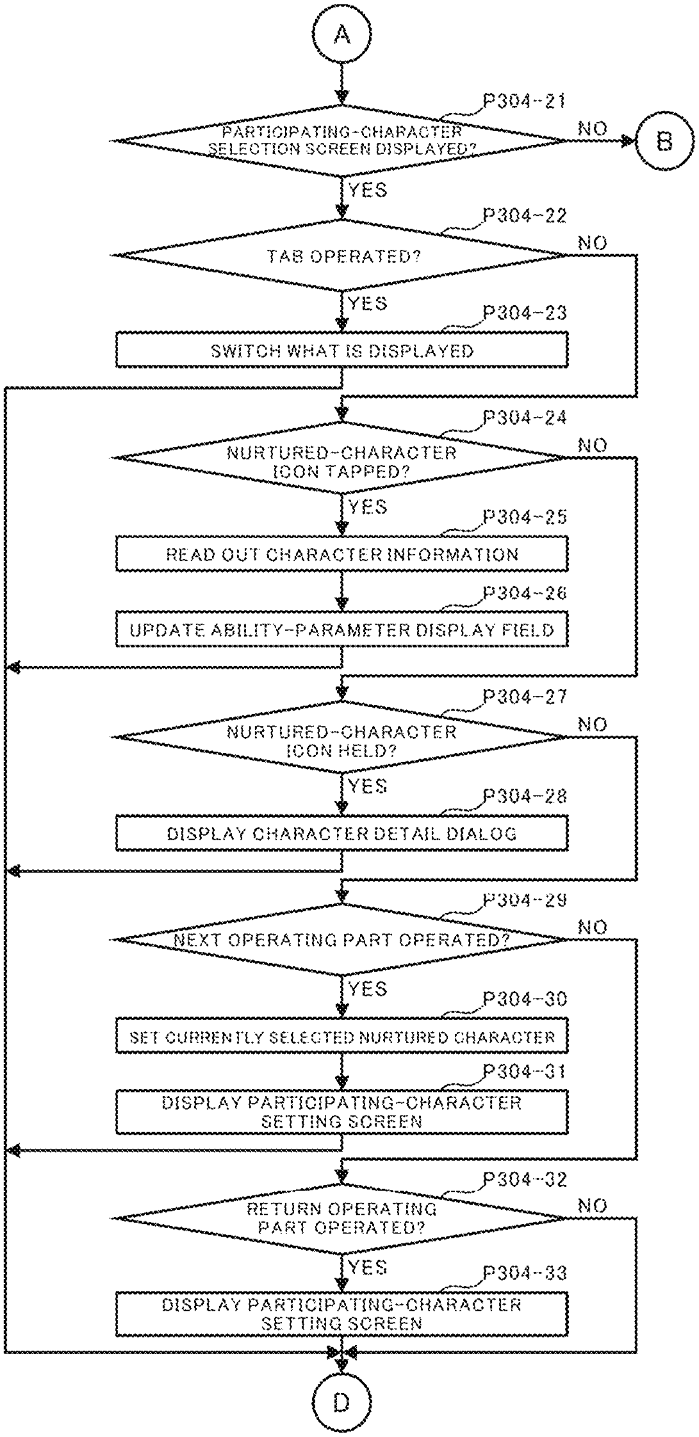
Figure 61:
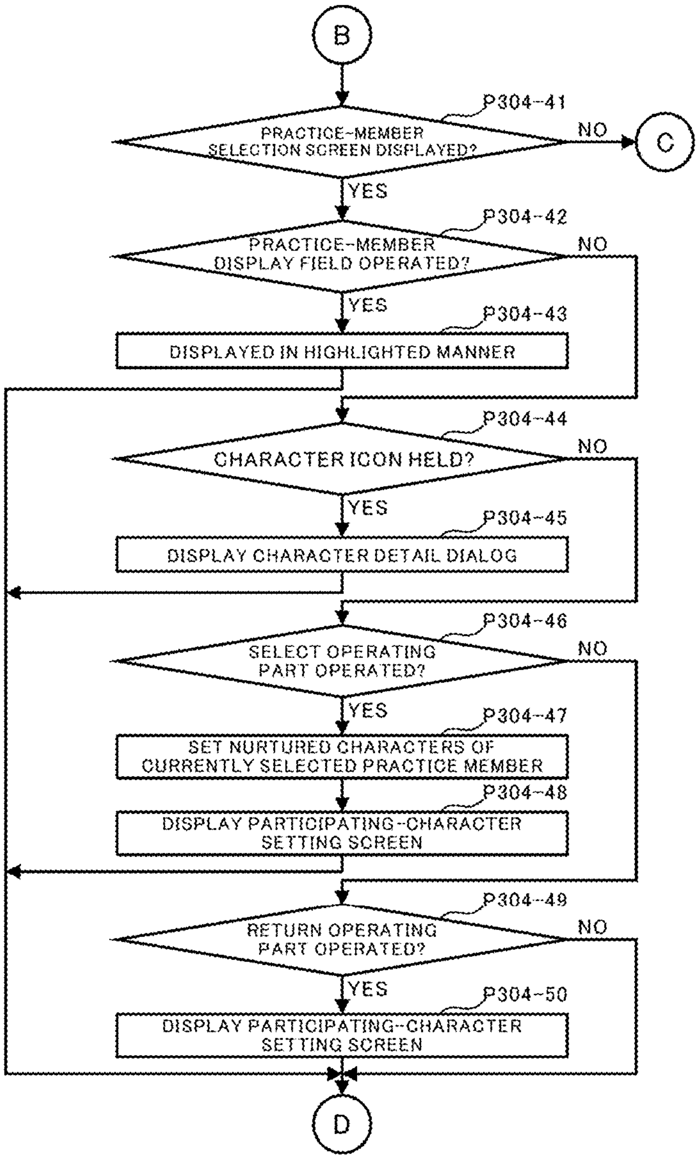
Figure 62:
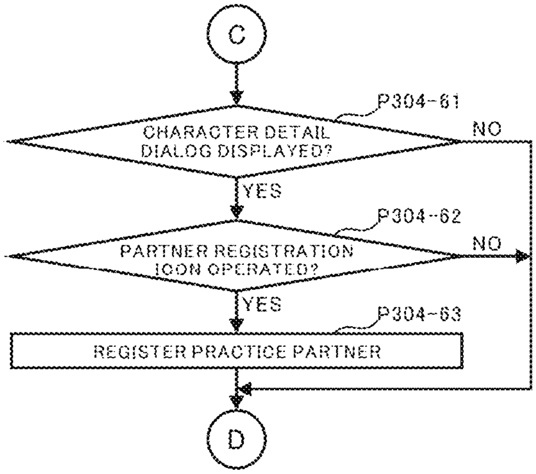

FIG. 59 is a first flowchart for explaining the practice-match setting process at the player terminal 1. FIG. 60 is a second flowchart for explaining the practice-match setting process at the player terminal 1. FIG. 61 is a third flowchart for explaining the practice-match setting process at the player terminal 1. FIG. 62 is a fourth flowchart for explaining the practice-match setting process at the player terminal 1.

As shown in FIG. 59, while the race-condition setting screen is displayed (YES in P304-1), the practice-match execution unit 703*a* executes a race-condition setting process (P304-2). Here, processing for setting race conditions on the basis of player operations input to the race-condition setting screen is performed.

Meanwhile, when the start operating part 513 is tapped (YES in P304-4) while the race-condition setting screen is not displayed (NO in P304-1) and the participating-character setting screen 510 (see FIG. 31B) is displayed (YES in P304-3), the practice-match execution unit 703*a* transmits race-result request information to the server 1000 (P304-5). At the server 1000, upon receiving the race-result request information, a practice-match execution process (S302), which will be described later, is performed.

Meanwhile, when the character setting tab 511 is tapped while the participating-character setting screen 510 is displayed (YES in P304-6), the practice-match execution unit 703*a* displays the participating-character selection screen 520 (see FIG. 31C) on the display 26 (P304-7).

Meanwhile, when the practice-member display operating part 514 is tapped while the participating-character setting screen 510 is displayed (YES in P304-8), the practice-match execution unit 703*a* displays the practice-member selection screen 530 (see FIG. 33) on the display 26 (P304-9).

Meanwhile, when the reset operating part 512 is tapped while the participating-character setting screen 510 is displayed (YES in P304-10), the practice-match execution unit 703*a* deletes the currently set participating character (P304-11).

Meanwhile, when the return operating part 515 is tapped while the participating-character setting screen 510 is displayed (YES in P304-12), the practice-match execution unit 703*a* displays the race-condition setting screen on the display 26 (P304-13).

Meanwhile, when the my-character display tab 525 or the rental-character display tab 526 is tapped (YES in P304-22) while the participating-character setting screen 510 is not displayed (NO in P304-3) and the participating-character selection screen 520 is displayed (YES in P304-21 in FIG. 60), the practice-match execution unit 703*a* switches what is displayed in the participating-character selection screen 520 (P304-23).

Meanwhile, when one of the nurtured-character icons 522 is tapped while the participating-character selection screen 520 is displayed (YES in P304-24), the practice-match execution unit 703*a* reads out information concerning the selected nurtured character (P304-25). Here, in the case where a nurtured character nurtured by the player himself or herself is selected, the practice-match execution unit 703*a* reads out nurtured-character information from the game-information storage unit 751. Meanwhile, in the case where a nurtured character nurtured by another player is selected, the practice-match execution unit 703*a* reads out information from the player-information storage unit 750. In this case, information relating to the representative character of a friend or practice partner information relating to a nurtured character registered as a practice partner is read out. Then, the practice-match execution unit 703*a* updates what is displayed in the ability-parameter display field 521 on the basis of the information read out (P304-26).

Meanwhile, when one of the nurtured-character icons 522 is held while the participating-character selection screen 520 is displayed (YES in P304-27), the practice-match execution unit 703*a* displays the character detail dialog 430 on the display 26 (P304-28).

Meanwhile, when the next operating part 524 is tapped while the participating-character selection screen 520 is displayed (YES in P304-29), the practice-match execution unit 703*a* sets the currently selected nurtured character as a participating character (P304-30). Furthermore, the practice-match execution unit 703*a* displays the participating-character setting screen 510 on the display 26 (P304-31).

Meanwhile, when the return operating part 523 is tapped (YES in P304-32) while the participating-character selection screen 520 is displayed, the practice-match execution unit 703*a* displays the participating-character setting screen 510 on the display 26 (P304-33).

Meanwhile, when one of the practice-member display fields 531 is tapped (YES in P304-42) while the participating-character selection screen 520 is not displayed (NO in P304-21) and the practice-member selection screen 530 is displayed (YES in P304-41 in FIG. 61), the practice-match execution unit 703*a* displays the tapped practice-member display field 531 in a highlighted manner (P304-43).

Meanwhile, an operation is performed to hold one of the character icons displayed in one of the practice-member display fields 531 while the practice-member selection screen 530 is displayed (YES in P304-44), the practice-match execution unit 703*a* displays the character detail dialog 430 on the display 26 (P304-45).

Meanwhile, when the select operating part 532 is tapped while the practice-member selection screen 530 is displayed (YES in P304-46), the practice-match execution unit 703*a* sets the nurtured characters included in the currently selected practice member as participating characters (P304-47). Furthermore, the practice-match execution unit 703*a* displays the participating-character setting screen 510 on the display 26 (P304-48).

Meanwhile, when the return operating part 533 is tapped while the practice-member selection screen 530 is displayed (YES in P304-49), the practice-match execution unit 703*a* displays the participating-character setting screen 510 on the display 26 (P304-50).

Meanwhile, when the partner registration icon 434 is tapped (YES in P304-62) while the practice-member selection screen 530 is not displayed (NO in P304-41) and the character detail dialog 430 is displayed (YES in P304-61 in FIG. 62), the practice-match execution unit 703*a* registers the nurtured character displayed in the character detail dialog 430 as a practice partner (P304-63). Here, the practice-match execution unit 703*a* stores practice-partner information in the player-information storage unit 750, the practice-partner information including information that affects races, such as ability parameters, as well as nurturing information.

Referring back to FIG. 54, when the race-result request information has been transmitted to the server 1000 (P304-5 in FIG. 59) in the practice-match setting process (P304), the practice-match execution process (S302) is performed at the server 1000.

Figure 63:
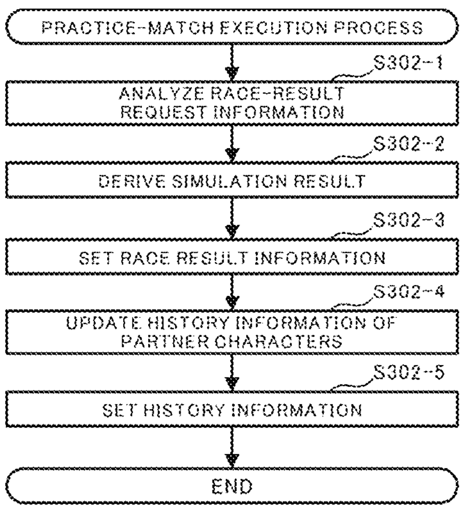

FIG. 63 is a flowchart for explaining the practice-match execution process at the server 1000. The practice-match execution unit 1103*a* analyzes the received race-result request information (S302-1) to derive a simulation result (S302-2). The simulation result includes information indicating the order, i.e., the places, of the participating characters. Here, the practice-match execution unit 1103*a* derives the simulation result, i.e., race result information, by using, for example, the nurtured-character information and practice-partner information stored in the player-information storage unit 1150 or the game-information storage unit of the player who executes the practice match.

Note that the practice-match execution unit 1103*a* may derive race result information by reading out nurtured-character information for a nurtured character nurtured by a player who is different from the player who executes the practice match, the nurtured-character information being stored in the game-information storage unit of the player who nurtured the nurtured character.

Then, the practice-match execution unit 1103*a* sets the derived race result information so that the player terminal 1 can receive the race result information (S302-3).

Furthermore, in the case where the participating characters include a nurtured character nurtured by another player and registered as a practice partner, the practice-match execution unit 1103*a* updates the history information of the nurtured character (S302-4). Here, in the game-information storage unit 1151, the history information of nurtured-character information associated with the player ID of the player who nurtured the nurtured character is updated. Note that the history information includes the number of times of participation in practice matches as a practice partner, the places, etc.

Here, the number of times of participation, etc. in practice matches are counted only for each nurtured character registered as a practice partner. Alternatively, history information such as the number of times of participation, etc. in practice matches may be stored also for nurtured characters nurtured by the player himself or herself who has executed the practice match as well as the representative characters of friends.

Furthermore, the practice-match execution unit 1103*a* sets the updated history information of partner characters so that the player terminal 1 can receive the updated history information (S302-5).

Referring back to FIG. 54, at the player terminal 1, upon receiving the race result information and the history information, the practice-match execution unit 703*a* executes a practice-match start process (P305).

Figure 64:
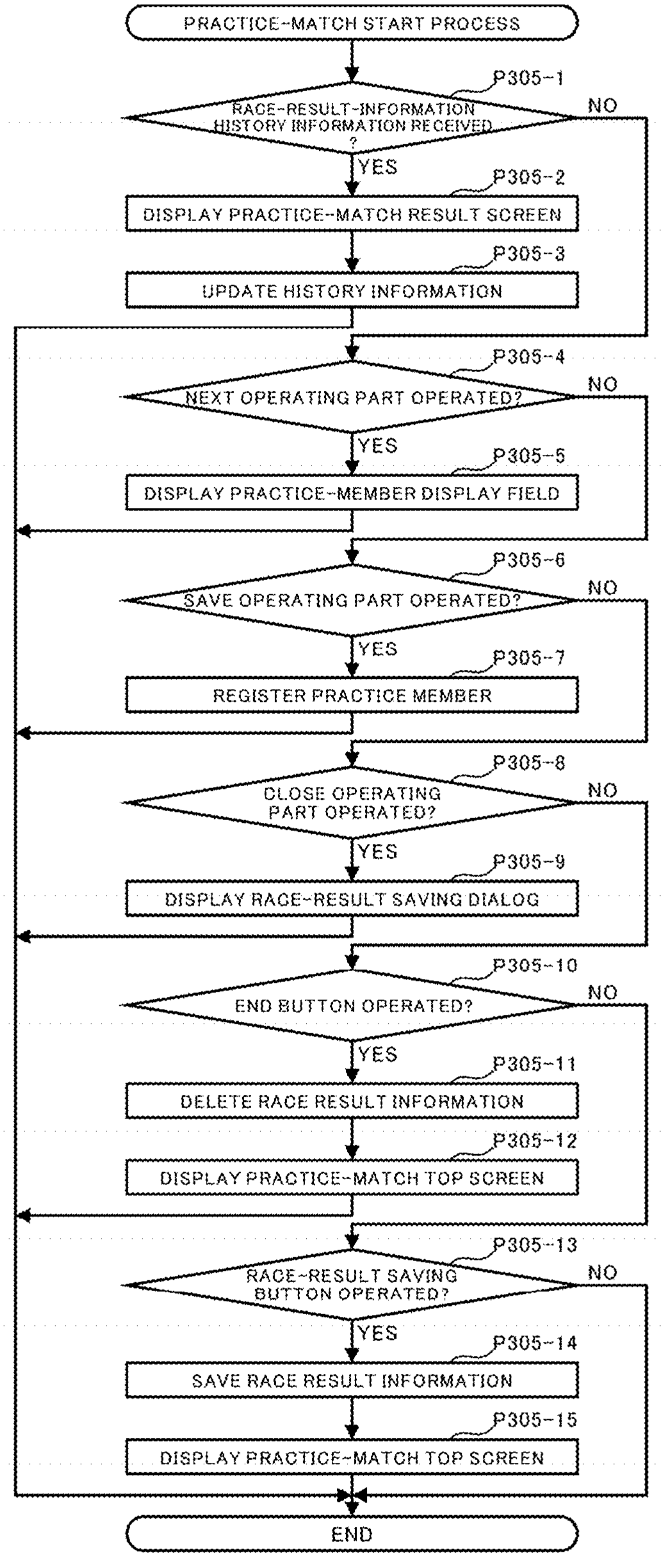

FIG. 64 is a flowchart for explaining the practice-match start process at the player terminal 1. Upon receiving the race result information and the history information (YES in P305-1), the practice-match execution unit 703*a* displays the practice-match result screen 550 (see FIG. 35A) on the display 26 on the basis of the race result information (P305-2). Furthermore, on the basis of the history information, the practice-match execution unit 703*a* updates the history information of the practice partner information stored in the player-information storage unit 750 (P305-3).

Meanwhile, when the next operating part 551 is tapped in the practice-match result screen 550 (YES in P305-4), the practice-match execution unit 703*a* displays the practice-member display fields 561 on the display 26 (P305-5).

Meanwhile, when one of the save operating parts 561*a* is tapped in the practice-match result screen 550 (YES in P305-6), the practice-match execution unit 703*a* registers all the nurtured characters participating in the current race in the player-information storage unit 750 as practice members (P305-7).

Meanwhile, when the close operating part 562 is tapped in the practice-match result screen 550 (YES in P305-8), the practice-match execution unit 703*a* displays the race-result saving dialog 570 on the display 26 (P305-9).

Meanwhile, when the quit button 571 is tapped in the race-result saving dialog 570 (YES in P305-10), the practice-match execution unit 703*a* deletes the race result information (P305-11) and displays the practice-match top screen 500 on the display 26 (P305-12).

Meanwhile, when the race-result saving button 572 is tapped in the race-result saving dialog 570 (YES in P305-13), the practice-match execution unit 703*a* saves the race result information in the player-information storage unit 750 (P305-14) and displays the practice-match top screen 500 on the display 26 (P305-15).

The practice match, the practice-member registration function, and the practice-partner registration function are realized through the processes described above. Note that the above-described processes at the player terminal 1 and the server 1000 are merely examples. Furthermore, each of the processes described above may be executed only by the player terminal 1 or may be executed only by the server 1000.

<Processes Relating to Information Sharing Function>

Figure 65:
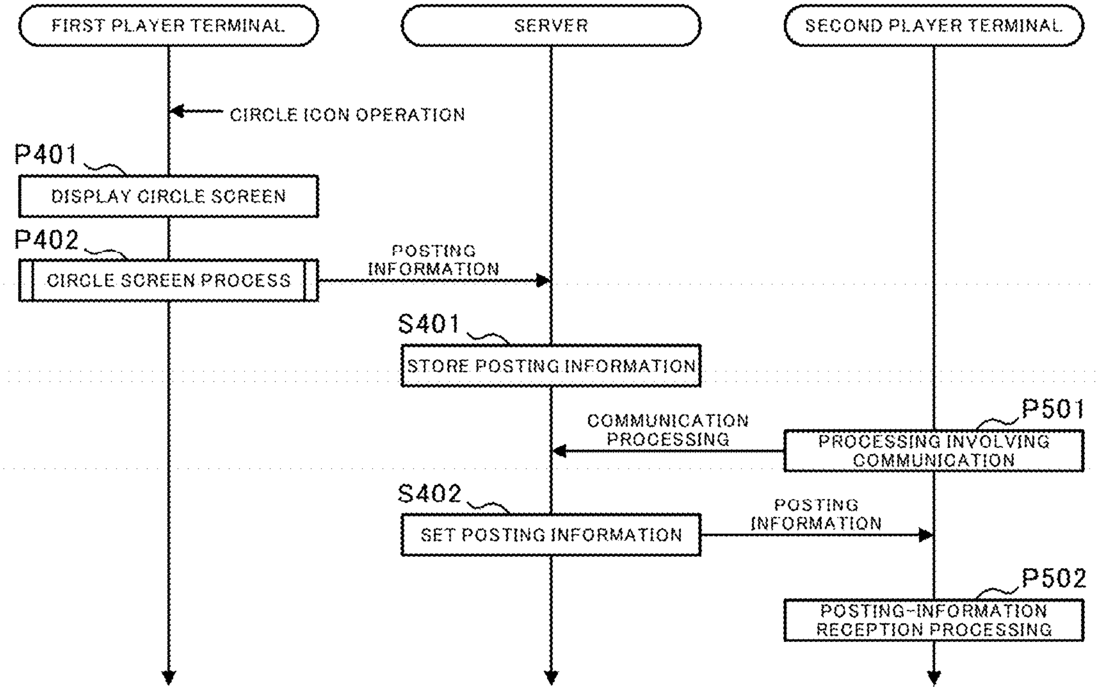

FIG. 65 is a first sequence chart for explaining processes at the player terminal 1 and the server 1000, relating to the information sharing function. Note that in the following description, a player who nurtured a nurtured character will be referred to as a first player, and the player terminal 1 of the first player will be referred to as a first player terminal 1. Furthermore, another player who belongs to the same circle as the first player will be referred to as a second player, and the player terminal 1 of the second player will be referred to as a second player terminal 1.

When the circle icon 134 in the home screen 100 is tapped at the first player terminal 1, the information-sharing function unit 704*a* displays the circle screen 600 on the display 26 (P401). When the circle screen 600 is displayed, the information-sharing function unit 704*a* executes a circle screen process (P402).

Figure 66:
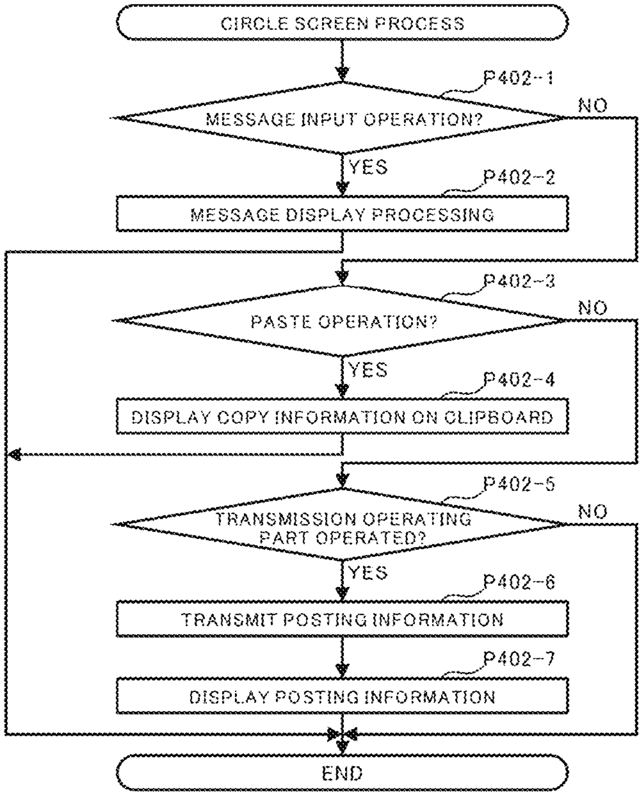

FIG. 66 is a flowchart for explaining the circle screen process at the player terminal 1. When a message is input to the input screen (YES in P402-1), the information-sharing function unit 704*a* executes message display processing for displaying the input message in the message input field 601 (see FIGS. 36A and 36B) (P402-2).

Meanwhile, when a prescribed paste operation is input to the message input field 601 (YES in P402-3), the information-sharing function unit 704*a* displays the copy information copied to the clipboard in the message input field 601 (P402-4).

Meanwhile, when the transmission operating part 602 is tapped in the circle screen 600 (YES in P402-5), the information-sharing function unit 704*a* transmits posting information including the input message to the server 1000 (P402-6). Furthermore, the information-sharing function unit 704*a* displays the transmitted posting information at the player terminal 1 of the first player, who transmitted the posting information (P402-7).

Referring back to FIG. 65, when the posting information is received by the server 1000, the information-sharing function unit 1104*a* stores the received posting information in the data storage area 1012*b* (S401). Note that an area for storing information concerning a circle is provided in the data storage area 1012*b*. Here, the player IDs of players who belong to each circle, as well as information posted by the players, are stored in association with the circle ID.

Then, when processing involving communication with the server 1000 is performed at the second player terminal 1 (P501), the information-sharing function unit 1104*a* sets posting information that has not been received by the second player terminal 1 so that the second player terminal 1 can receive the posting information (S402). When the posting information is received by the second player terminal 1, at the second player terminal 1, the information-sharing function unit 704*a* executes posting-information reception processing (P502). Here, the information-sharing function unit 704*a* stores the posting information and performs processing so that the posting information can be displayed on the circle screen 600 when the circle screen 600 is displayed.

Figure 67:
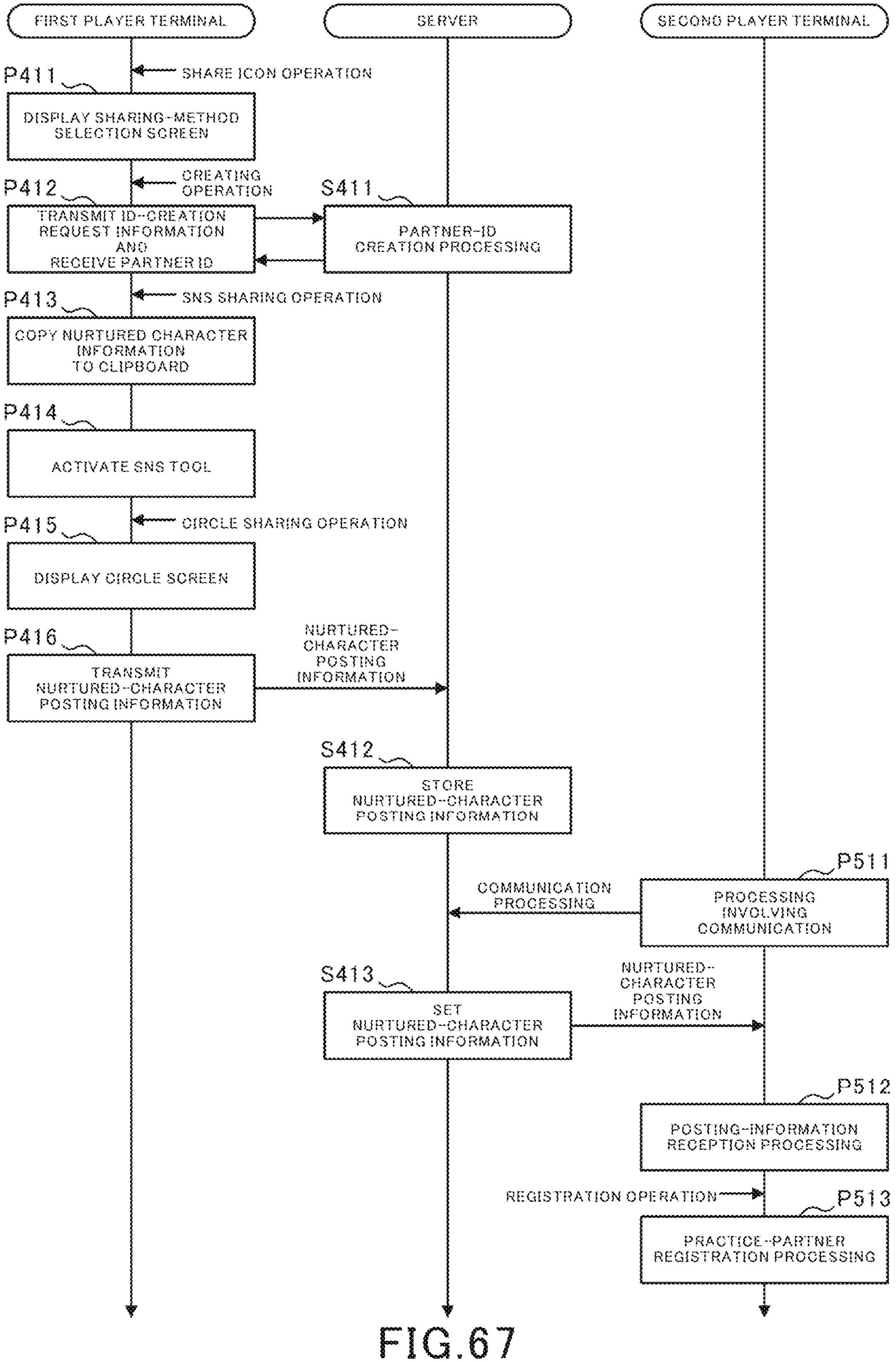

FIG. 67 is a second sequence chart for explaining processes at the player terminal 1 and the server 1000, relating to the information sharing function. When the share icon 435 is tapped in the character detail dialog 430 (see FIG. 37A), the information-sharing function unit 704*a* displays the sharing-method selection screen 610 (see FIG. 37B) on the display 26 (P411).

Meanwhile, in the case where the partner-ID operating part 611 is tapped in the sharing-method selection screen 610 in the state where a partner ID has not been created, the information-sharing function unit 704*a* transmits ID-creation request information to the server 1000, requesting that a partner ID be created (P412). At the server 1000, upon receiving the ID-creation request information, the information-sharing function unit 1104*a* creates a partner ID (S411) and causes the first player terminal 1 to receive the partner ID. At this time, the information-sharing function unit 1104*a* associates a nurtured-character ID with the partner ID. Furthermore, the information-sharing function unit 1104*a* starts managing the effective period of the partner ID.

Note that although not shown, when the partner-ID operating part 611 is tapped in the state where a partner ID has been created, the information-sharing function unit 704*a* copies the partner ID to the clipboard.

Meanwhile, when the SNS share button 613 is tapped in the sharing-method selection screen 610, the information-sharing function unit 704*a* copies the nurtured-character information to the clipboard (P413) and activates an SNS tool (P414). Note that in the SNS tool, a URL with which the partner ID is associated is copied to the posting area. The player can transmit or upload the nurtured-character information copied to the posting area or the clipboard. Note that in the case where the SNS share button 613 is tapped in the state where a partner ID has not been created, a partner ID is created in S411.

Meanwhile, when the circle share button 612 is tapped in the sharing-method selection screen 610, the information-sharing function unit 704*a* displays the circle screen 600 on the display 26 (P415) and transmits nurtured-character posting information to the server 1000 (P416).

When the nurtured-character posting information is received by the server 1000, the information-sharing function unit 1104*a* stores the received nurtured-character posting information in the data storage area 1012*b* in association with the circle ID (S412).

Then, when processing involving communication with the server 1000 is performed at the second player terminal 1 (P511), the information-sharing function unit 1104*a* sets nurtured-character posting information that has not been received by the second player terminal 1 so that the second player terminal 1 can receive the nurtured-character posting information (S413). When the nurtured-character posting information is received by the second player terminal 1, at the second player terminal 1, the information-sharing function unit 704*a* executes posting-information reception processing (P512). Here, the information-sharing function unit 704*a* stores the nurtured-character posting information and performs processing so that the nurtured-character-information display field 603 can be displayed in the circle screen 600 when the circle screen 600 is displayed.

Then, when the register button 603*a* of the nurtured-character-information display field 603 is tapped at the second player terminal 1, the information-sharing function unit 704*a* executes processing for registering the nurtured character in the player-information storage unit 750 as a practice partner (P513).

The information sharing function is realized through the processes described above. Note that the above-described processes at the player terminal 1 and the server 1000 are merely examples. For example, posting information or nurtured-character posting information may be transmitted and received directly between player terminals 1 without the intervention of the server 1000.

Although an aspect of an embodiment has been described above with reference to the accompanying drawings, it goes without saying that the present invention is not limited to the embodiment described above. It would be obvious that a person skilled in the art could conceive of various kinds of modifications or improvements within the scope recited in the claims, and it would be understood that those modifications and improvements obviously fall within the technical scope of the present invention.

The above embodiment has been described in the context of the case where nurtured characters nurtured in a nurturing game can be used in a team competition game for which horse racing is the motif. However, there is no particular limitation to the content of the nurturing game, the game in which nurtured characters can be used, or the content of a practice match. For example, nurtured characters may be usable in a sport game.

In any case, it suffices for a computer to carry out: processing for storing character information (nurtured-character information in the embodiment described above) of a character nurtured in a nurturing game, in association with unique information (a player ID in the embodiment described above) of the player who nurtured the character; processing for setting at least a plurality of characters nurtured by other players as battle characters (participating characters in a practice match in the embodiment described above) on the basis of player operations; and processing for executing a battle game (a practice match in the embodiment described above) in which the battle characters play a battle by using the character information of the characters set as the battle characters.

Furthermore, in the embodiment described above, the process for executing a battle game (a practice match in the embodiment described above) includes processing for determining the places of battle characters (participating characters in a practice match in the embodiment described above). However, the content of the practice match in the embodiment described above is merely an example. For example, the content may be such that only the time in the case where each participating character runs a course is derived, and the places of battle characters are not necessary.

Furthermore, it is assumed in the embodiment described above that information concerning the execution of practice matches (here, history information such as the number of times of participation in races in practice matches) is managed by a player other than the player who nurtured a nurtured character. However, the management of history information is not necessary.

Furthermore, in the embodiment described above, the following kinds of processing are realized by the information sharing function: processing for generating posting information that makes it possible to view nurtured-character information on the basis of an operation by the player who nurtured a nurtured character (processing for transmitting nurtured-character posting information at the first player terminal 1 or processing for storing nurtured-character posting information at the server 1000); processing for enabling other players to access generated posting information (processing for causing the second player terminal 1 to receive nurtured-character posting information); and processing for displaying character information by accessing posting information (processing for displaying the nurtured-character-information display field 603 in the circle screen 600 at the second player terminal 1).

Furthermore, in the embodiment described above, processing for providing an information sharing tool (the circle function and the circle screen 600 in the embodiment described above) is carried out, the information sharing tool making it possible to share information among a plurality of players and to post posting information. That is, in the embodiment described above, an information sharing tool is provided as a function of the game, which makes it possible to display nurtured-character information of other players in the game. However, an information sharing tool such as an information sharing function or a circle function is not necessary.

Note that information processing programs for executing the processes in the embodiment described above and the various kinds of modifications may be stored in a computer-readable, non-transitory storage medium and may be provided in the form of the storage medium. Furthermore, a game terminal device including the storage medium may be provided. Alternatively, the embodiment described above and the various kinds of modifications may be embodied in the form of an information processing method for realizing the individual functions and the steps shown in the flowcharts.

What is claimed is:

1. A non-transitory computer readable medium storing a program causing a computer to perform a method comprising:

- storing first character information of a first character nurtured in a nurturing game by a first player in association with unique information of the first player;
- setting, based on an operation by the first player, a plurality of characters as a plurality of battle characters in a battle game,
  - wherein the plurality of battle characters comprise the first character nurtured by the first player and one or more second characters nurtured by one or more players different from the first player; and
- executing the battle game in which the plurality of battle characters play a battle by using the first character information and second character information of the plurality of battle characters,
- wherein executing the battle game determines a respective match result in the battle game for each battle character among the plurality of battle characters.

2. The non-transitory computer readable medium according to claim 1, wherein executing the battle game comprises determining a plurality of places in the battle game for the plurality of battle characters.

3. The non-transitory computer readable medium according to claim 1, wherein the method further comprises:

managing information concerning that the battle game has been executed with using the plurality of battle characters nurtured by the one or more players.

4. The non-transitory computer readable medium according to claim 1, wherein the method further comprises:

for each of the plurality of characters, generating posting information to produce generated posting information that enables viewing of the first character information and the second character information, based on an operation by a player who nurtured a respective character among the plurality of characters;

enabling other players beyond the respective character to access the generated posting information; and displaying character information of the generated posting information.

5. The non-transitory computer readable medium according to claim 4, wherein the method further comprises:

providing an information sharing tool that enables sharing information among a plurality of players and enables posting of the generated posting information, and wherein the character information of the generated posting information is displayed by the information sharing tool.

6. An information processing method comprising:

storing, by a computer, first character information of a first character nurtured in a nurturing game by a first player in association with unique information of the first player;

setting, by the computer and based on an operation by the first player, a plurality of characters as a plurality of battle characters in a battle game, wherein the plurality of battle characters comprise the first character nurtured by the first player and one or more second characters nurtured by one or more players different from the first player; and executing, by the computer, the battle game in which the plurality of battle characters play a battle by using the first character information and second character information of the plurality of battle characters, wherein executing the battle game determines a respective match result in the battle game for each battle character among the plurality of battle characters.

7. A game device comprising:

a computer processor; and a memory connected to the computer processor, wherein the memory comprises a program configured to perform a method comprising:

storing first character information of a first character nurtured in a nurturing game by a first player in association with unique information of the first player;

setting, based on an operation by the first player, a plurality of characters as a plurality of battle characters in a battle game, wherein the plurality of battle characters comprise the first character nurtured by the first player and one or more second characters nurtured by one or more players different from the first player; and executing the battle game in which the plurality of battle characters play a battle by using the first character information and second character information of the plurality of battle characters, wherein executing the battle game determines a respective match result in the battle game for each battle character among the plurality of battle characters.

* * * * *